(12) United States Patent
Salter et al.

(10) Patent No.: US 12,045,392 B1
(45) Date of Patent: Jul. 23, 2024

(54) METHOD AND DEVICE FOR DEFINING CUSTOM HAND GESTURES

(71) Applicant: Apple Inc., Cupertino, CA (US)

(72) Inventors: Thomas G. Salter, Foster City, CA (US); Richard Ignatius Pusal Lozada, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/379,698

(22) Filed: Jul. 19, 2021

Related U.S. Application Data

(60) Provisional application No. 63/082,957, filed on Sep. 24, 2020.

(51) Int. Cl.
G06F 3/01 (2006.01)
G06N 3/08 (2023.01)
G06V 40/20 (2022.01)

(52) U.S. Cl.
CPC .............. *G06F 3/017* (2013.01); *G06F 3/011* (2013.01); *G06N 3/08* (2013.01); *G06V 40/20* (2022.01)

(58) Field of Classification Search
None
See application file for complete search history.

(56) References Cited

U.S. PATENT DOCUMENTS

| | | | |
|---|---|---|---|
| 8,289,162 B2 | 10/2012 | Mooring et al. | |
| 8,436,821 B1 | 5/2013 | Plichta et al. | |
| 9,569,001 B2 | 2/2017 | Mistry et al. | |
| 9,747,306 B2 | 8/2017 | Itani et al. | |
| 2005/0134117 A1* | 6/2005 | Ito | G06F 3/017 307/10.1 |
| 2006/0136846 A1* | 6/2006 | Im | G06F 3/017 715/863 |
| 2009/0103780 A1* | 4/2009 | Nishihara | G06F 3/0425 382/103 |
| 2011/0314427 A1 | 12/2011 | Sundararajan | |
| 2015/0009124 A1* | 1/2015 | Antoniac | G06F 3/017 345/156 |
| 2015/0229837 A1* | 8/2015 | Her | H04N 5/23219 348/222.1 |
| 2015/0309582 A1* | 10/2015 | Gupta | G06F 3/014 345/156 |
| 2016/0283768 A1* | 9/2016 | Kounavis | G06F 18/28 |
| 2019/0138708 A1* | 5/2019 | Agrawal | H04L 63/08 |

* cited by examiner

*Primary Examiner* — Rinna Yi
(74) *Attorney, Agent, or Firm* — Fernando & Partners, LLP

(57) ABSTRACT

In one implementation, a method of defining a custom hand gesture is performed by a device including an image sensor, one or more processors, and non-transitory memory. The method includes receiving a request to define a first hand gesture. The method includes capturing, via the image sensor, a first performance of the first hand gesture. The method includes extracting, from the first performance of the first hand gesture, a first set of features. The method includes defining, based on the first set of features, one or more gesture matching criteria for the first hand gesture.

24 Claims, 47 Drawing Sheets

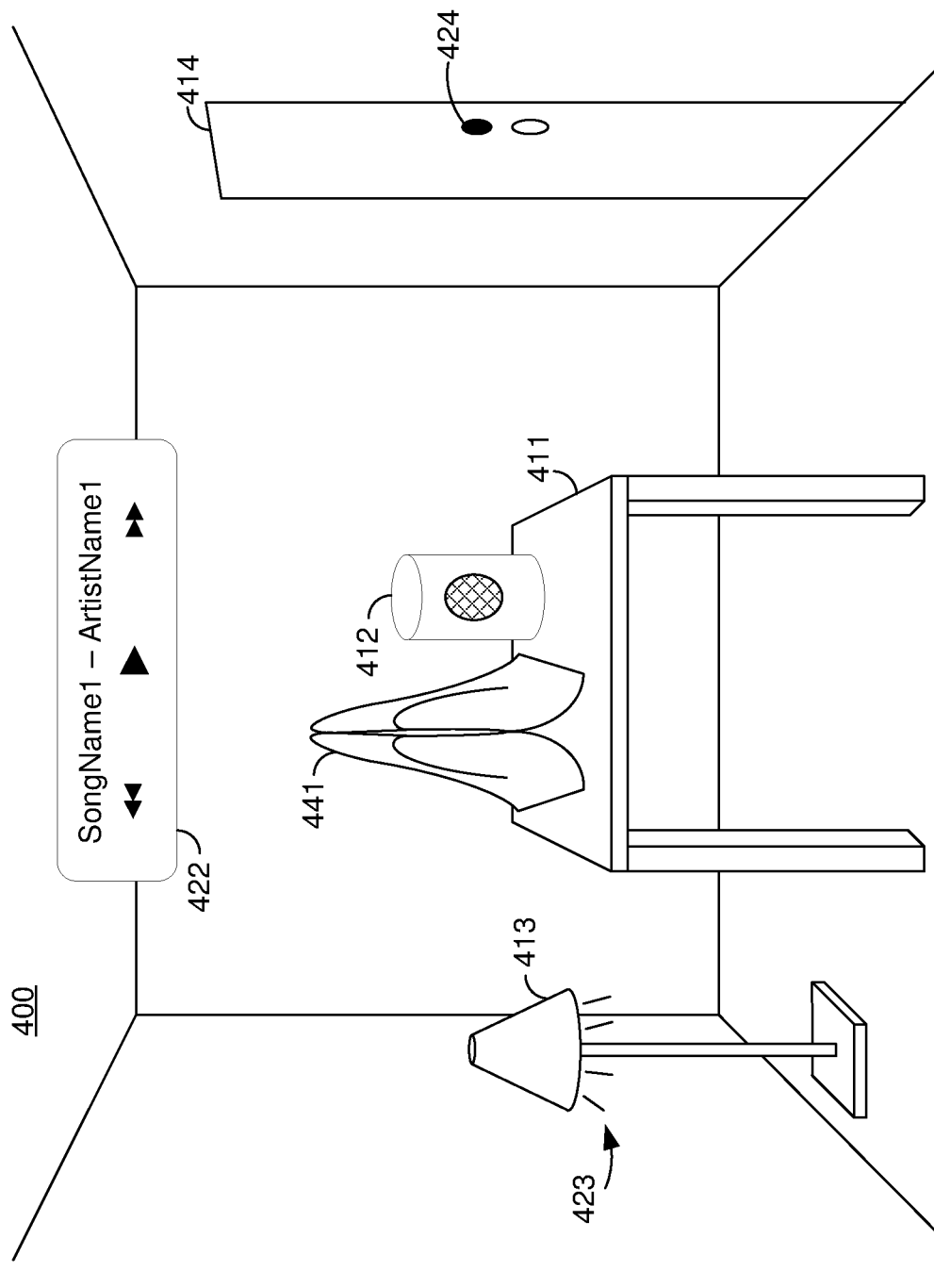
Figure 7A1

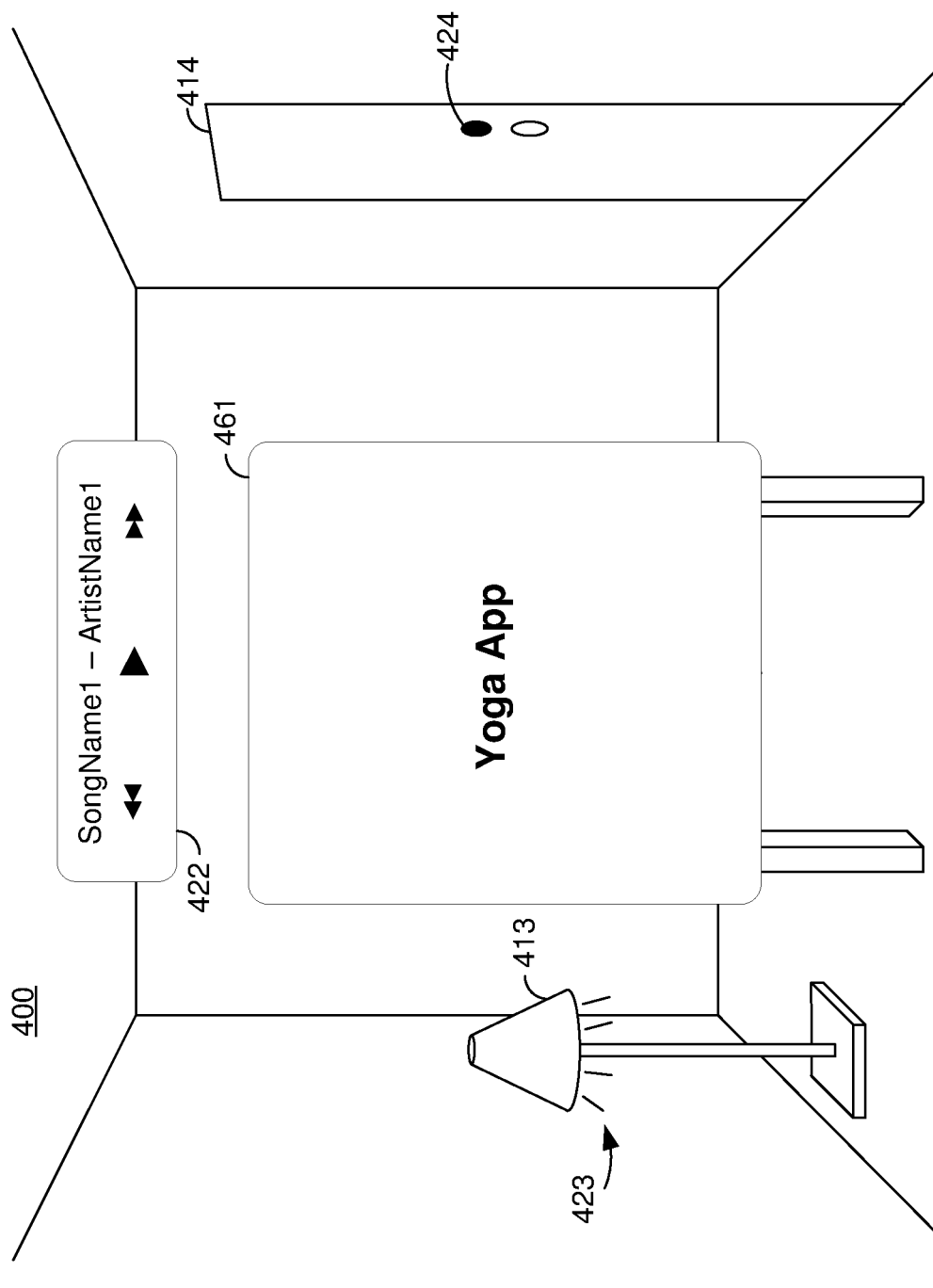
Figure 7A2

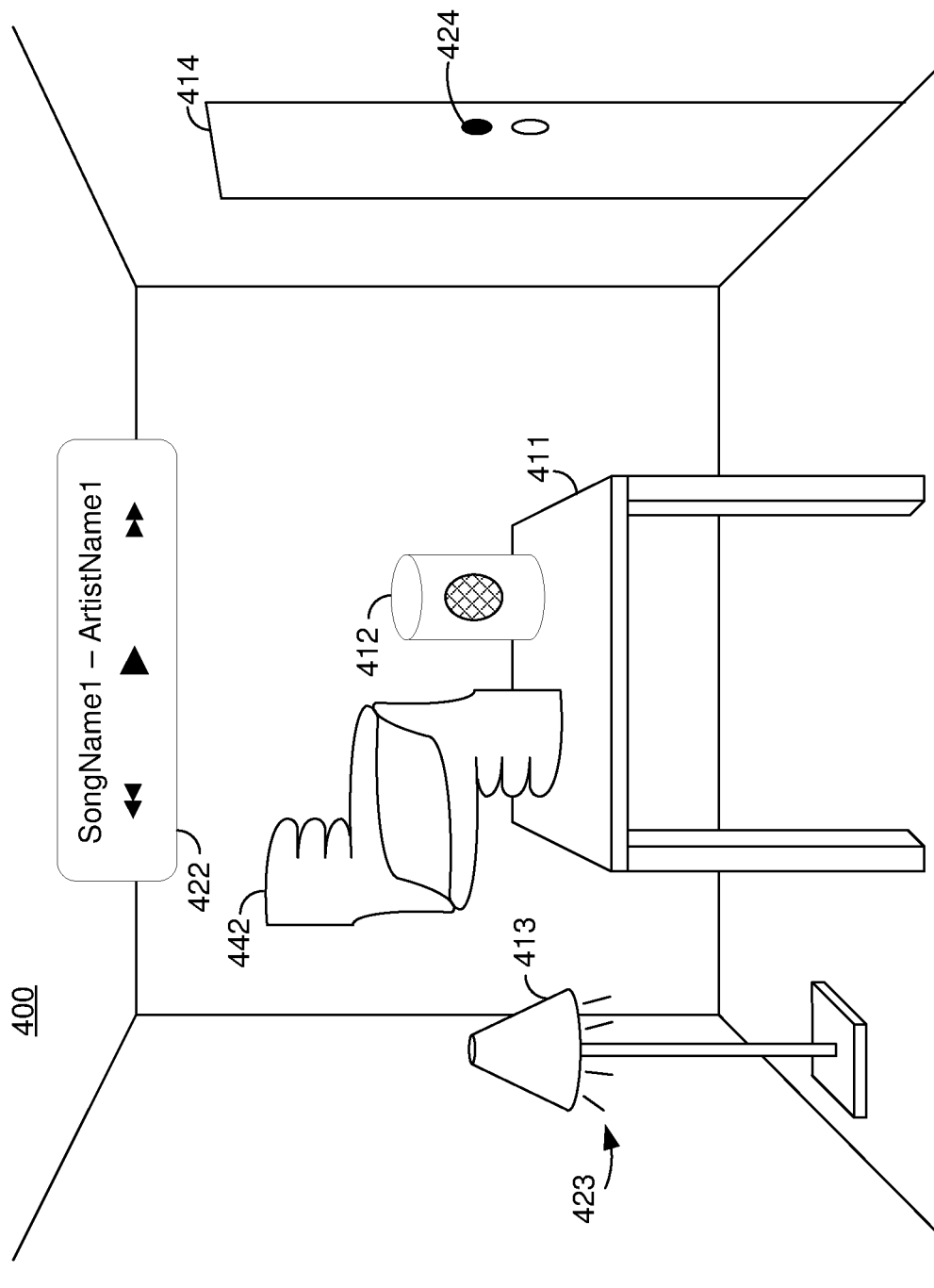
Figure 7B1

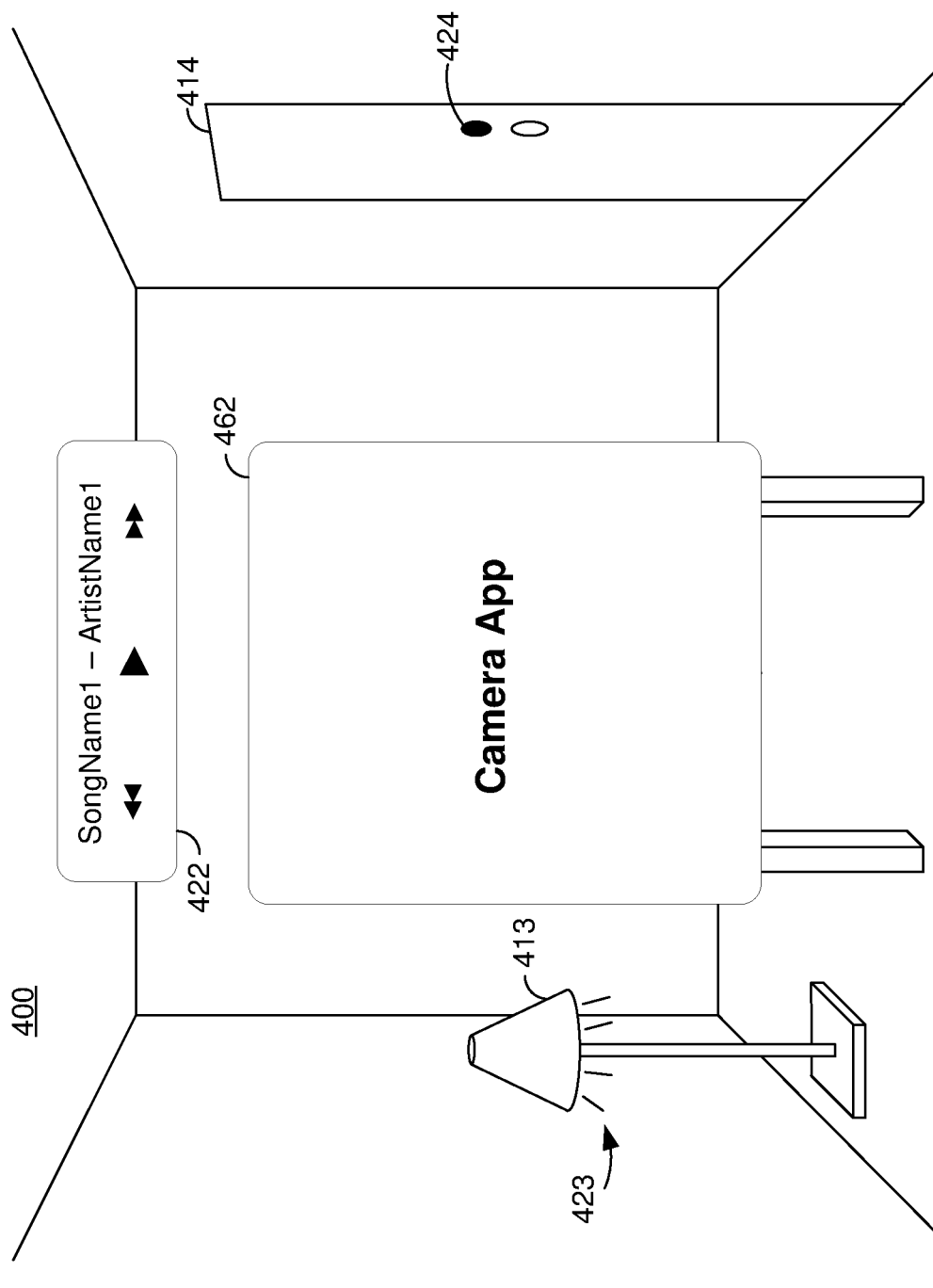
Figure 7B2

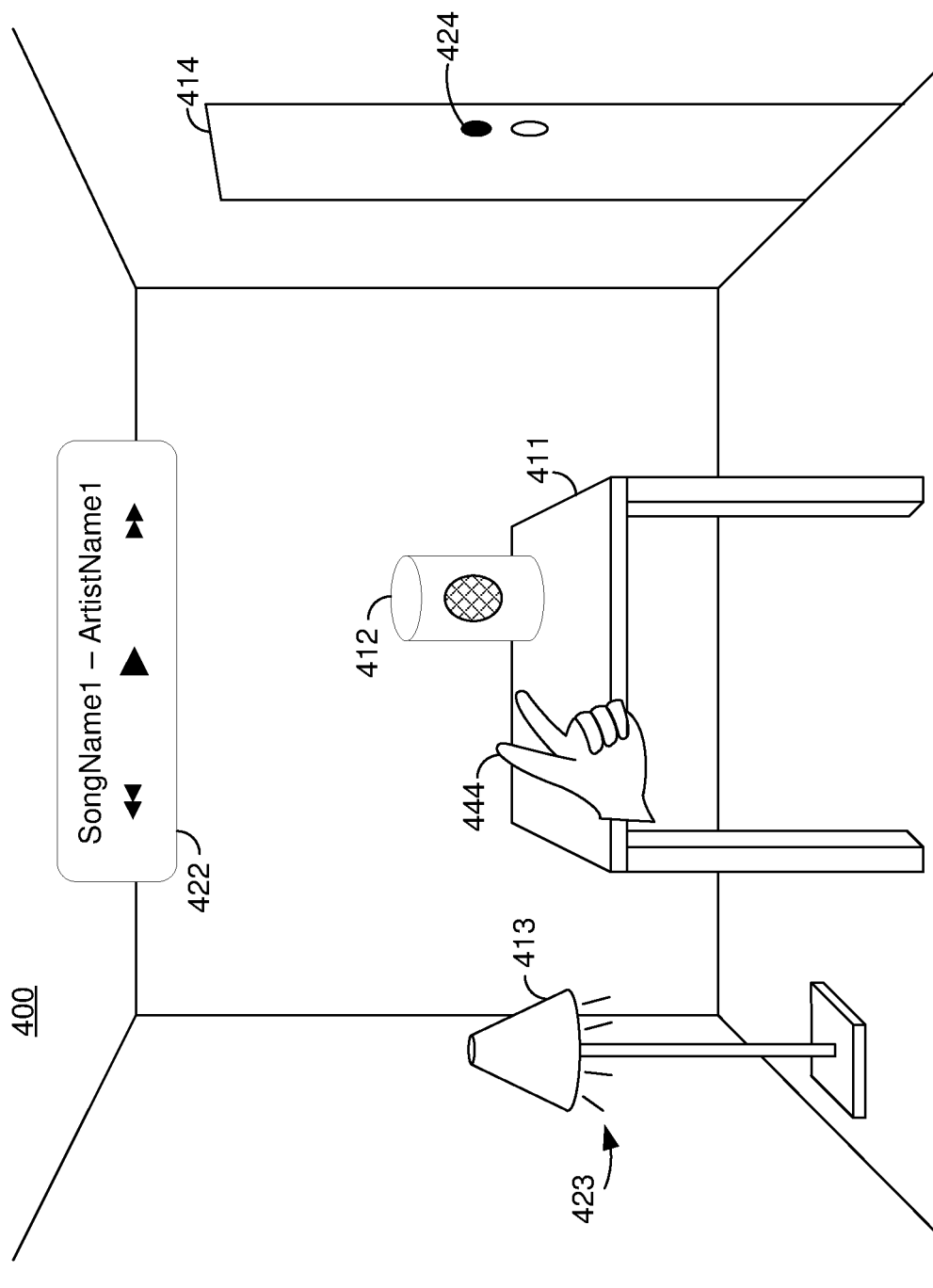
Figure 7C1

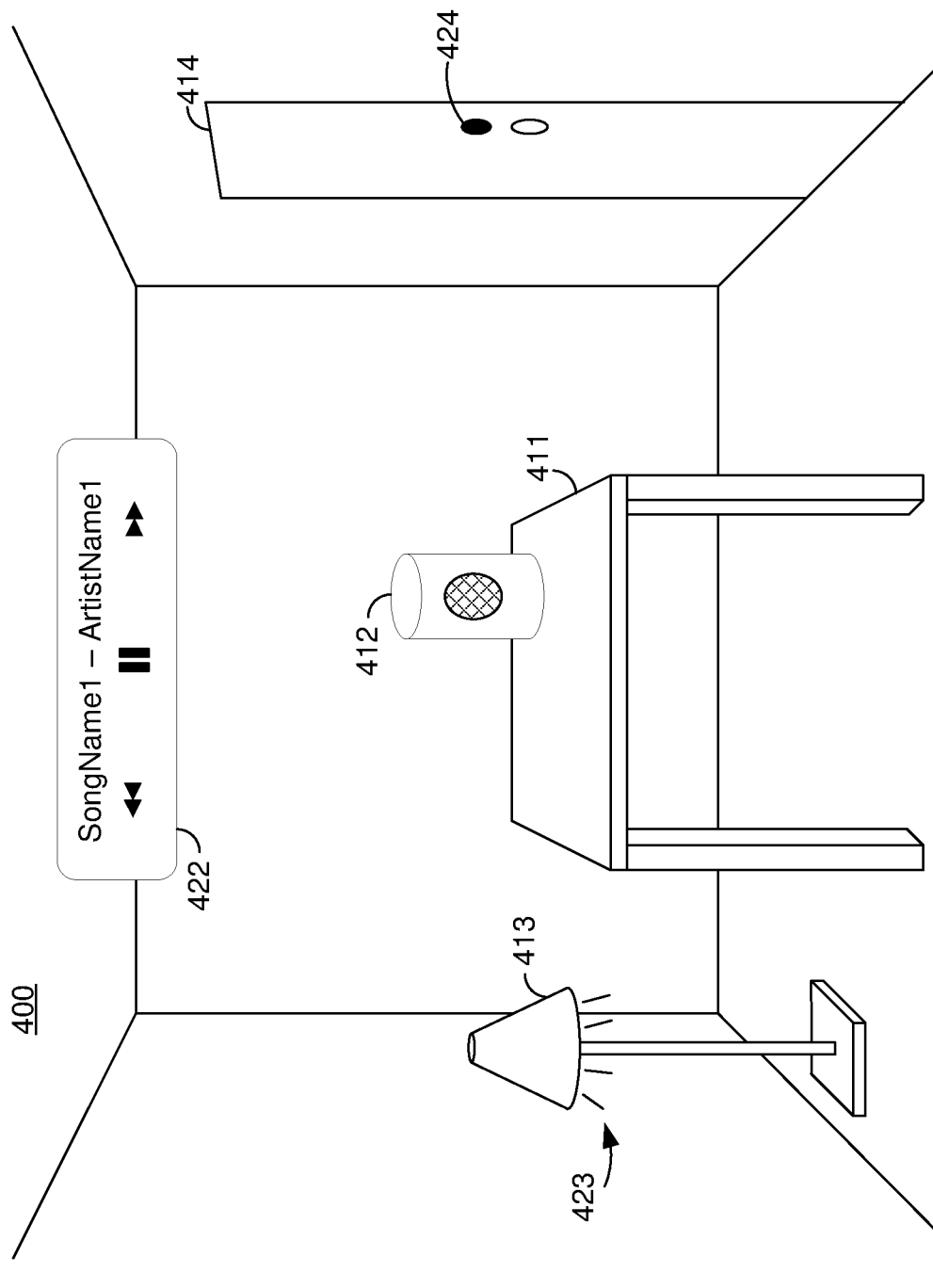
Figure 7C2

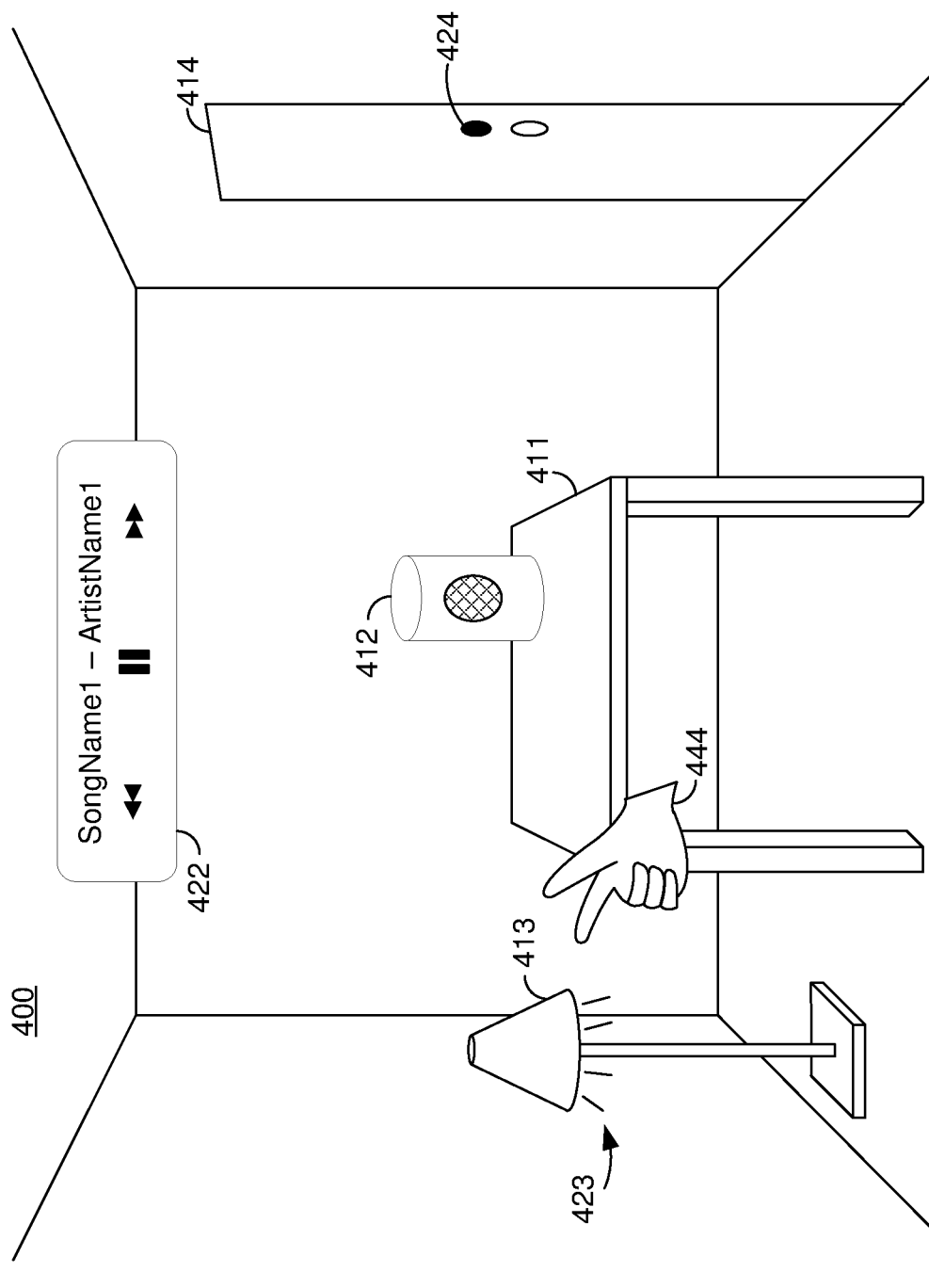
Figure 7D1

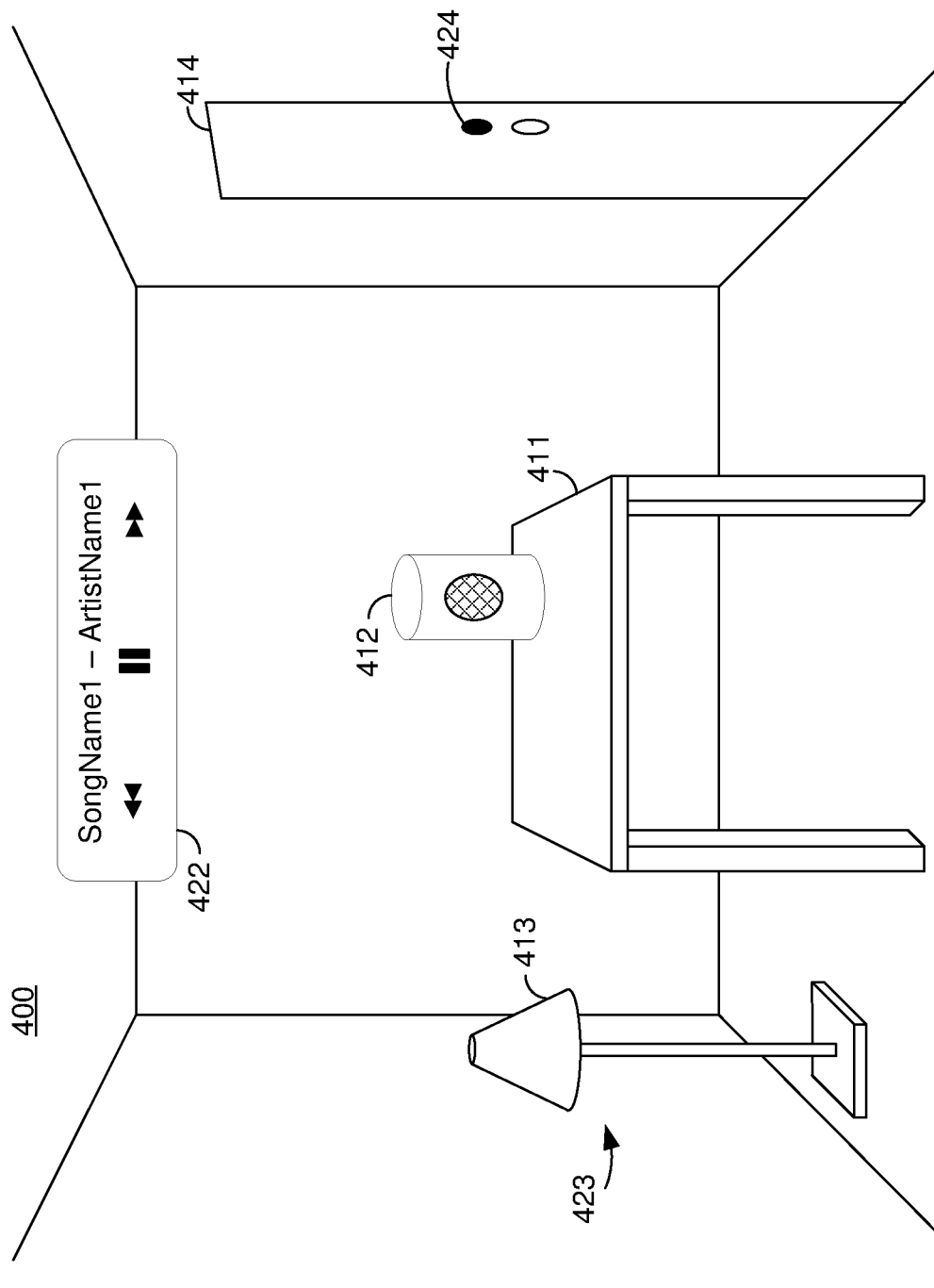
Figure 7D2

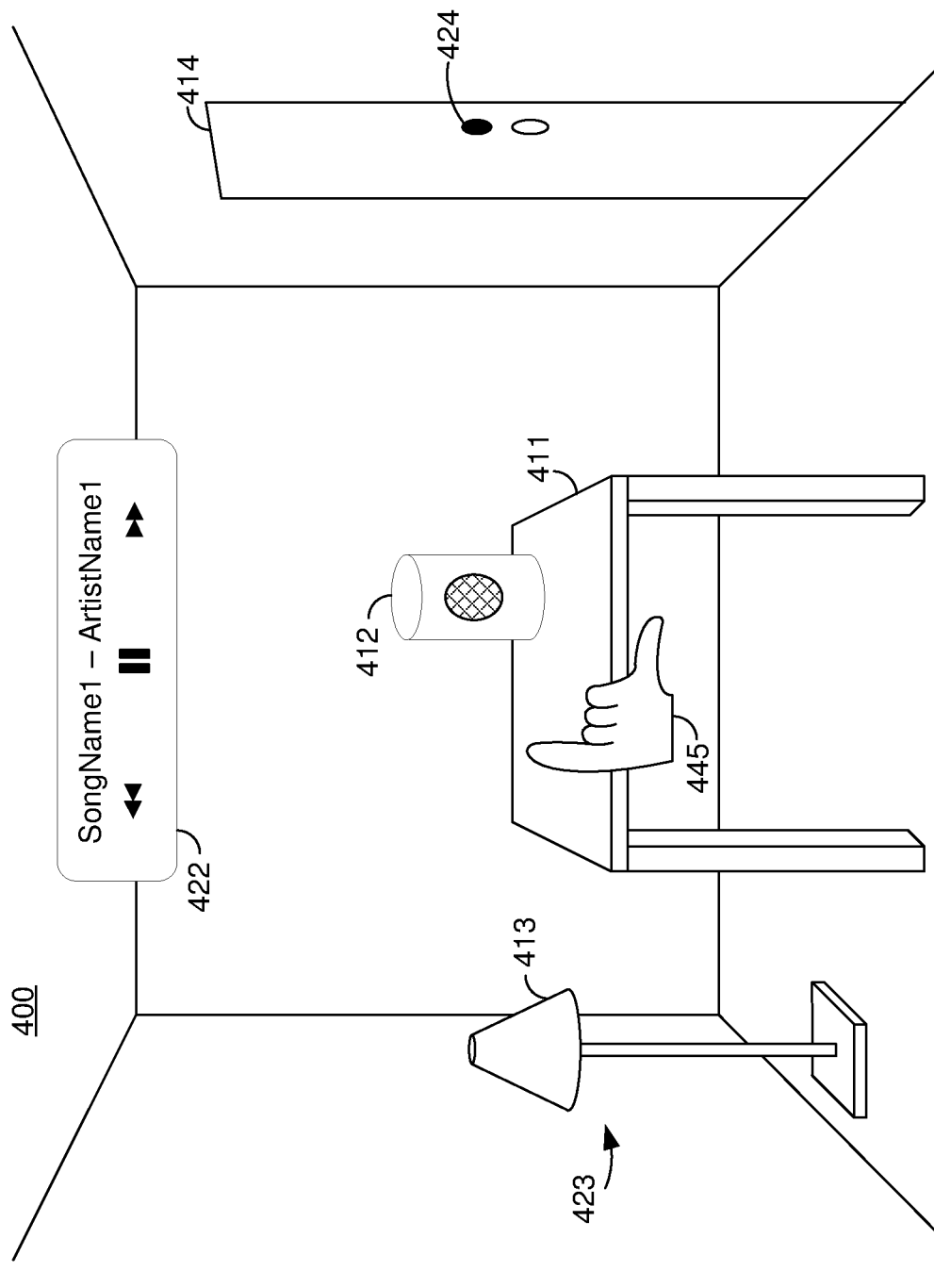
Figure 7E1

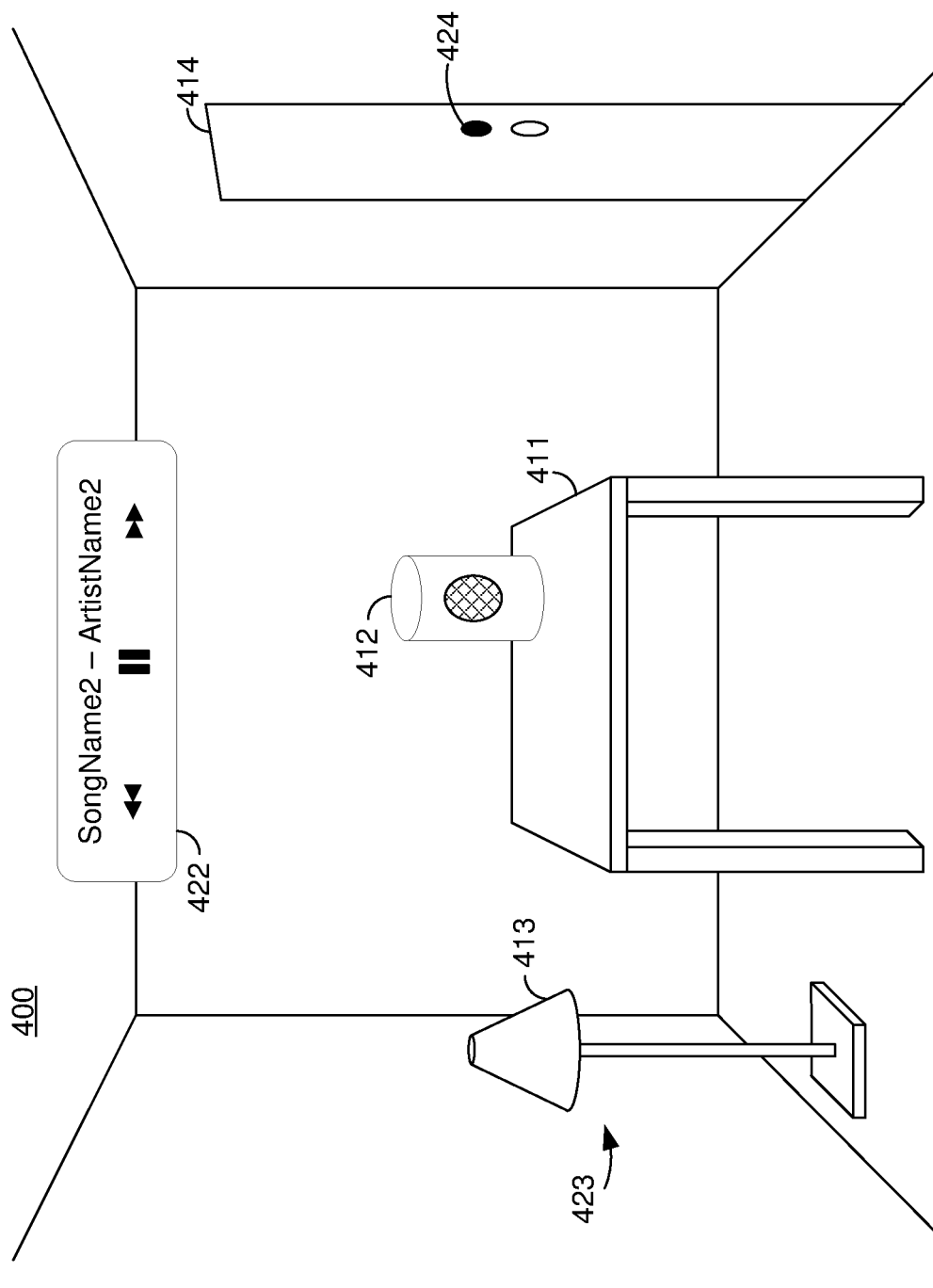
Figure 7E2

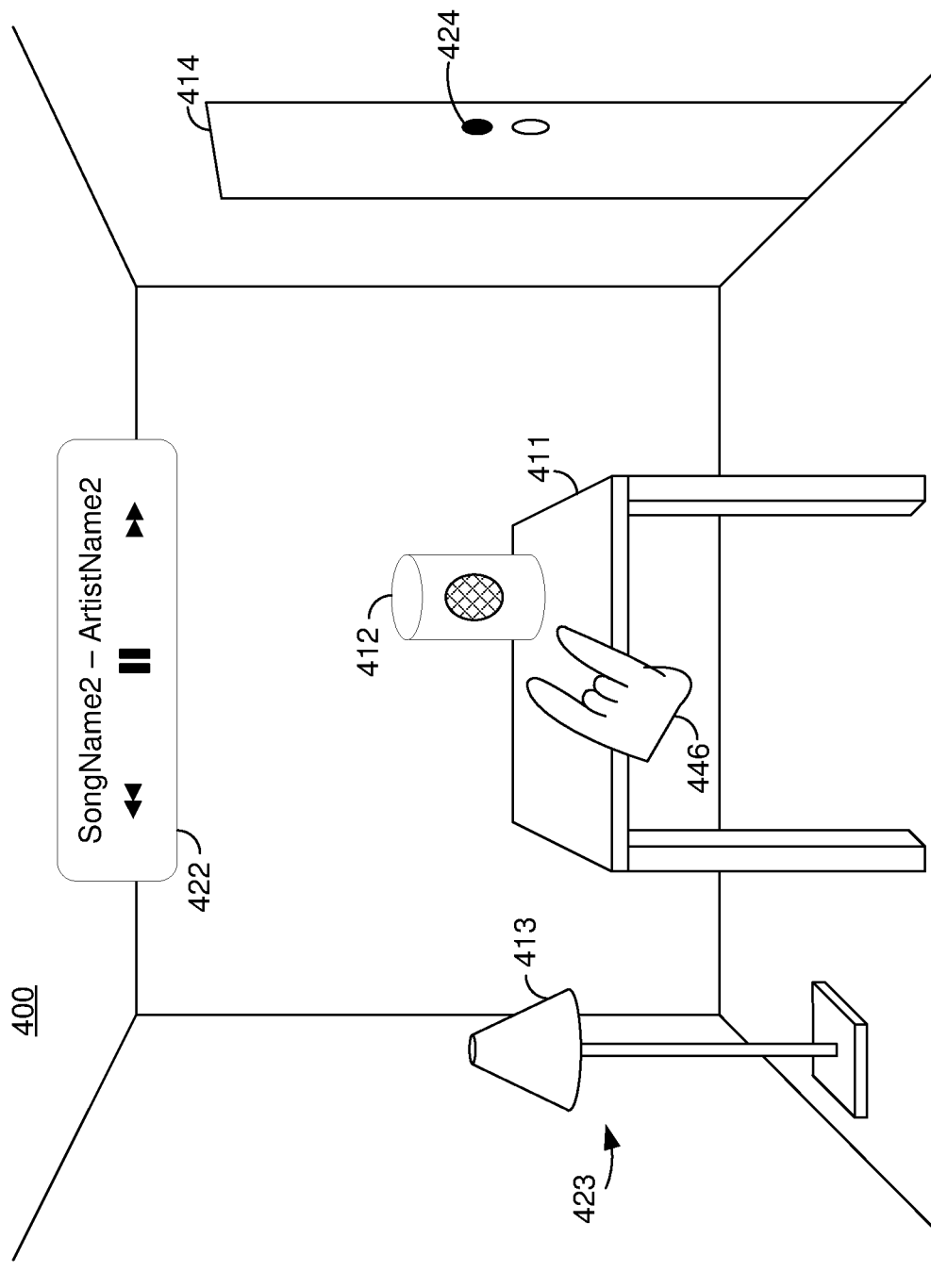
Figure 7F1

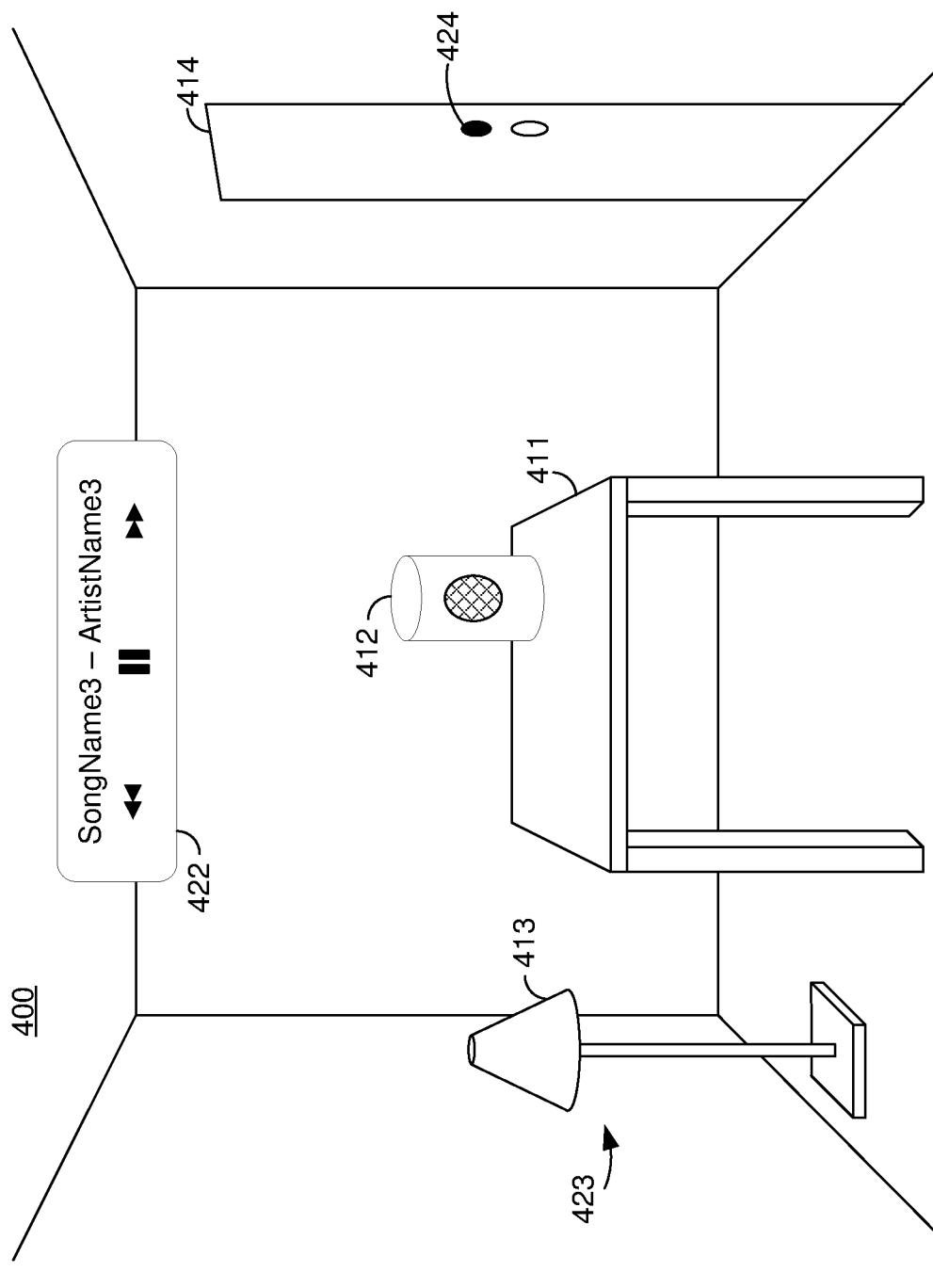
Figure 7F2

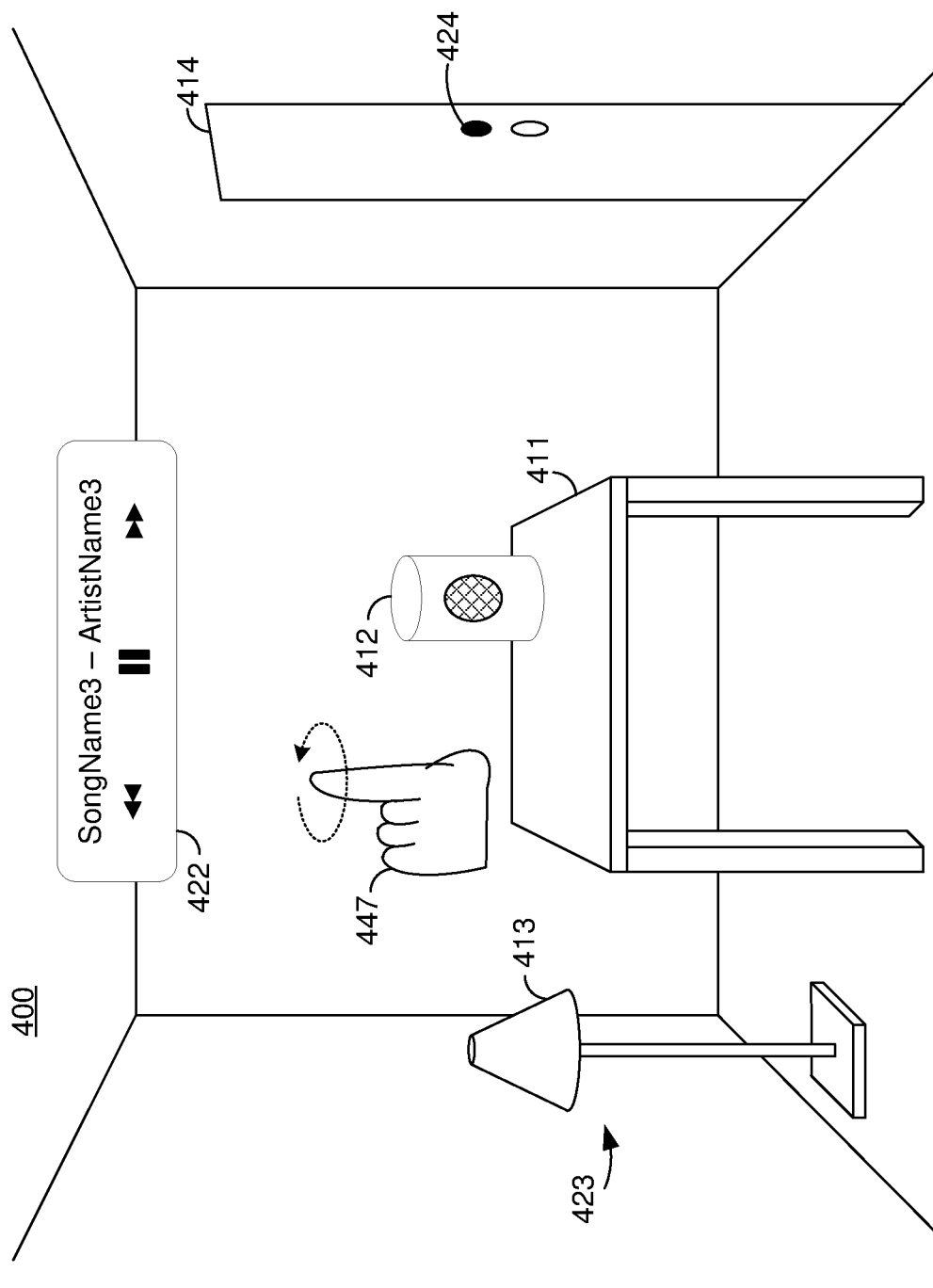
Figure 7G1

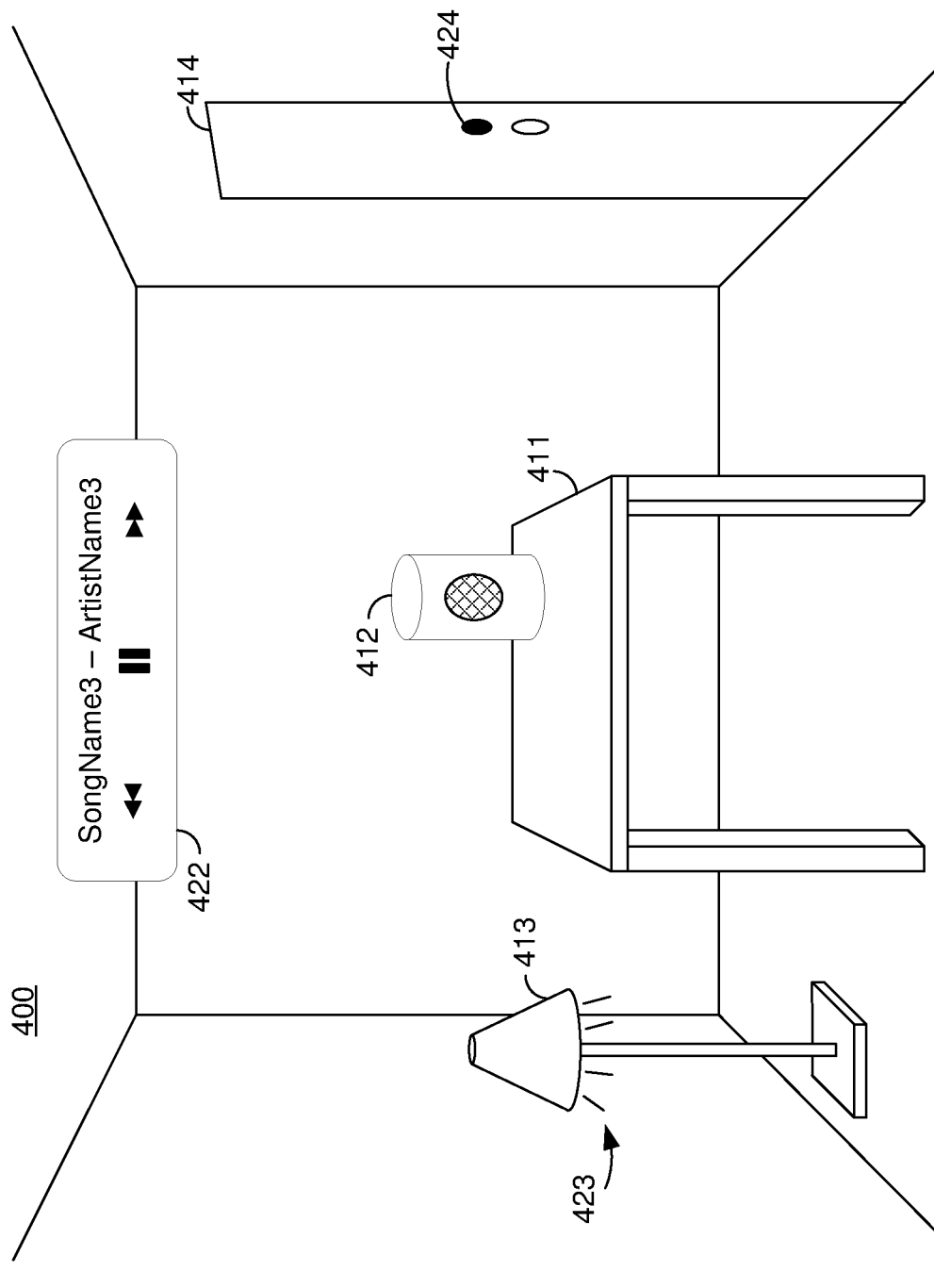
Figure 7G2

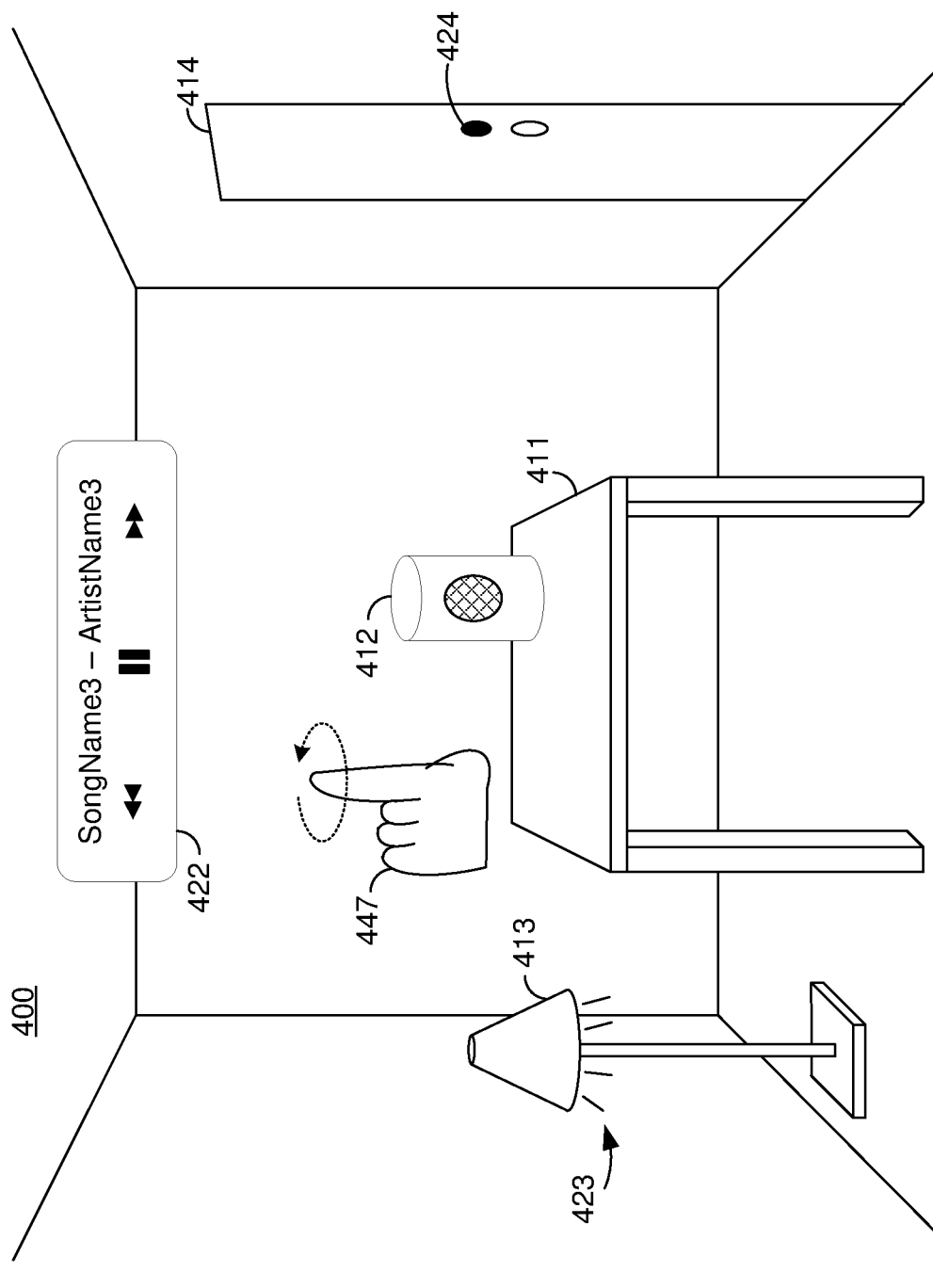
Figure 7H1

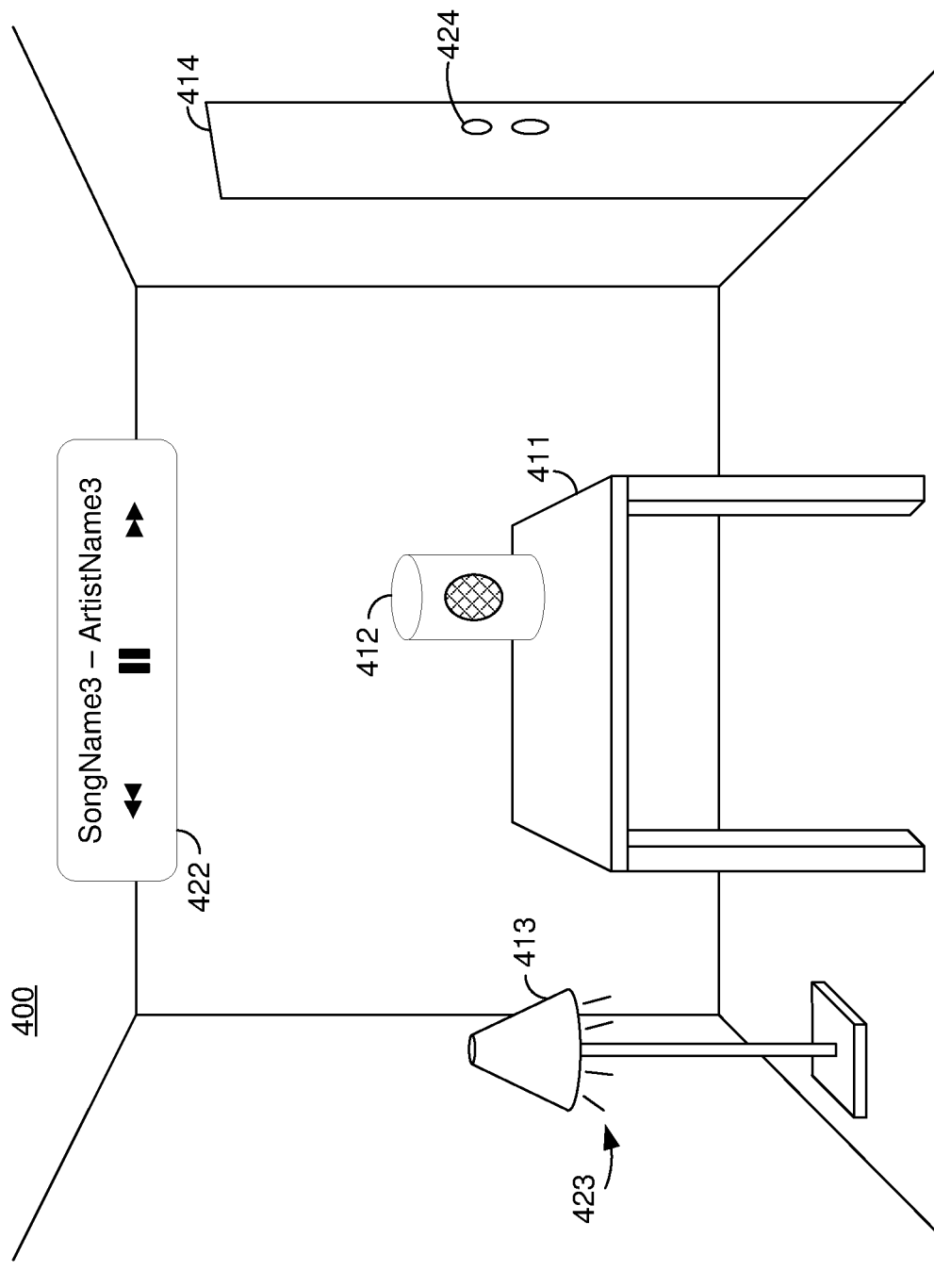
Figure 7H2

METHOD AND DEVICE FOR DEFINING CUSTOM HAND GESTURES

CROSS-REFERENCE TO RELATED APPLICATIONS

This application claims priority to U.S. Provisional Patent App. No. 63/082,957, filed on Sep. 24, 2020, which is hereby incorporated by reference herein in its entirety.

TECHNICAL FIELD

The present disclosure generally relates to systems, methods, and devices for custom hand gestures, and in particular, relates to graphical user interfaces for defining a custom hand gesture and associating a function with the custom hand gesture.

BACKGROUND

In various implementations, an electronic device detects pre-defined hand gestures performed by a user and, in response, performs a corresponding function. However, in various implementations, a user may be physically unable to perform the pre-defined hand gesture or may desire that a hand gesture perform a different function.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 7A1-7H2 illustrate the XR environment of FIG. 4A in response to detecting various hand gestures.

Figure 1:
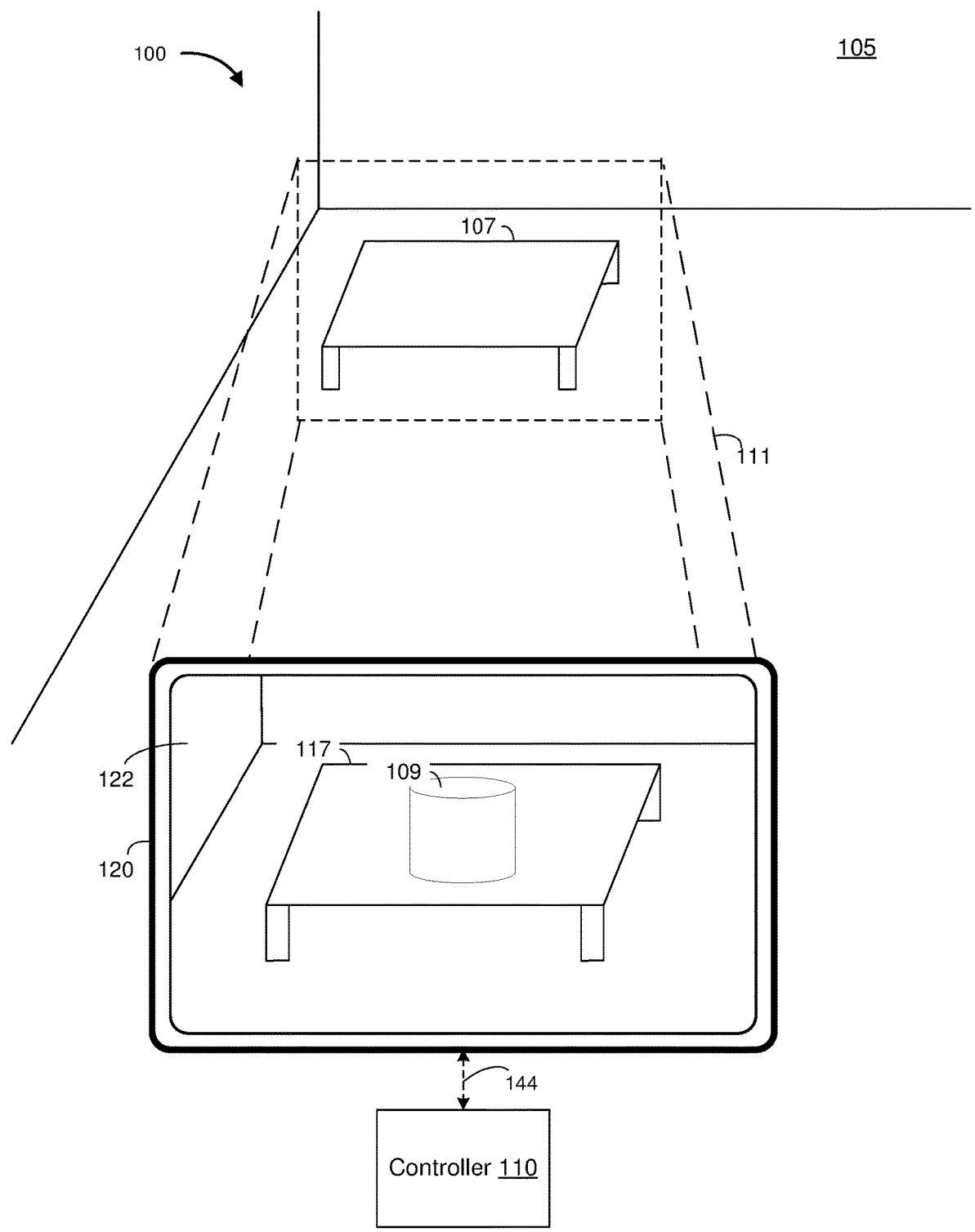
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for defining a custom hand gesture. In various implementations, the method is performed by a device including an image sensor, one or more processors, and non-transitory memory. The method includes receiving a request to define a first hand gesture. The method includes capturing, via the image sensor, a first performance of the first hand gesture. The method includes extracting, from the first performance of the first hand gesture, a first set of features. The method includes defining, based on the first set of features, one or more gesture matching criteria for the first hand gesture.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

In various implementations, an electronic device detects pre-defined hand gestures performed by a user and, in response, performs a corresponding function. Disclosed herein is a graphical user interface for associating a hand gesture, which may be pre-defined or defined by a user, with a function.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 3.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
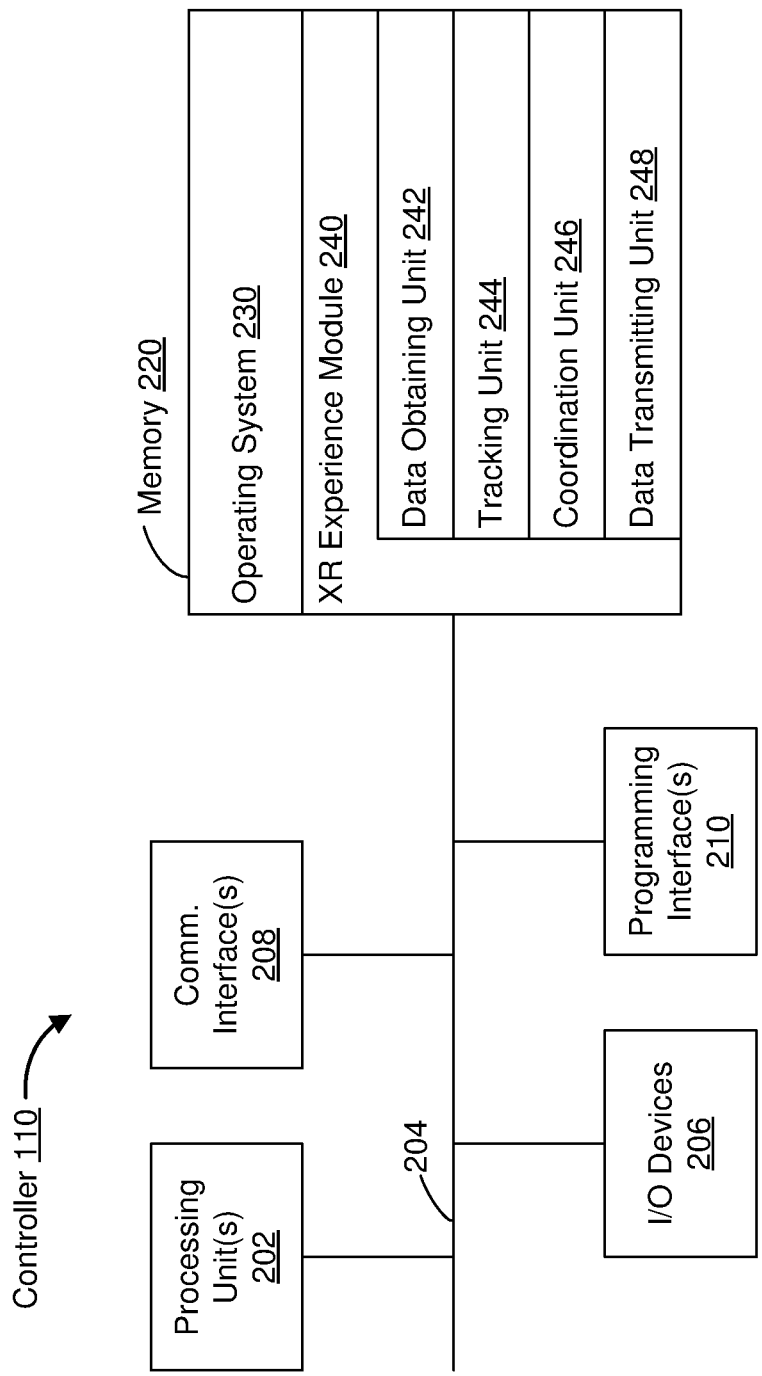
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the physical environment 105 and to track the position/location of at least the electronic device 120 with respect to the physical environment 105 of FIG. 1. To that end, in various implementations, the tracking unit 244 includes instructions and/or logic therefor, and heuristics and metadata therefor.

In some implementations, the coordination unit 246 is configured to manage and coordinate the XR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
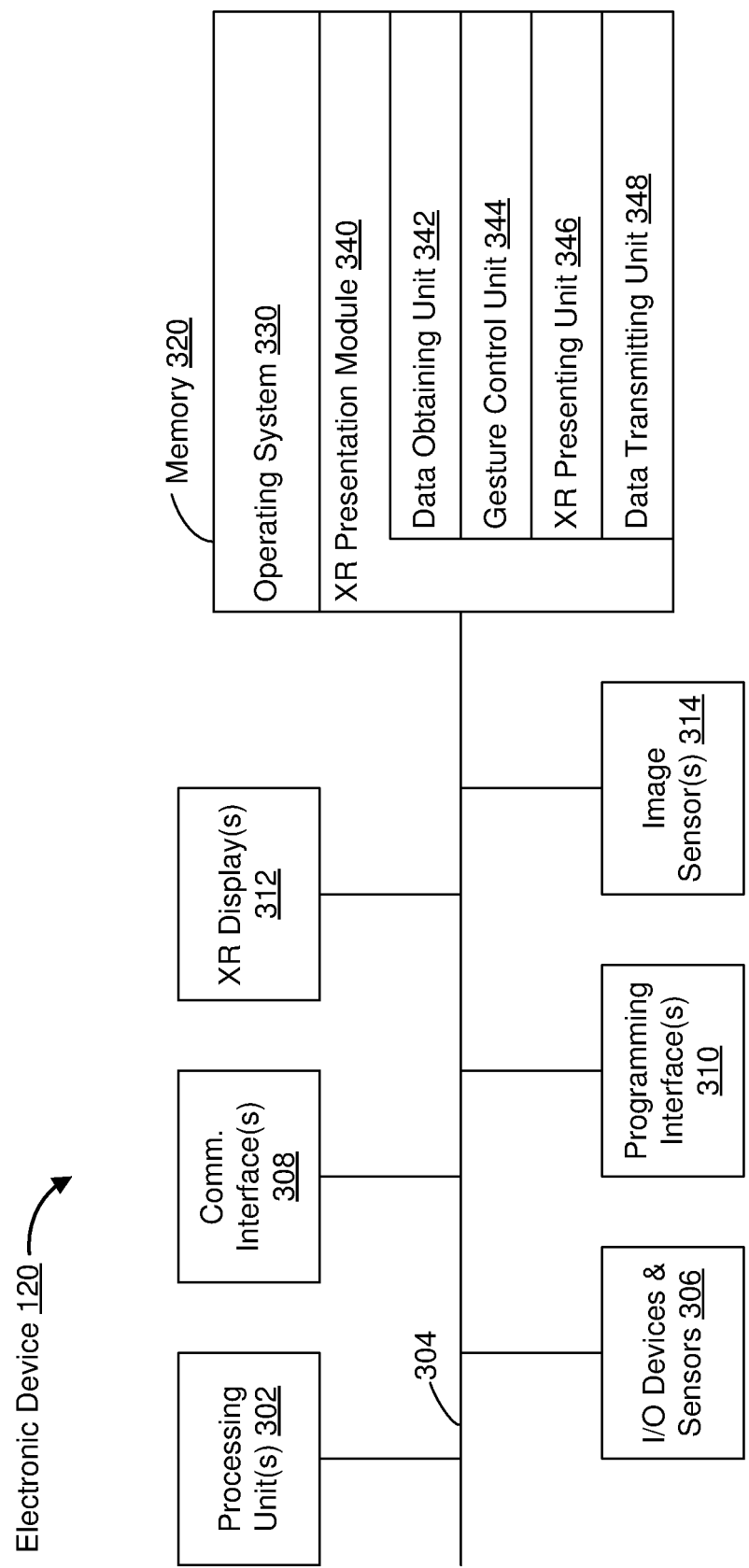
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 312 are capable of presenting MR and VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the physical environment as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, a gesture control unit 344, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1. To that end, in various implementations, the data obtaining unit 342 includes instructions and/or logic therefor, and heuristics and metadata therefor.

In some implementations, the gesture control unit 344 is configured to detect hand gestures and perform corresponding functions. To that end, in various implementations, the gesture control unit 344 includes instructions and/or logic therefor, and heuristics and metadata therefor.

In some implementations, the XR presenting unit 346 is configured to present XR content via the one or more XR displays 312. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110. In some implementations, the data transmitting unit 348 is configured to transmit authentication credentials to the electronic device. To that end, in various implementations, the data transmitting unit 348 includes instructions and/or logic therefor, and heuristics and metadata therefor.

Although the data obtaining unit 342, the gesture control unit 344, the XR presenting unit 346, and the data transmitting unit 348 are shown as residing on a single device (e.g., the electronic device 120), it should be understood that in other implementations, any combination of the data obtaining unit 342, the gesture control unit 344, the XR presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIGS. 4A-4F illustrate an XR environment 400, based on a physical environment, including a graphical user interface for selecting a function and selecting a hand gesture to associate with the function. FIGS. 4A-4F illustrate the XR environment 400 from the perspective of a user of an electronic device. In various implementations, the perspective of the user is from a location of an image sensor of the electronic device. For example, in various implementations, the electronic device is a handheld electronic device and the perspective of the user is from a location of the image sensor of the handheld electronic device directed towards the physical environment. In various implementations, the perspective of the user is from the location of a user of the electronic device. For example, in various implementations, the electronic device is a head-mounted electronic device and the perspective of the user is from a location of the user directed towards the physical environment, generally approximating the field-of-view of the user were the head-mounted electronic device not present. In various implementations, the perspective of the user is from the location of an avatar of the user. For example, in various implementations, the XR environment 400 is a virtual environment and the perspective of the user is from the location of an avatar or other representation of the user directed towards the virtual environment.

Figure 4A:
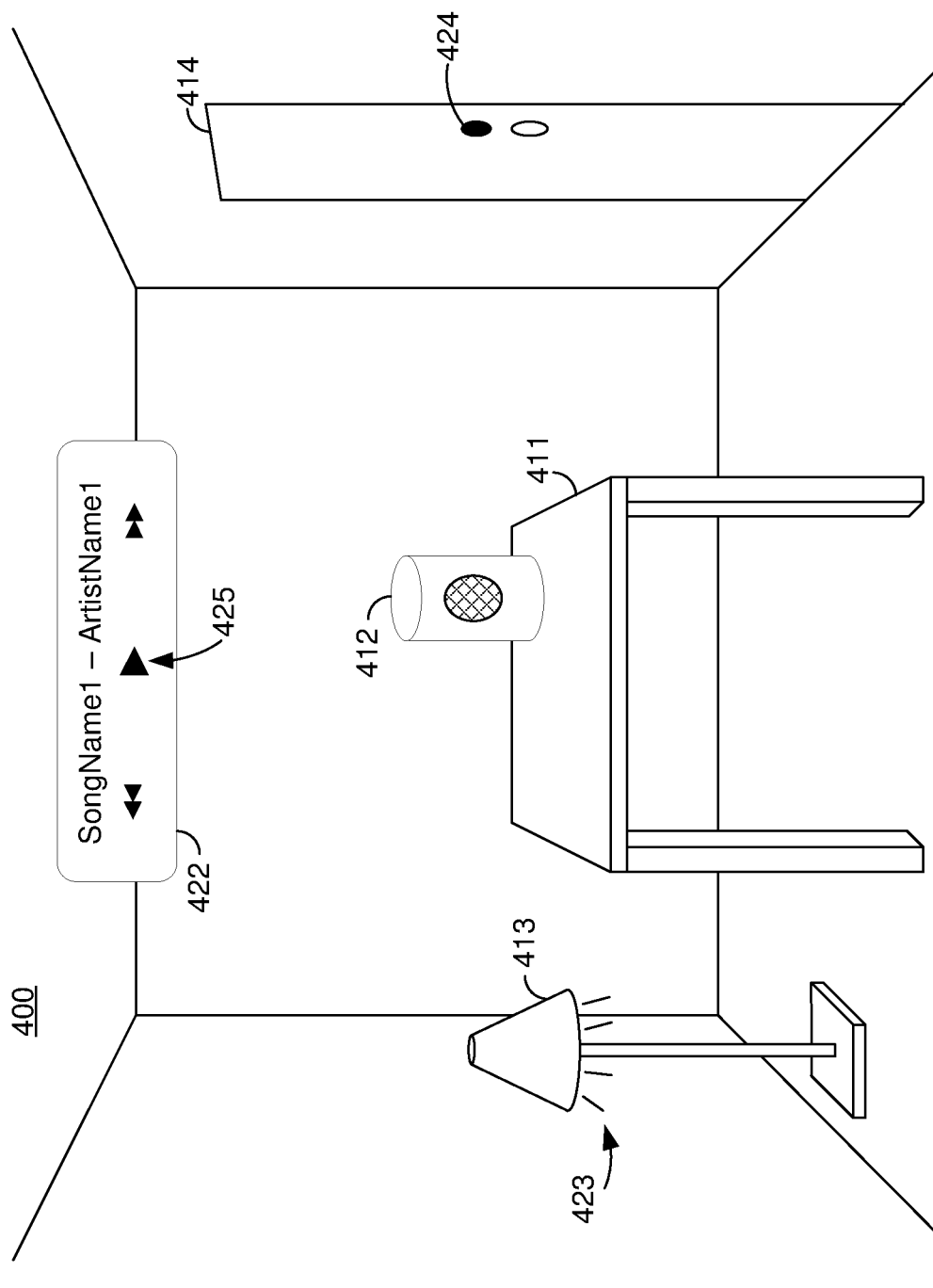
FIGS. 4A-4F illustrate an XR environment, based on a physical environment, including a graphical user interface for selecting a function and selecting a hand gesture to associate with the function.

FIG. 4A illustrates the XR environment 400 during a first time period. In various implementations, the first time period is an instant, a fraction of a second, a few seconds, a few hours, a few days, or any length of time. During the first time period, the XR environment 400 includes a plurality of objects, including one or more real objects (e.g., a table 411, a speaker 412, a lamp 413, and a door 414) and one or more virtual objects (e.g., a playback indicator 422 and a lock indicator 424). In various implementations, certain objects (such as the real objects 411-414 and the lock indicator 424) are displayed at a location in the XR environment 400, e.g., at a location defined by three coordinates in a three-dimensional (3D) XR coordinate system. Accordingly, when the user moves in the XR environment 400 (e.g., changes either position and/or orientation), the objects are moved on the display of the device, but retain their location in the XR environment 400. In various implementations, certain virtual objects (such as the playback indicator 422) are displayed at locations on the display such that when the user moves in the XR environment 400, the objects are stationary on the display on the device.

The state of audio being played by the speaker 412 is indicated by the playback indicator 422. During the first time period, the playback indicator 422 indicates that a first song (entitled "SongName1" by an artist named "ArtistName1") is queued for playback as indicated by the playback indicator 422 including a pause/play affordance 425 in a first state.

The state of the lamp 413 is indicated by the presence or absence of light 423 emanating from the lamp 413. During the first time period, the light 423 is present, indicating that the lamp 413 is on.

The state of the door 414 is indicated by the lock indicator 424. During the first time period, the lock indicator 424 is displayed in a first state (e.g., a first color, such as red) to indicate that the door 414 is locked. At other times (e.g., in FIG. 5H2), the lock indicator 424 is displayed in a second state (e.g., a second color, such as green) to indicate that the door is unlocked.

During the first time period, the device detects a request to associate a hand gesture with a function. In various implementations, the request is detected based on a verbal command issued by a user. In various implementations, the request is detected based on user interaction with one or more affordances, such as menu items or buttons.

Figure 4B:
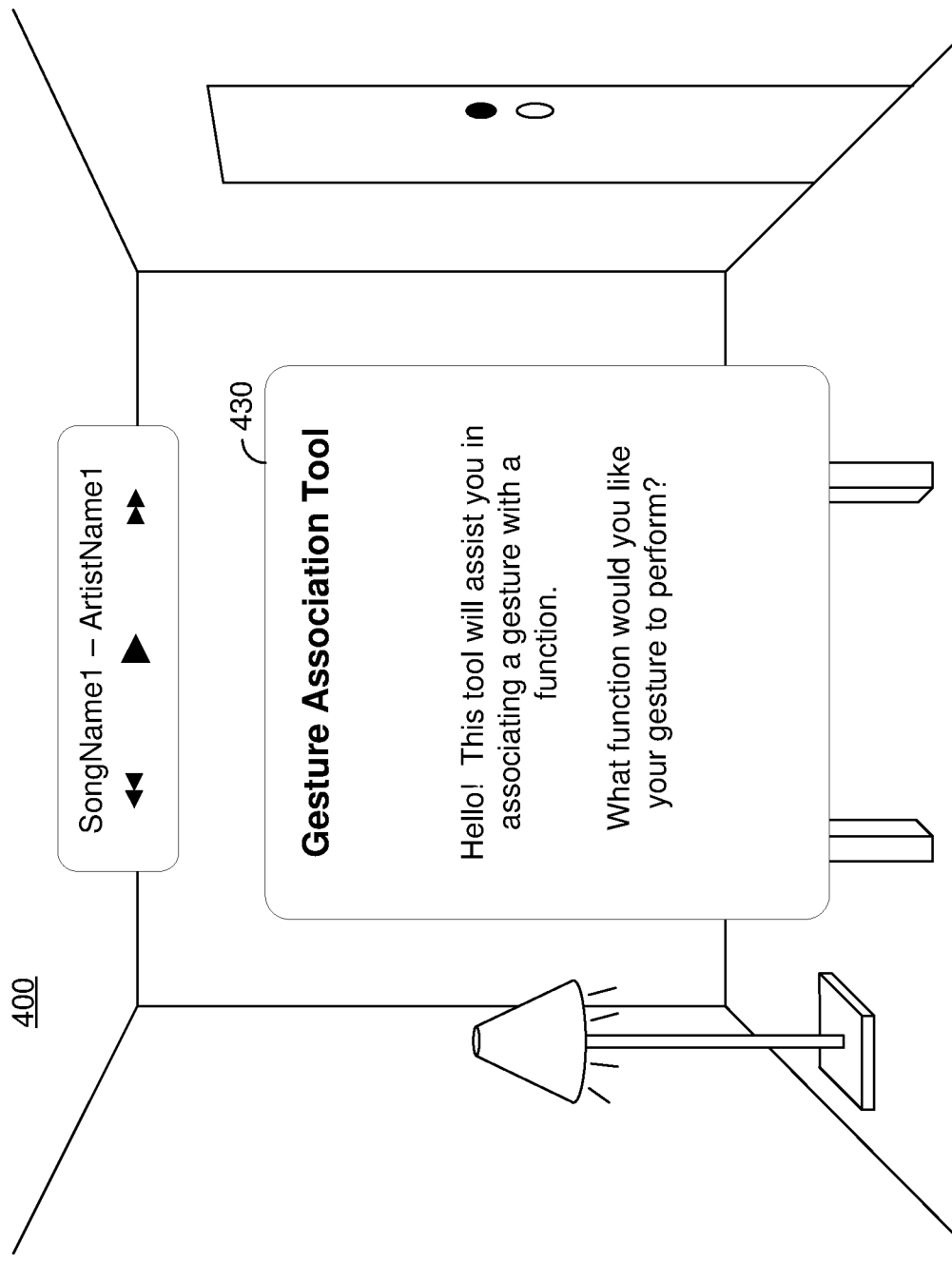

FIG. 4B illustrates the XR environment 400 during a second time period subsequent to the first time period. In various implementations, the second time period is an instant, a fraction of a second, a few seconds, a few hours, a few days, or any length of time. During the second time period, in response to detecting the request to associate a hand gesture with a function, the XR environment 400 includes a gesture association window 430.

During the second time period, the gesture association window 430 includes a prompt requesting that the user select a function to associate with the hand gesture. In various implementations, the user response is a verbal command. For example, during the second time period, the user responds to the prompt by saying "Open Yoga app." In various implementations, the user response includes user interaction with one or more affordances, such as menu items or buttons to select a function from a list of available functions.

Figure 4C:
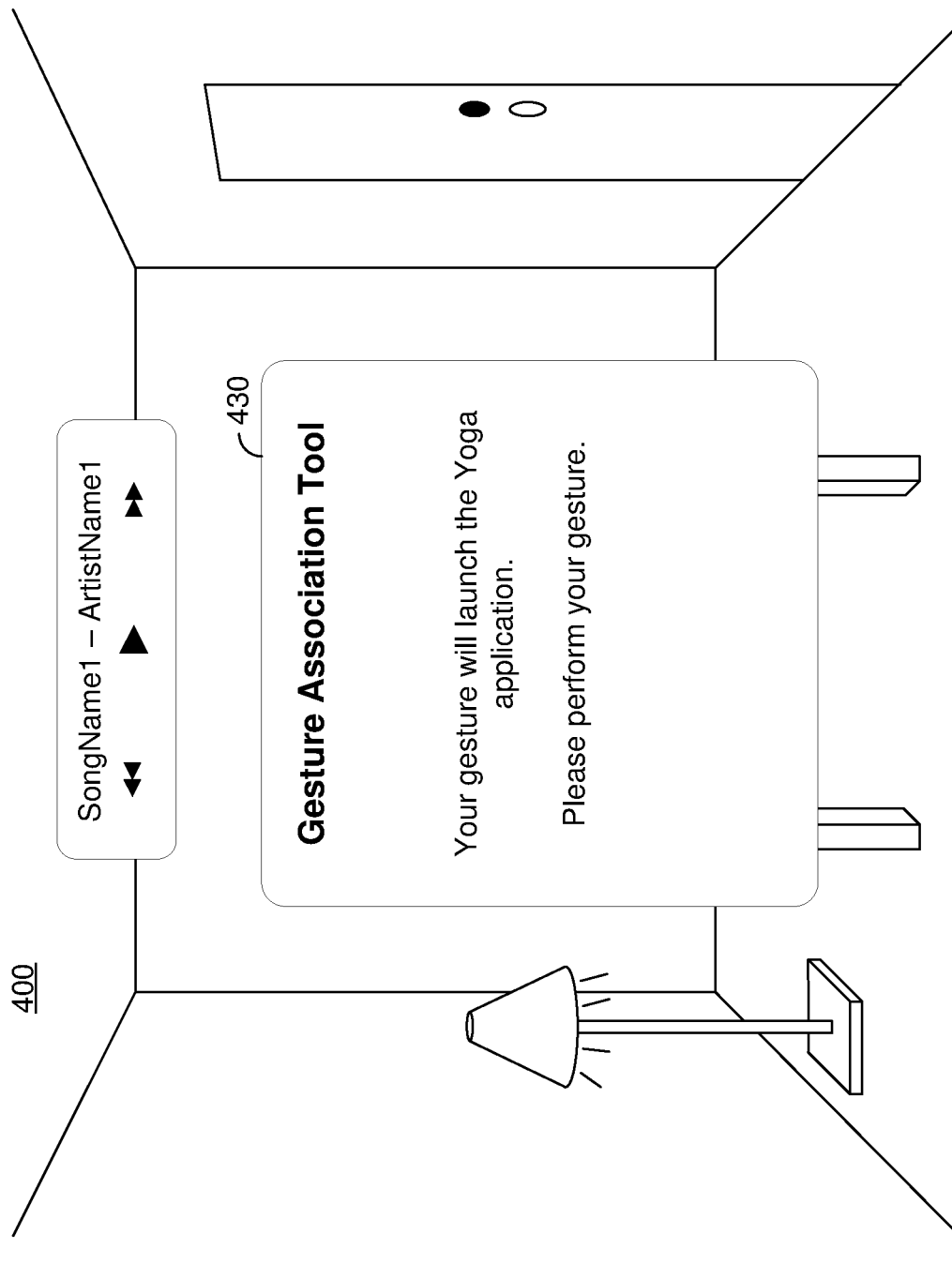

FIG. 4C illustrates the XR environment 400 during a third time period subsequent to the second time period. In various implementations, the third time period is an instant, a fraction of a second, a few seconds, a few hours, a few days, or any length of time. During the third time period, the gesture association window 430 indicates that the hand gesture will launch a Yoga application and includes a prompt requesting that the user perform the hand gesture.

Figure 4D:
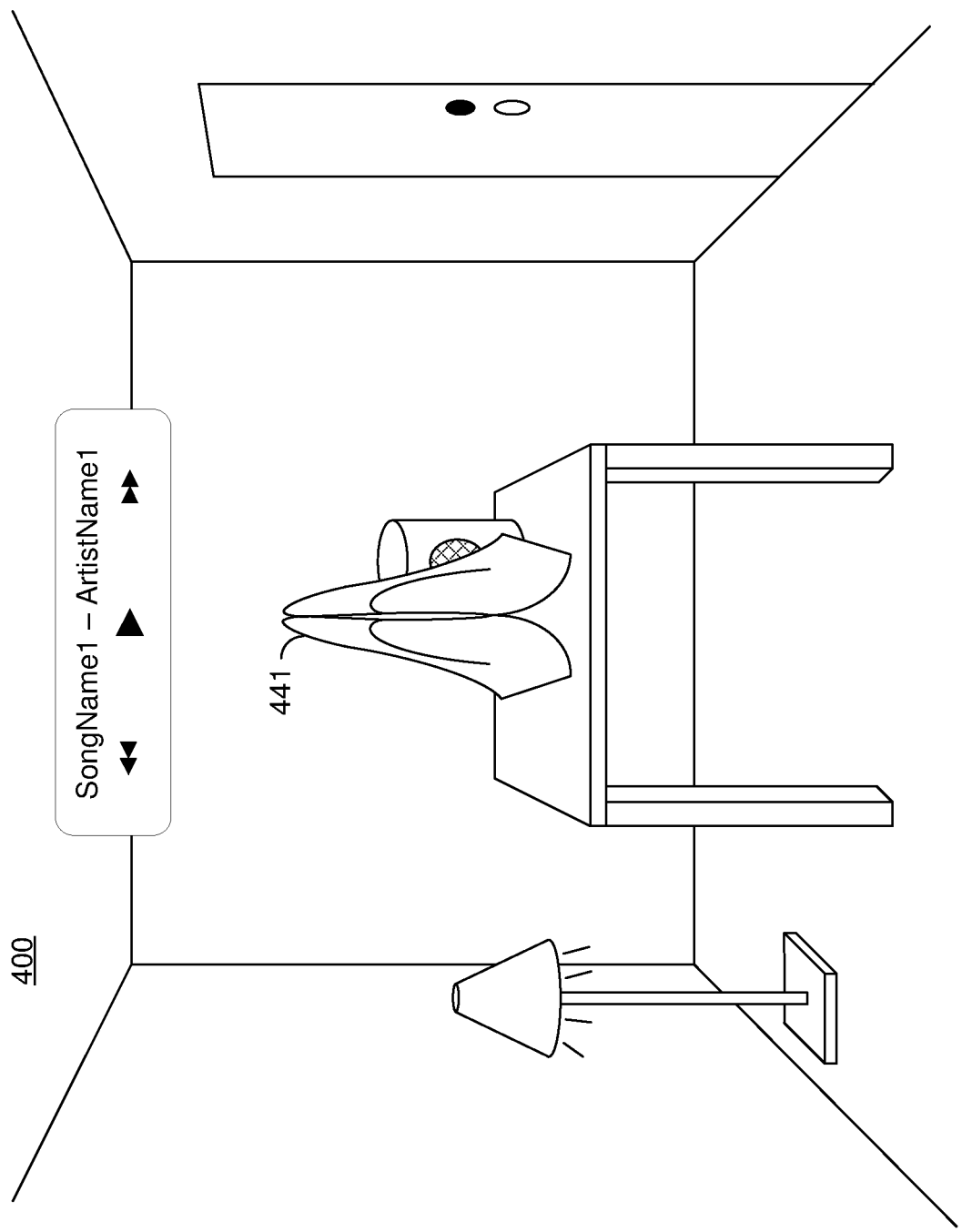

FIG. 4D illustrates the XR environment 400 during a fourth time period subsequent to the third time period. In various implementations, the fourth time period is an instant, a fraction of a second, a few seconds, a few hours, a few days, or any length of time. During the fourth time period, the user performs a namaste gesture 441 in which the user's palms are pressed against one another with the user's thumbs facing the user.

The device detects the user's hands in the XR environment 400 and extracts a set of features from the performance of the namaste gesture 441. In various implementations, the set of features includes features based on the position and/or orientation of various hand elements (e.g., the relative position in three-dimensional space of fingertips, knuckles, and/or palms) at various times during the fourth time period.

Based on the set of features, the device attempts to classify the namaste gesture 441 as a known hand gesture. In various implementations, the device accesses (either locally or remotely) a hand gesture database including data regarding a plurality of hand gestures. Each of the plurality of hand gestures are associated with a corresponding set of gesture matching criteria. If the set of features matches a set of gesture matching criteria for a particular gesture, the device recognizes the hand gesture as the particular gesture. For example, during the fourth time period, the device recognizes the namaste gesture 441 as a particular hand gesture named "Namaste".

Figure 4E:
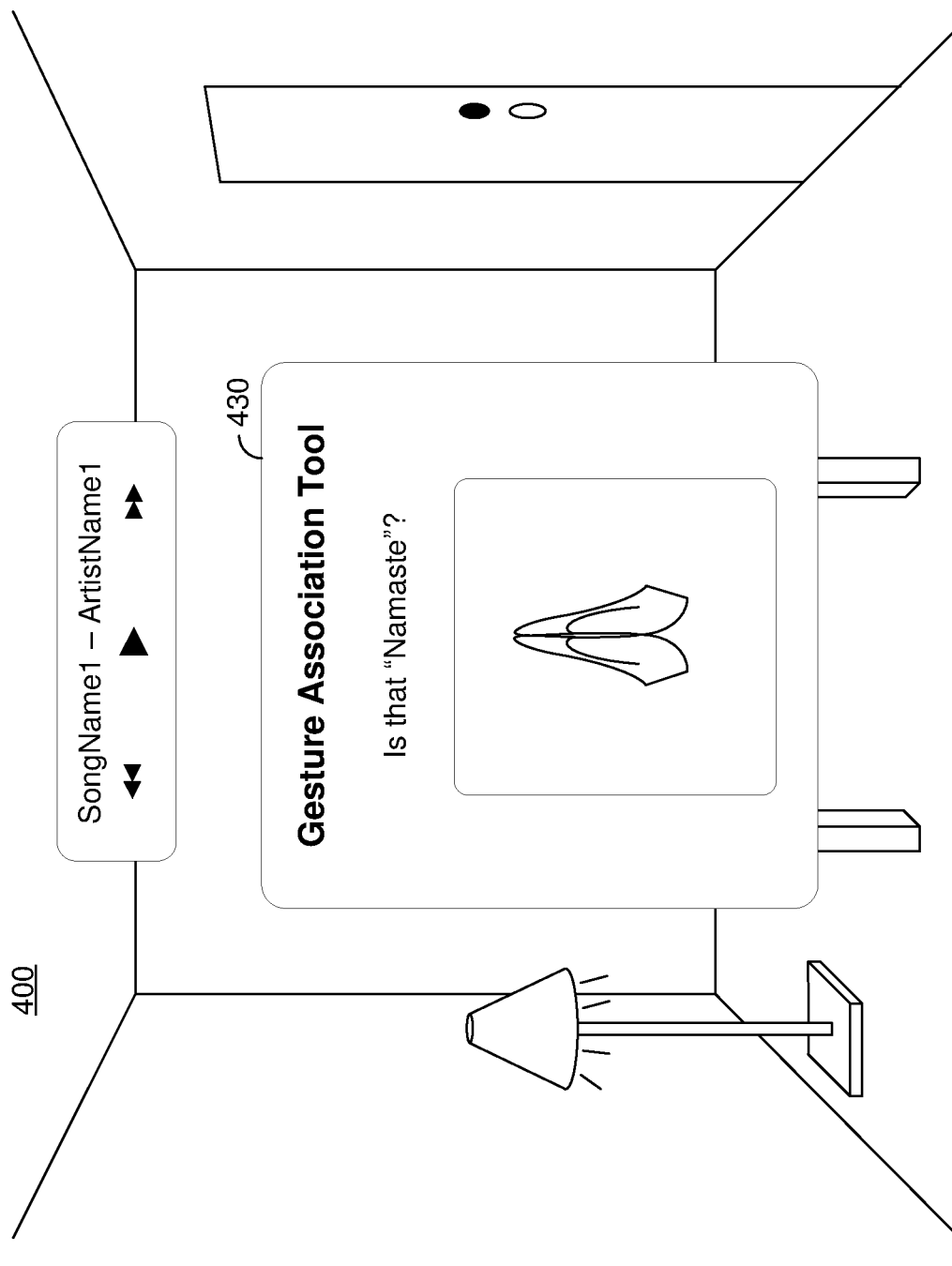

FIG. 4E illustrates the XR environment 400 during a fifth time period subsequent to the fourth time period. In various implementations, the fifth time period is an instant, a fraction of a second, a few seconds, a few hours, a few days, or any length of time. During the fifth time period, in response to recognizing the namaste gesture 441, the gesture association window 430 includes a prompt requesting that the user confirm that the gesture performed is the "Namaste" gesture. In various implementations, and as illustrated in FIG. 4E, the gesture association window 430 further includes a graphical representation of the recognized gesture.

During the fifth time period, the user confirms that the namaste gesture 441 performed by the user corresponds to the "Namaste" gesture. In various implementations, the user response is a verbal command. For example, during the second time period, the user responds to the prompt by saying "Yes." In various implementations, the user response includes user interaction with one or more affordances, such as a "Yes" button or a "No" button, or performance of a confirmation hand gesture or a cancel hand gesture.

Figure 4F:
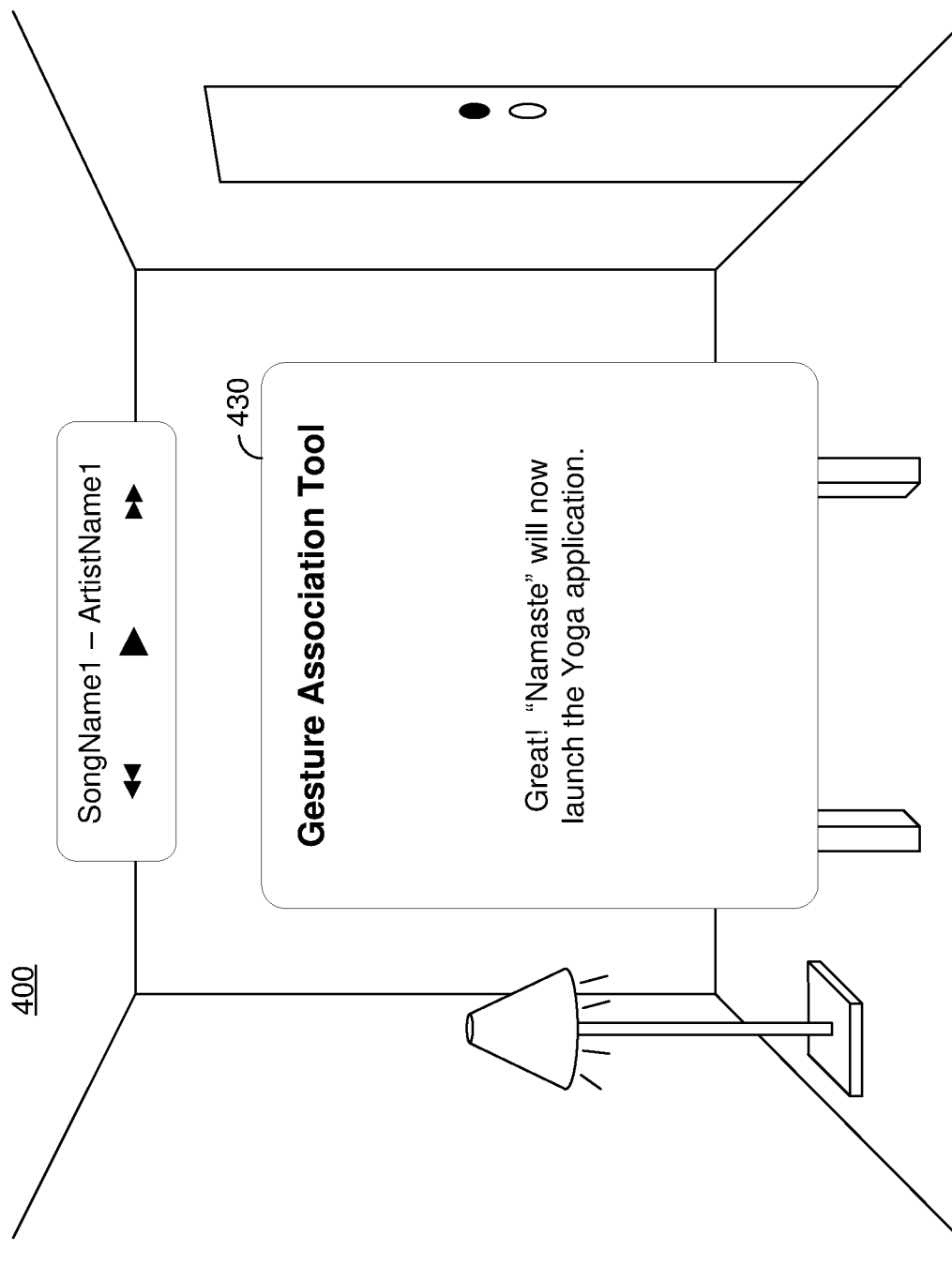

FIG. 4F illustrates the XR environment 400 during a sixth time period subsequent to the fifth time period. In various implementations, the sixth time period is an instant, a fraction of a second, a few seconds, a few hours, a few days, or any length of time. During the sixth time period, in response to the user confirming that the namaste gesture 441 corresponds to the "Namaste" gesture, the gesture association window 430 includes a confirmation that performing the "Namaste" gesture will open the Yoga application.

FIGS. 5A-5L illustrate the XR environment 400 of FIG. 4A including a graphical user interface for selecting a function and defining a hand gesture to associate with the function. Like FIGS. 4A-4F, FIGS. 5A-5L illustrate the XR environment 400 from the perspective of a user of an electronic device.

Figure 5A:
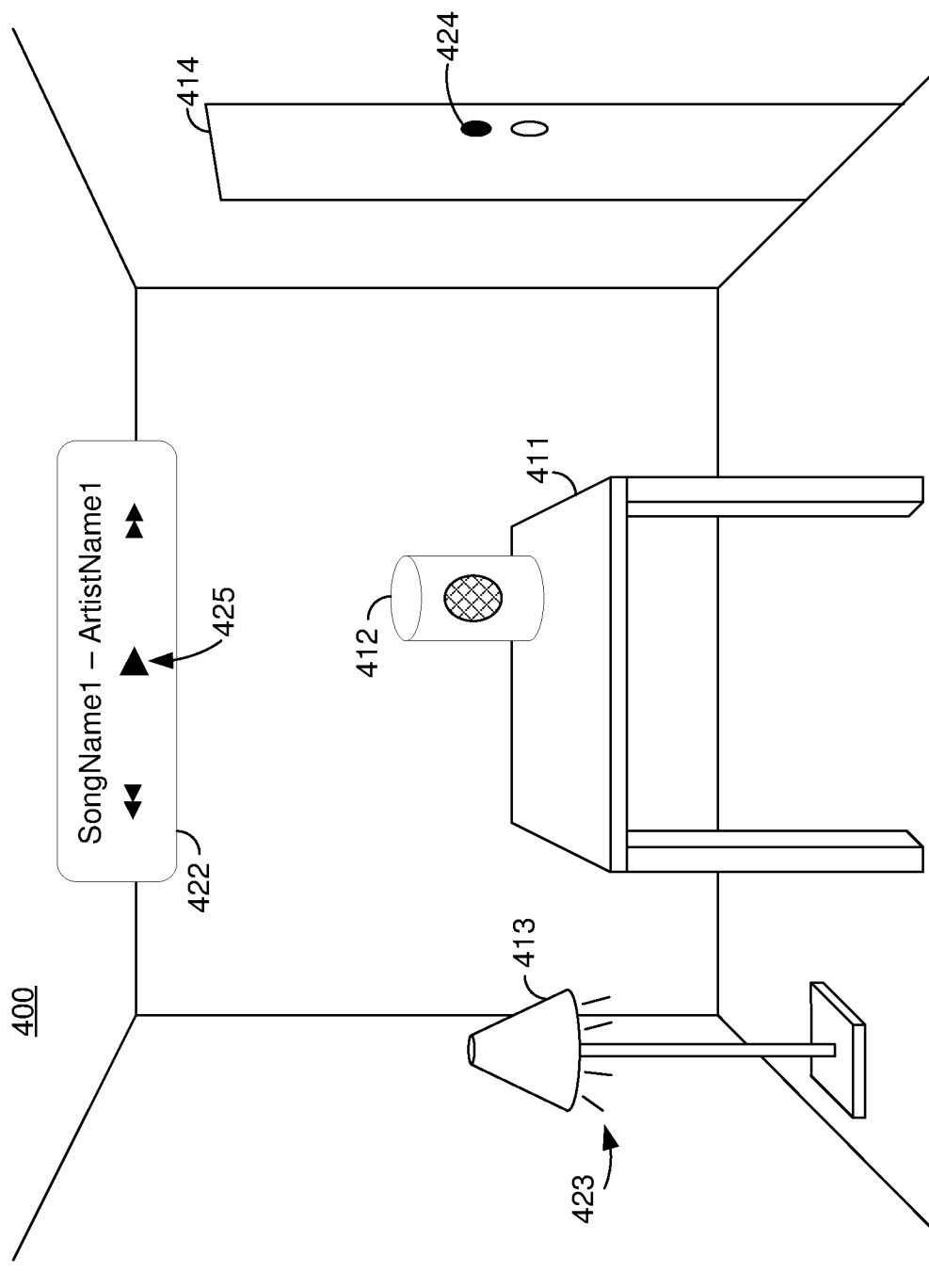
FIGS. 5A-5L illustrate the XR environment of FIG. 4A including a graphical user interface for selecting a function and defining a hand gesture to associate with the function.

FIG. 5A illustrates the XR environment 400 during a first time period. In various implementations, the first time period is an instant, a fraction of a second, a few seconds, a few hours, a few days, or any length of time. During the first time period, the device detects a request to associate a hand gesture with a function. In various implementations, the request is detected based on a verbal command issued by a user. In various implementations, the request is detected based on user interaction with one or more affordances, such as menu items or buttons.

Figure 5B:
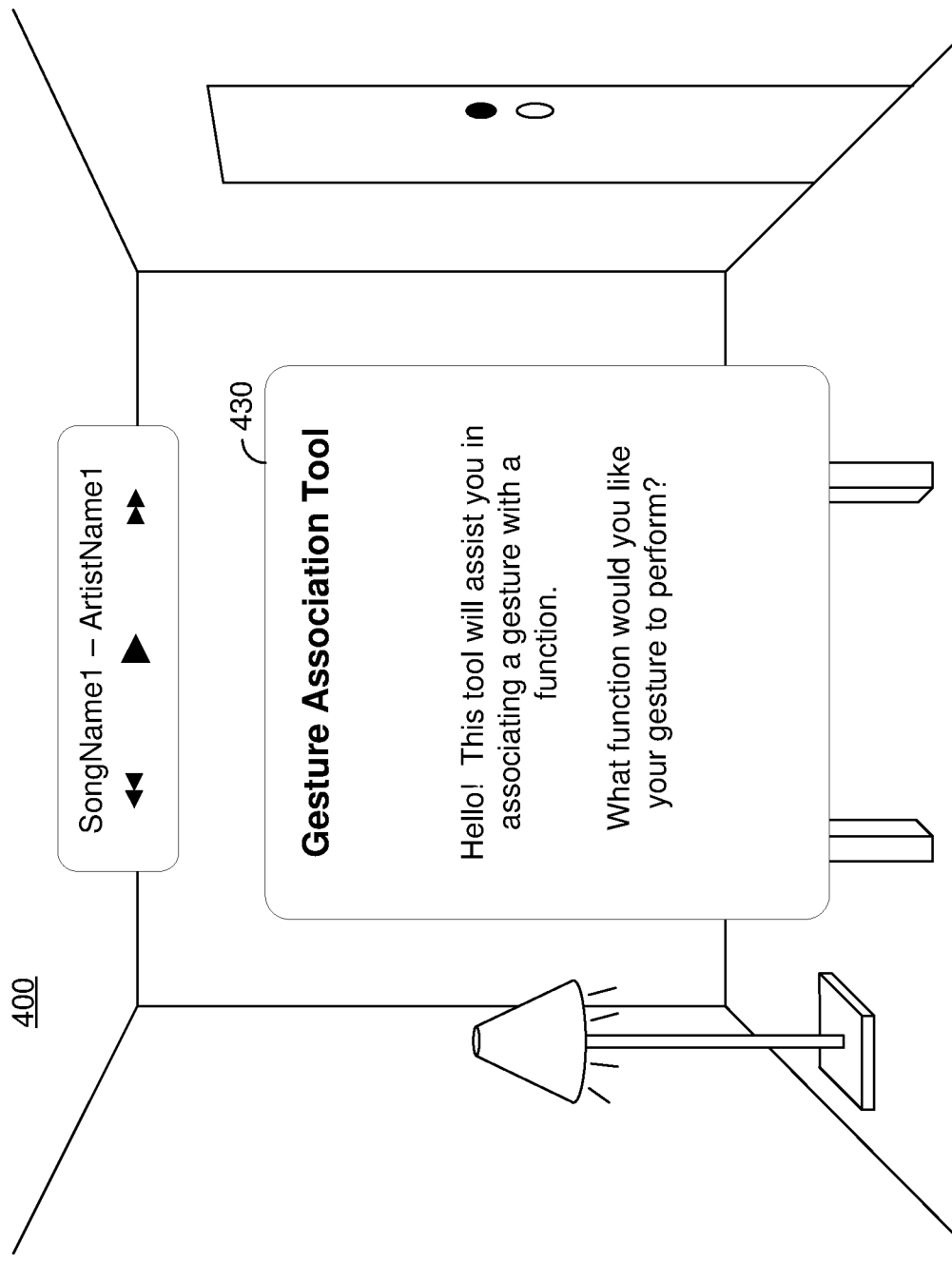

FIG. 5B illustrates the XR environment 400 during a second time period subsequent to the first time period. In various implementations, the second time period is an instant, a fraction of a second, a few seconds, a few hours, a few days, or any length of time. During the second time period, in response to detecting the request to associate a hand gesture with a function, the XR environment 400 includes the gesture association window 430.

During the second time period, the gesture association window 430 includes a prompt requesting that the user input a function to associate with the hand gesture. In various implementations, the user response is a verbal command. For example, during the second time period, the user responds to the prompt by saying "Open Camera app." In various implementations, the user response includes user interaction with one or more affordances, such as menu items or buttons to select a function from a list of available functions.

Figure 5C:
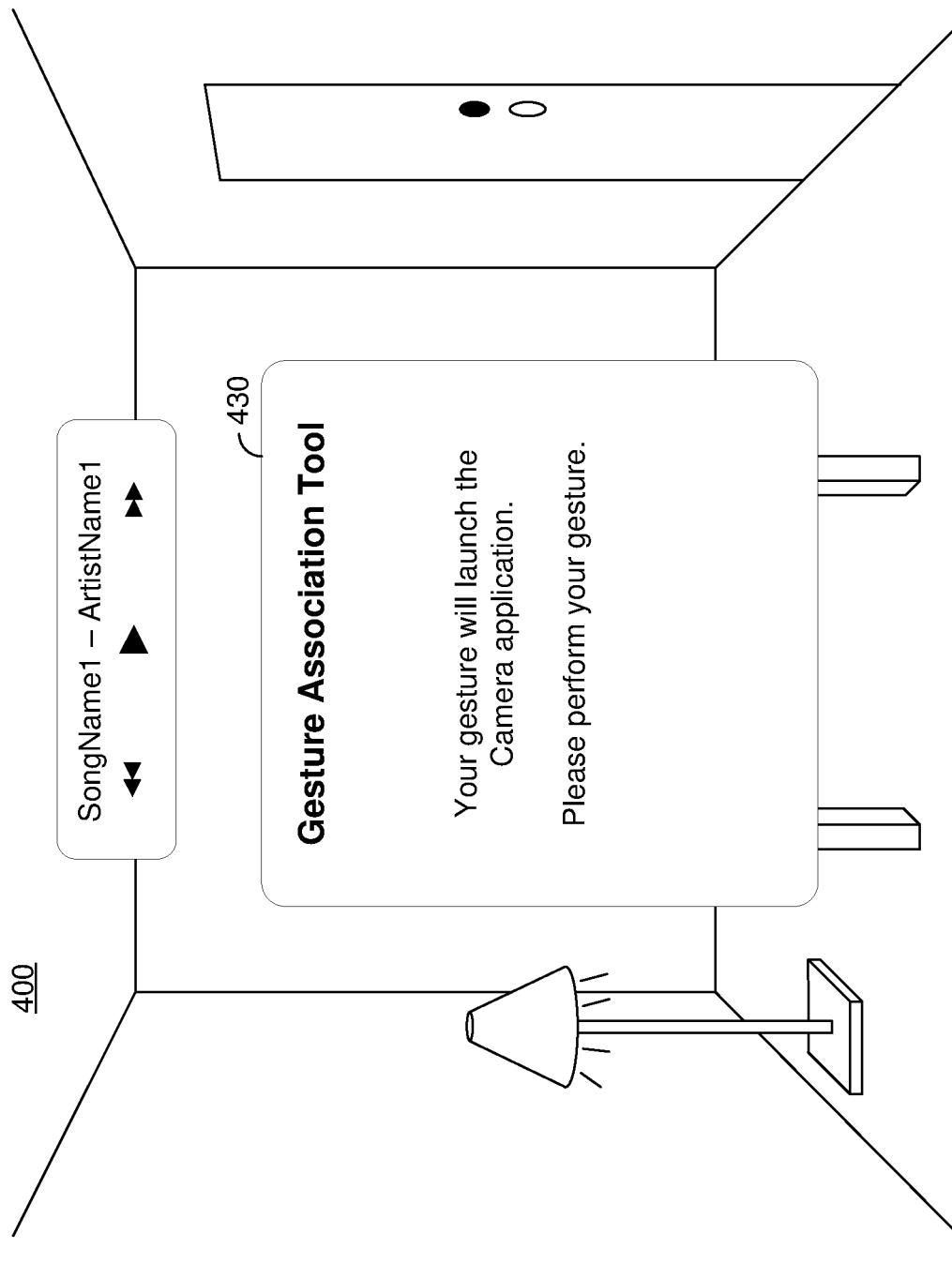

FIG. 5C illustrates the XR environment 400 during a third time period subsequent to the second time period. In various implementations, the third time period is an instant, a fraction of a second, a few seconds, a few hours, a few days, or any length of time. During the third time period, the gesture association window 430 indicates that the hand gesture will launch a Camera application and includes a prompt requesting that the user perform the hand gesture.

Figure 5D:
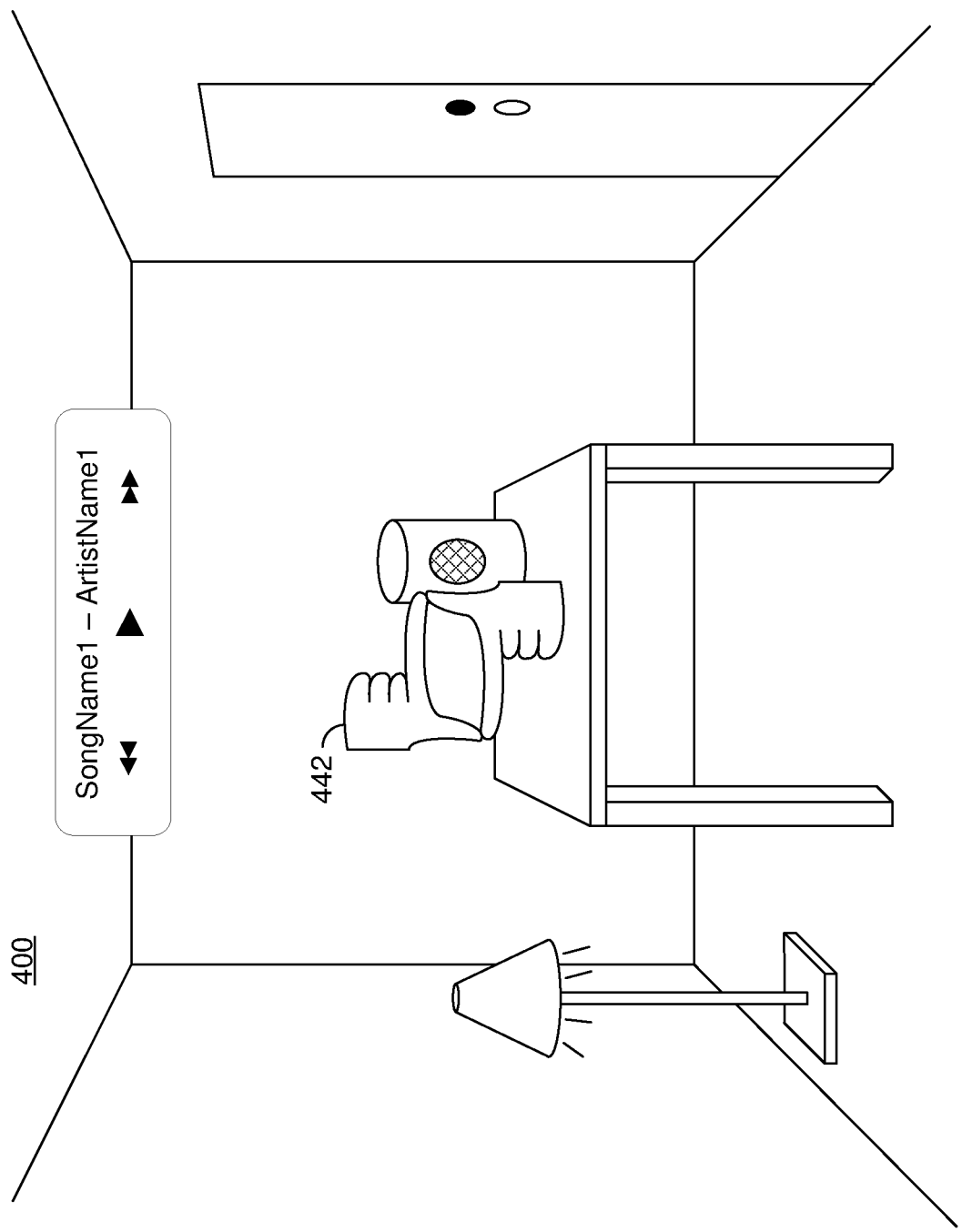

FIG. 5D illustrates the XR environment 400 during a fourth time period subsequent to the third time period. In various implementations, the fourth time period is an instant, a fraction of a second, a few seconds, a few hours, a few days, or any length of time. During the fourth time period, the user performs a framing gesture 442 in which each of the user's thumbs are pressed against the index finger of the opposite hand with the other fingers curled in towards the palms.

The device detects the user's hands in the XR environment 400 and extracts a set of features from the performance of the framing gesture 442. In various implementations, the set of features includes features based on the position and/or orientation of various hand elements (e.g., the relative position in three-dimensional space of fingertips, knuckles, and/or palms) at various times during the fourth time period.

Based on the set of features, the device attempts to classify the framing gesture 442 as a known hand gesture. In various implementations, the device accesses (either locally or remotely) a hand gesture database including data regarding a plurality of hand gestures. Each of the plurality of hand gestures are associated with a corresponding set of gesture matching criteria. If the set of features matches a set of gesture matching criteria for a particular gesture, the device recognizes the hand gesture as the particular gesture. For example, during the fourth time period, the device recognizes the namaste gesture 441 as a particular hand gesture named "Diamond".

Figure 5E:
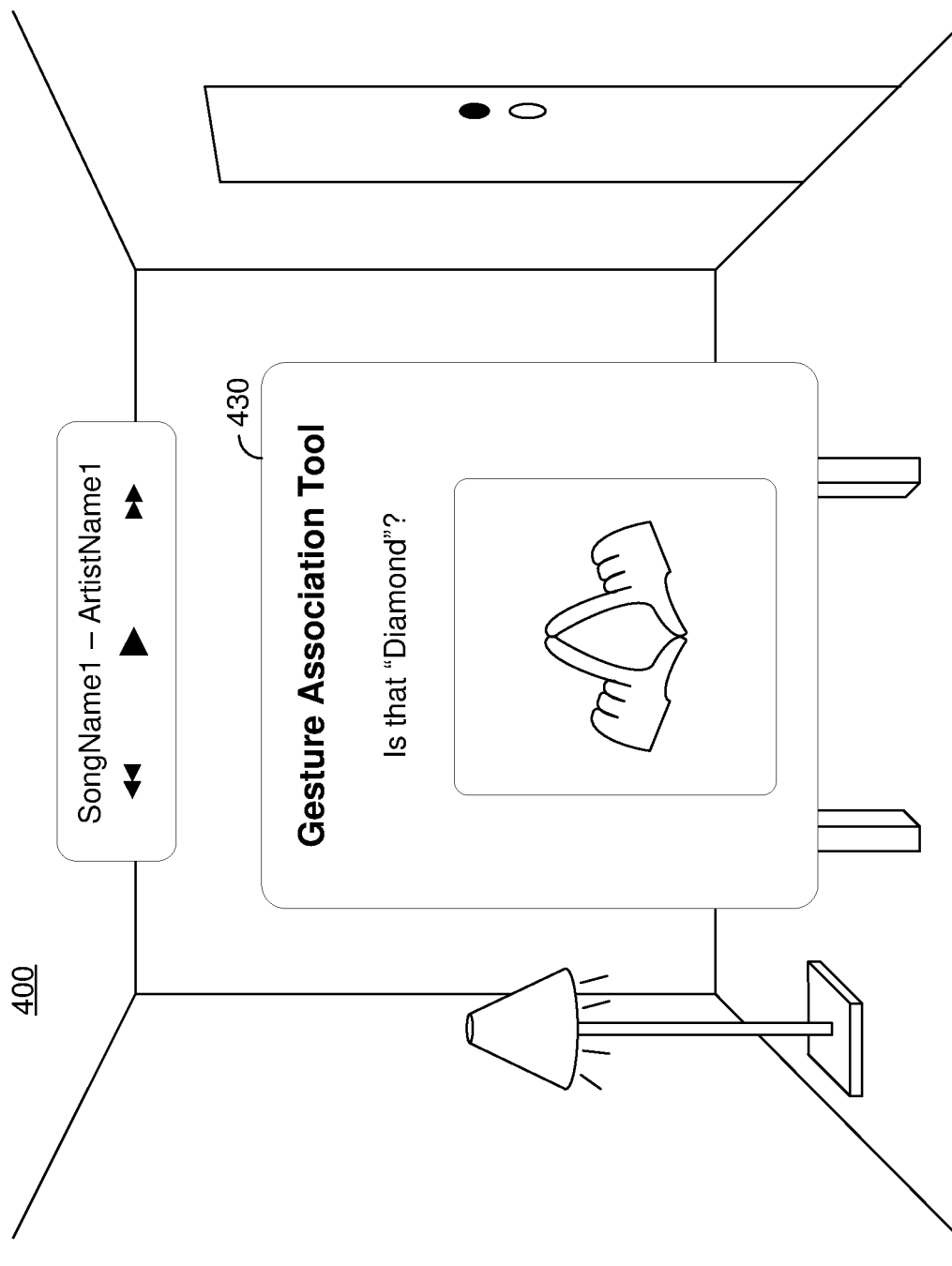

FIG. 5E illustrates the XR environment 400 during a fifth time period subsequent to the fourth time period. In various implementations, the fifth time period is an instant, a fraction of a second, a few seconds, a few hours, a few days, or any length of time. During the fifth time period, in response to recognizing the framing gesture 442, the gesture association window 430 includes a prompt requesting that the user confirm that the gesture performed is the "Diamond" gesture. In various implementations, and as illustrated in FIG. 5E, the gesture association window 430 further includes a graphical representation of the recognized gesture.

During the fifth time period, the user denies that the framing gesture 442 performed by the user corresponds to the "Diamond" gesture. In various implementations, the user response is a verbal command. For example, during the second time period, the user responds to the prompt by saying "No." In various implementations, the user response includes user interaction with one or more affordances, such as a "Yes" button or a "No" button.

Figure 5F:
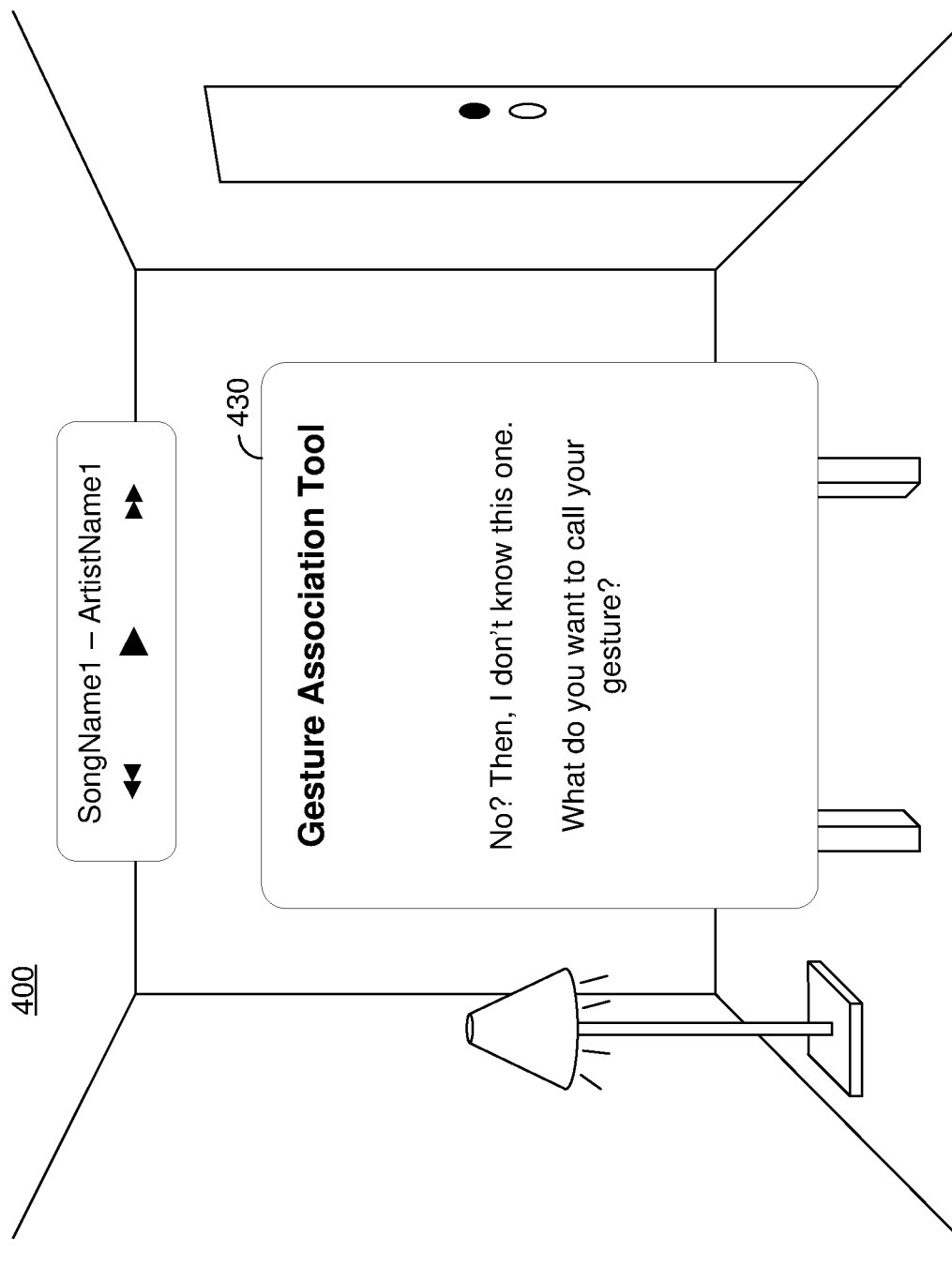

FIG. 5F illustrates the XR environment 400 during a sixth time period subsequent to the fifth time period. In various implementations, the sixth time period is an instant, a fraction of a second, a few seconds, a few hours, a few days, or any length of time. During the sixth time period, in response to the user denying that the framing gesture 442 corresponds to the "Diamond" gesture, the gesture association window 430 includes a prompt requesting that the user provide a name for the framing gesture 442. In various implementations, the user response is a verbal command. For example, during the sixth time period, the user responds to the prompt by saying "Framing." In various implementations, the user response includes user interaction with one or more affordances, such as a virtual keyboard.

Figure 5G:
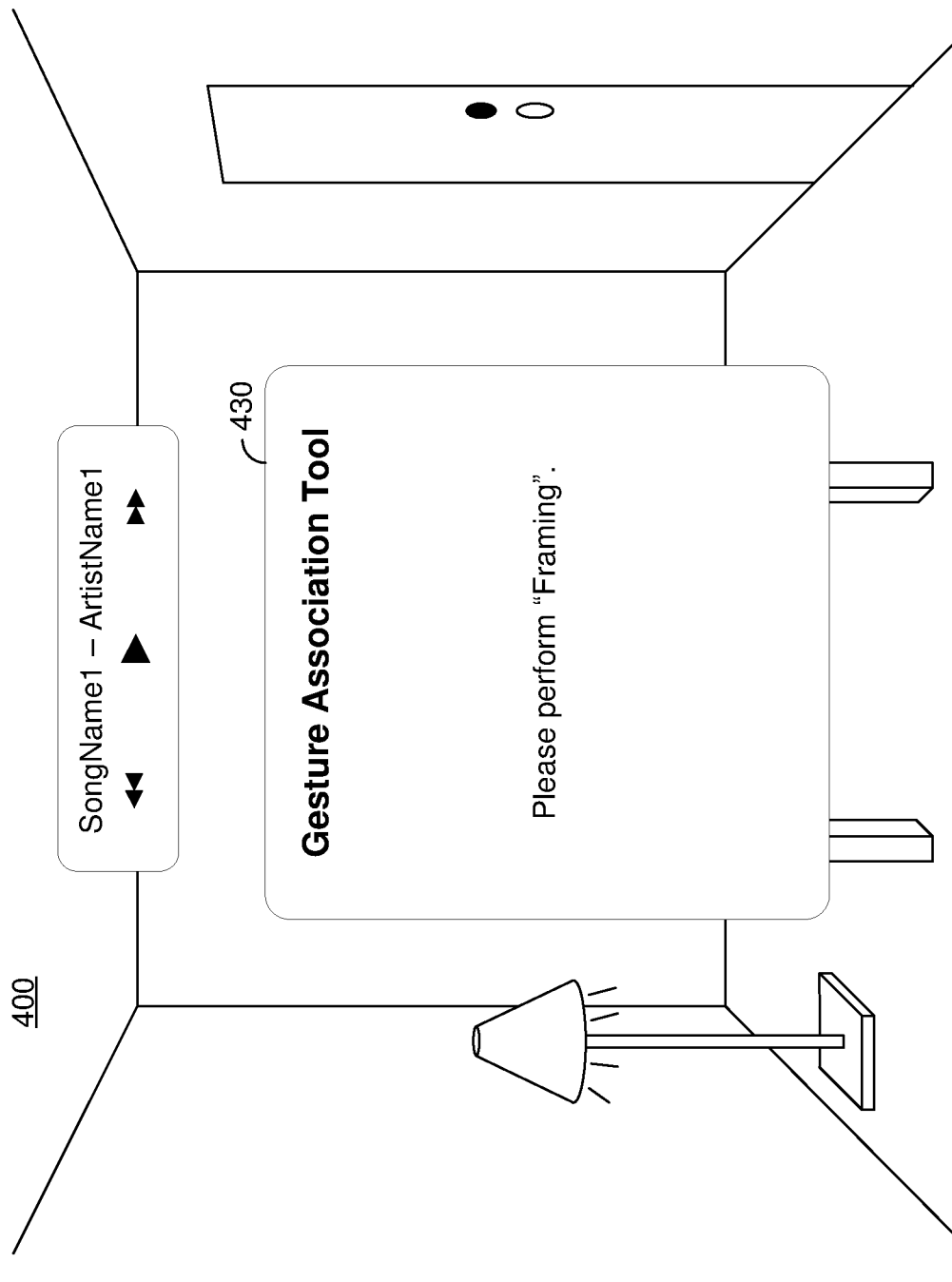

FIG. 5G illustrates the XR environment 400 during a seventh time period subsequent to the sixth time period. In various implementations, the seventh time period is an instant, a fraction of a second, a few seconds, a few hours, a few days, or any length of time. During the seventh time period, in response to the user providing a name for the framing gesture 442 of "Framing", the gesture association window 430 includes a prompt requesting that the user perform the framing gesture 442.

Figure 5H:
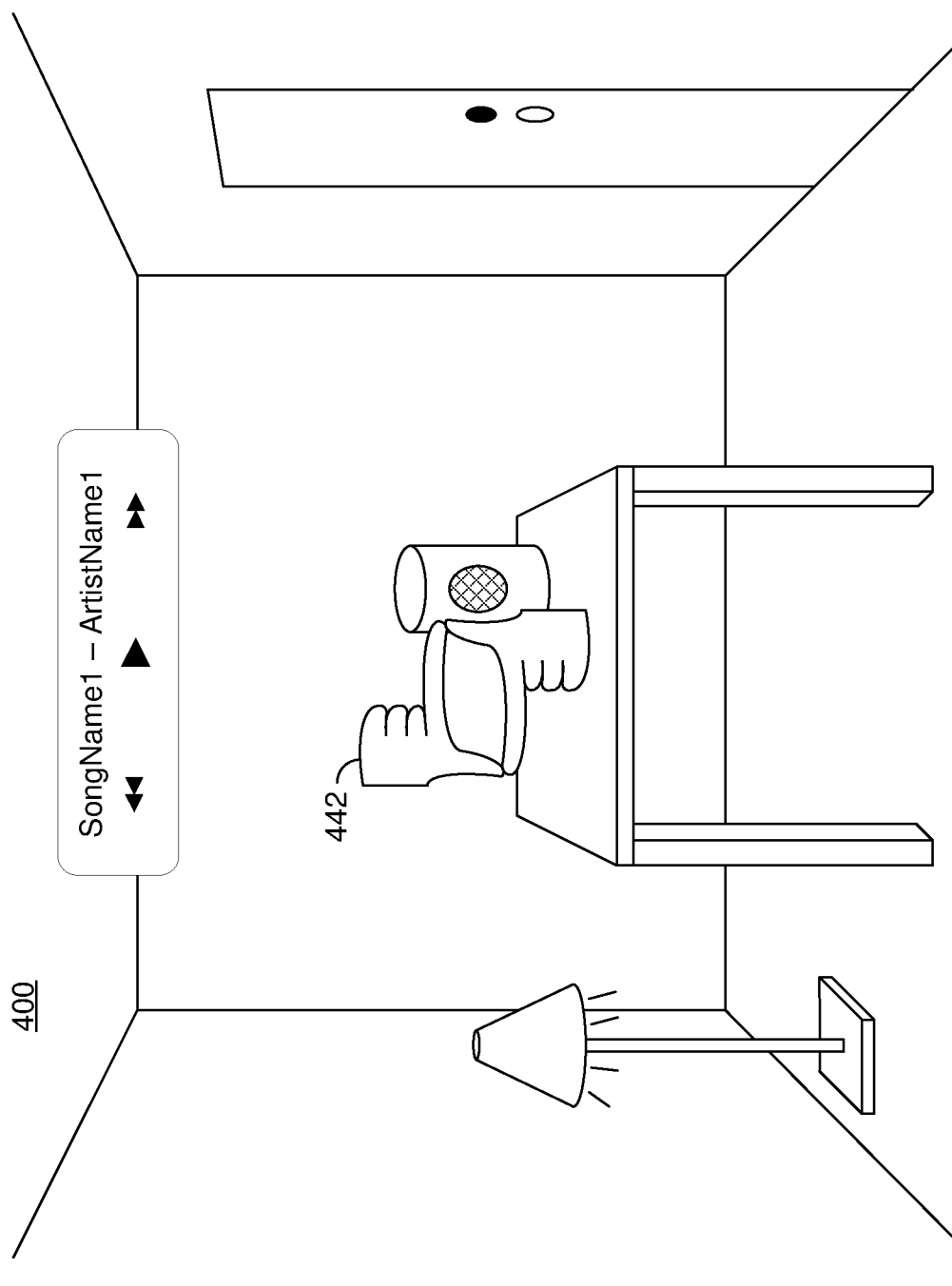

FIG. 5H illustrates the XR environment 400 during an eighth time period subsequent to the seventh time period. In various implementations, the eighth time period is an instant, a fraction of a second, a few seconds, a few hours, a few days, or any length of time. During the eighth time period, the user performs the framing gesture 442.

The device detects the user's hands in the XR environment 400 and extracts a set of features from the performance of the framing gesture 442. In various implementations, the set of features includes features based on the position and/or orientation of various hand elements (e.g., the relative position in three-dimensional space of fingertips, knuckles, and/or palms) at various times during the eighth time period.

Based on the set of features, the device defines one or more gesture matching criteria for the framing gesture 442. In various implementations, the device stores the gesture matching criteria for the framing gesture 442 in the gesture database. In various implementations, the device defines the gesture matching criteria for the framing gesture 442 further based on the set of features extracted during the fourth time period as another positive example of the framing gesture 442. In various implementations, the device defines the gesture matching criteria for the framing gesture 442 further based on the gesture matching criteria for the "Diamond" gesture as a negative example of the framing gesture 442 (e.g., a gesture that is not the framing gesture 442).

Figure 5I:
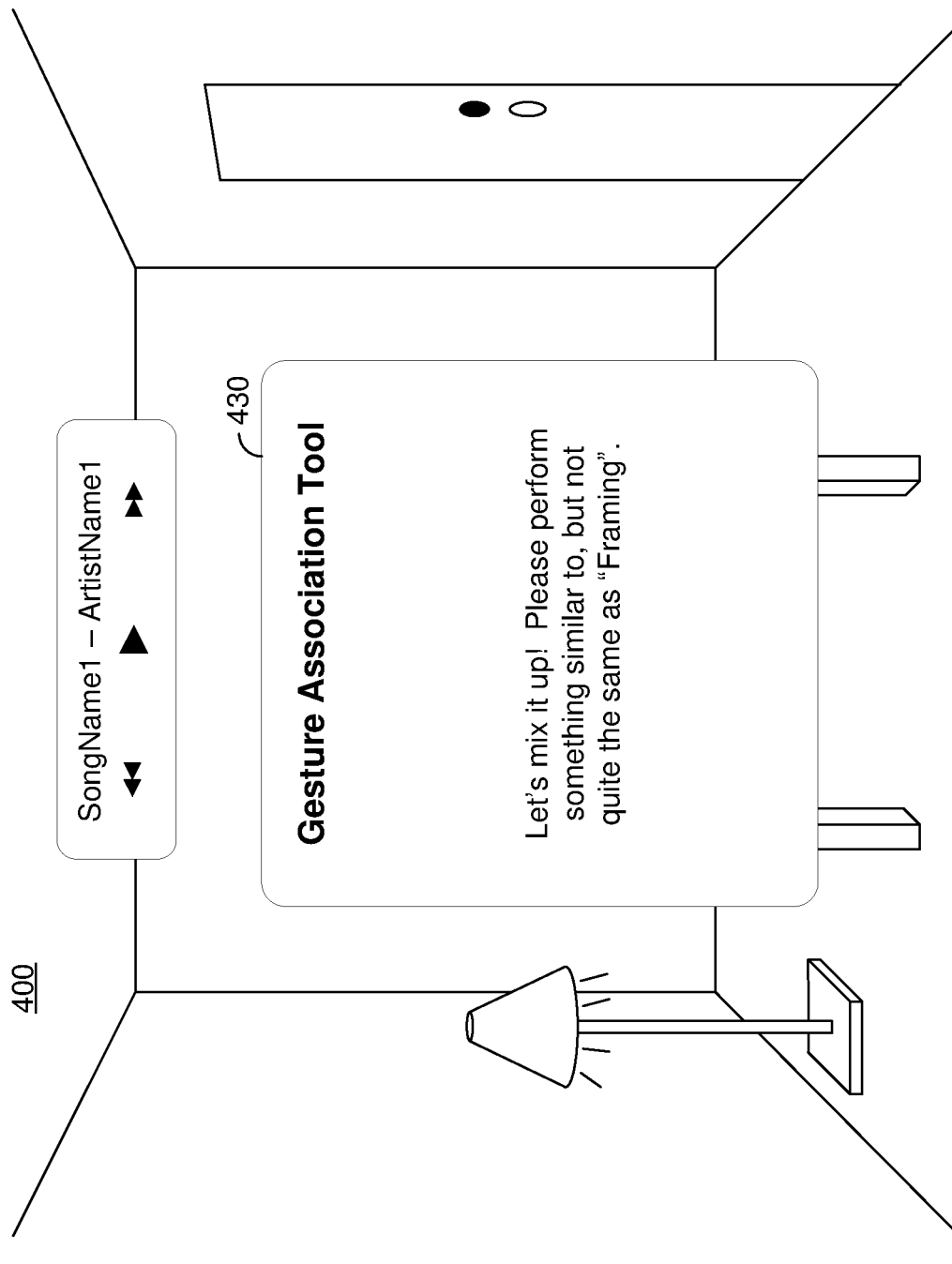

FIG. 5I illustrates the XR environment 400 during a ninth time period subsequent to the eighth time period. In various implementations, the ninth time period is an instant, a fraction of a second, a few seconds, a few hours, a few days, or any length of time. During the ninth time period, the gesture association window 430 includes a prompt requesting that the user perform a gesture that is similar to, but different from the framing gesture (e.g., a gesture that is not the framing gesture).

Figure 5J:
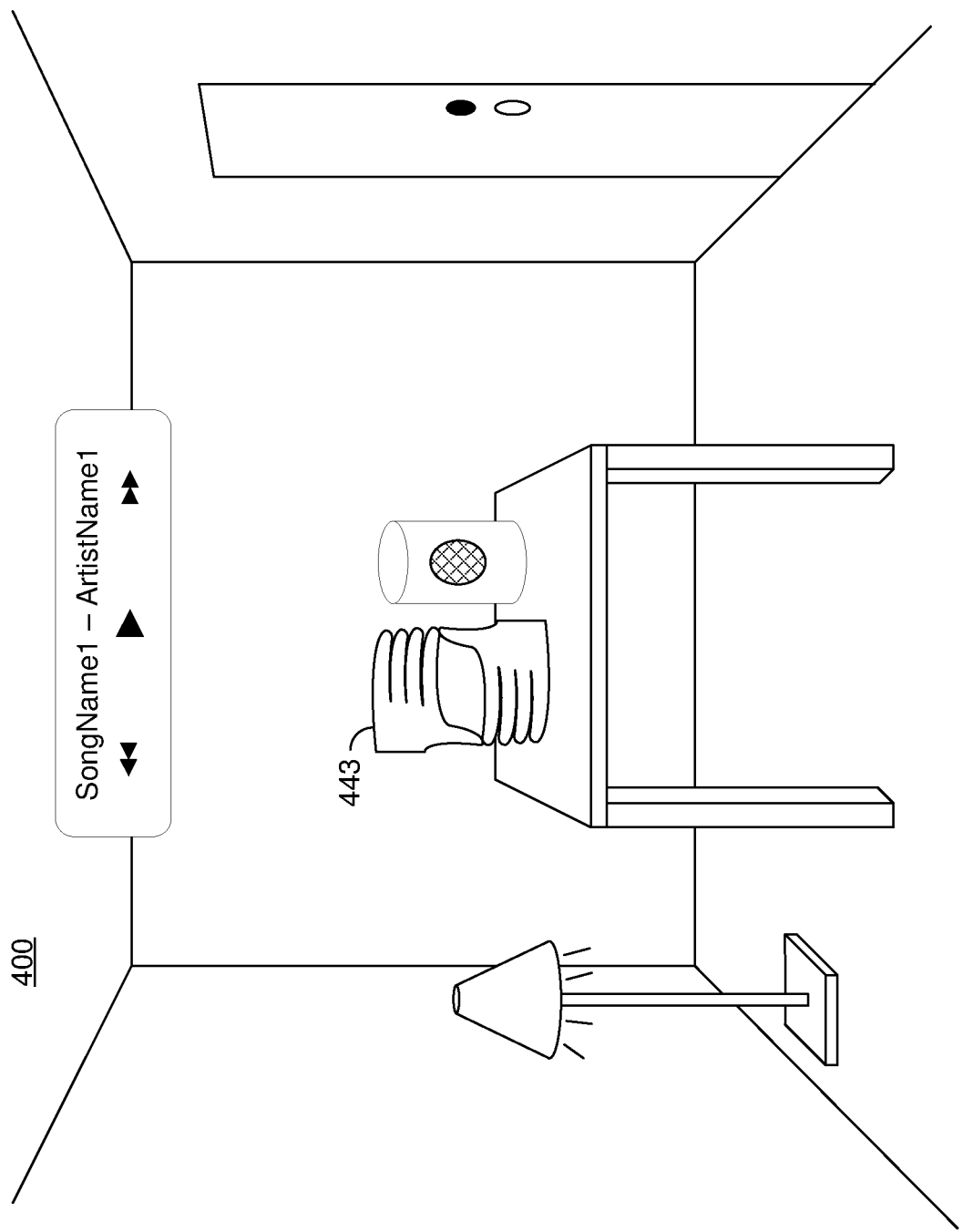

FIG. 5J illustrates the XR environment 400 during a tenth time period subsequent to the ninth time period. In various implementations, the tenth time period is an instant, a fraction of a second, a few seconds, a few hours, a few days, or any length of time. During the tenth time period, the user performs a window gesture 443 in which each of the user's thumbs are pressed against the index finger of the opposite hand with the other fingers extended.

The device detects the user's hands in the XR environment 400 and extracts a set of features from the performance of the window gesture 442. In various implementations, the set of features includes features based on the position and/or orientation of various hand elements (e.g., the relative position in three-dimensional space of fingertips, knuckles, and/or palms) at various times during the tenth time period.

Based on the set of features, the device refines the one or more gesture matching criteria for the framing gesture 442 based on the window gesture 443 as a negative example of the framing gesture 442 (e.g., a gesture that is not the framing gesture 442). In various implementations, the device refines the one or more gesture matching criteria for the framing gesture 442 based on other gestures in the gesture data that are similar to, but are different from the framing gesture 442.

In various implementations, the device refines the one or more gesture matching criteria for the framing gesture 442 based on additional information provided by the user (which, in various implementations, is solicited by the device via one or more prompts). For example, in various implementations, the user provides information regarding the importance of timing, a motion path, finger pose, or left-right distinction. For example, in various implementations, the user provides information that timing is unimportant, relaxing the gesture matching criteria relating to timing. As another example, the user provides information that the motion path is important, narrowing the gesture matching criteria regarding motion of the hands through space while performing the gesture. As another example, in various implementations, the user provides information that left-right distinction is unimportant and the gesture matching criteria are met by performing the gesture with either hand.

Figure 5K:
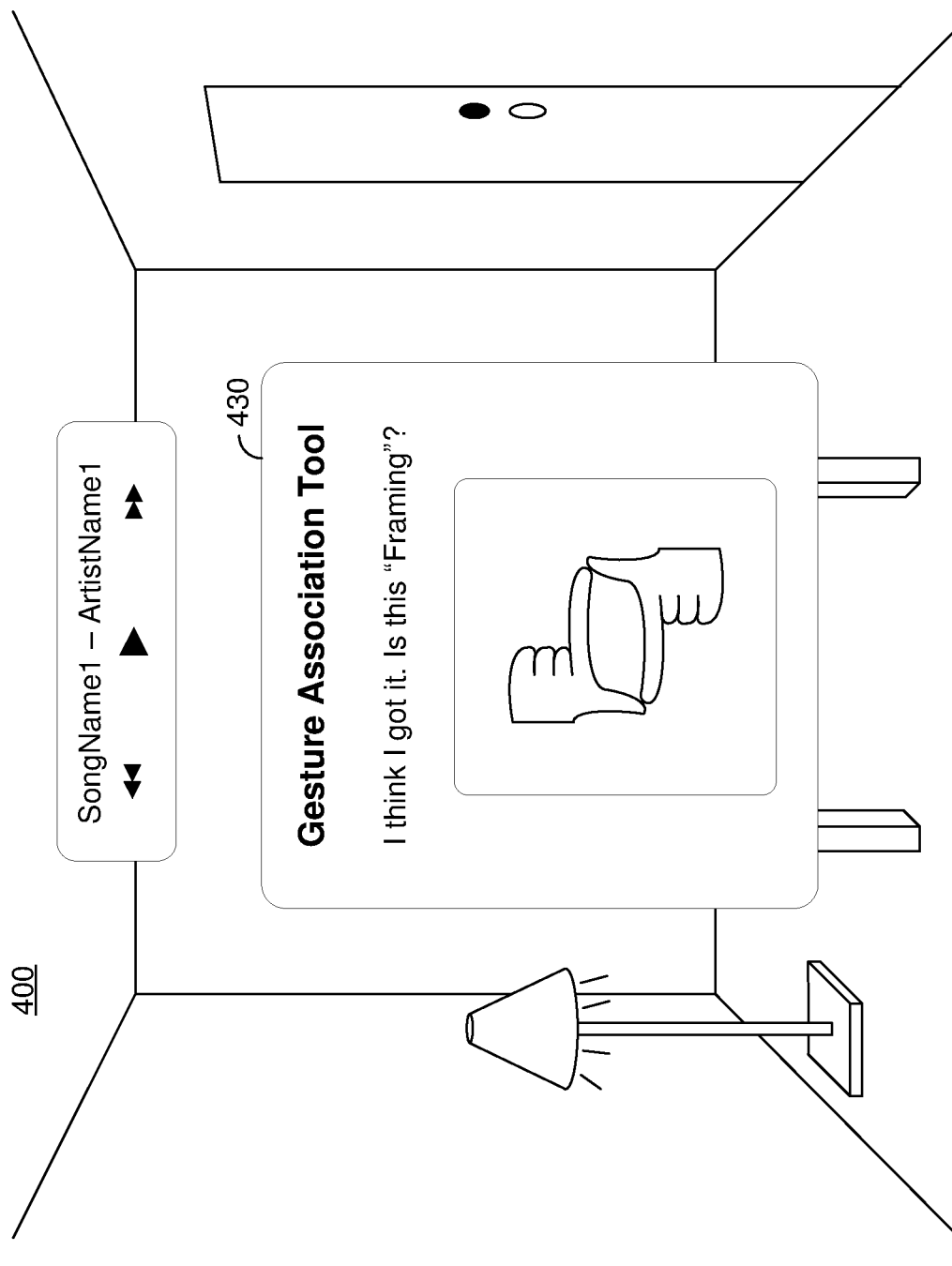

FIG. 5K illustrates the XR environment 400 during an eleventh time period subsequent to the tenth time period. In various implementations, the eleventh time period is an instant, a fraction of a second, a few seconds, a few hours, a few days, or any length of time. During the eleventh time period, the gesture association window 430 includes a prompt requesting that the user confirm the "Framing" gesture. In various implementations, and as illustrated in FIG. 5K, the gesture association window 430 includes a graphical representation of the defined gesture. In various implementations, the graphical representation of the defined gesture is based on a representative set of features that satisfy the gesture matching criteria for the "Framing" gesture, e.g., an animation of a skeletal model using the representative set of features.

During the eleventh time period, the user confirms that the framing gesture 442 performed by the user corresponds to the "Framing" gesture. In various implementations, the user response is a verbal command. For example, during the eleventh time period, the user responds to the prompt by saying "Yes." In various implementations, the user response includes user interaction with one or more affordances, such as a "Yes" button or a "No" button, or performance of a confirmation hand gesture or a cancel hand gesture.

Figure 5L:
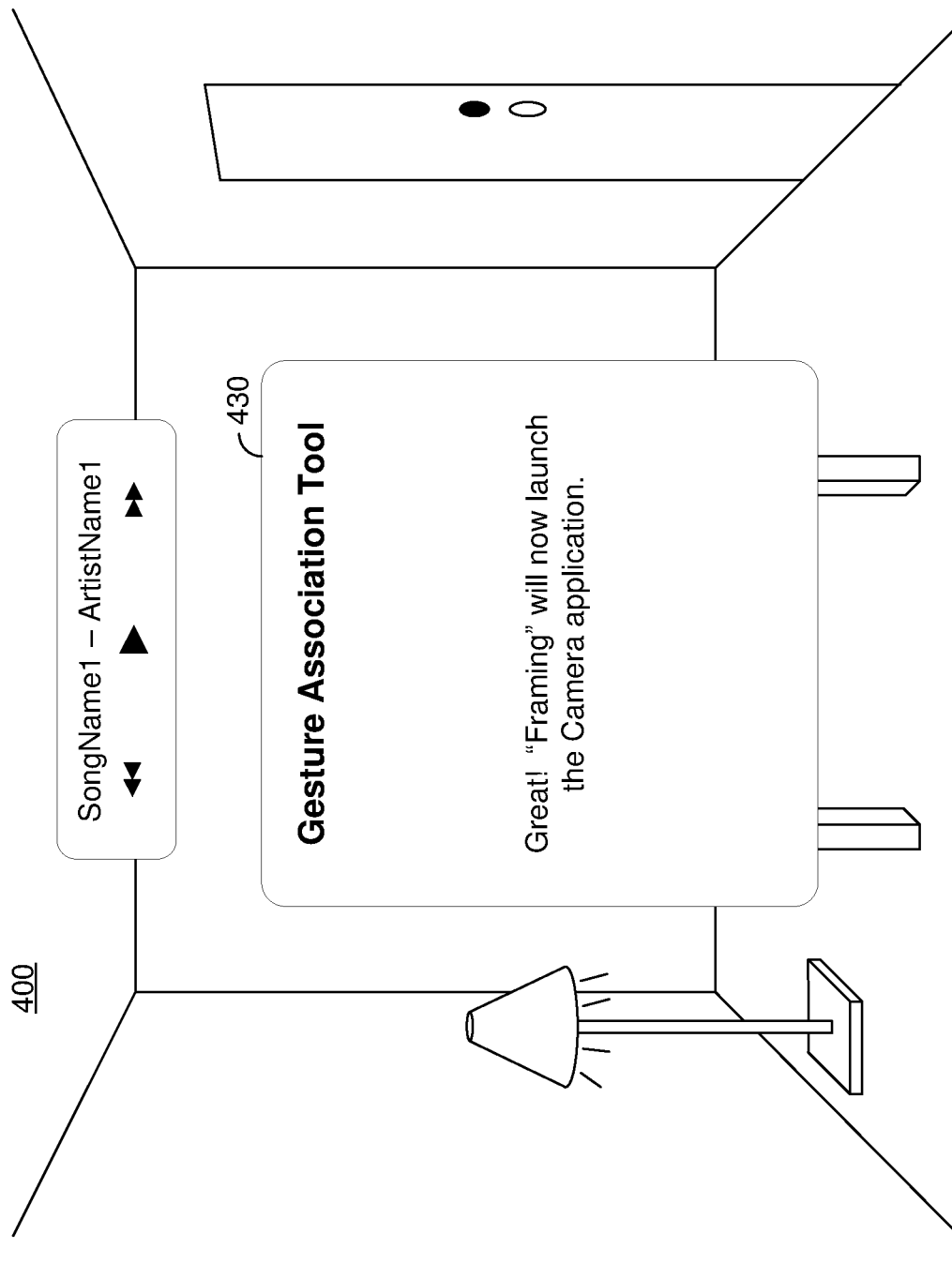

FIG. 5L illustrates the XR environment 400 during a twelfth time period subsequent to the eleventh time period. In various implementations, the twelfth time period is an instant, a fraction of a second, a few seconds, a few hours, a few days, or any length of time. During the twelfth time period, in response to the user confirming that the framing gesture 442 corresponds to the "Framing" gesture, the gesture association window 430 includes a confirmation that performing the "Framing" gesture will open the Camera application.

FIGS. 6A-6I illustrate the XR environment 400 of FIG. 4A including a graphical user interface for selecting a function associated with a target and defining a hand gesture to associate with the function. Like FIGS. 4A-4F and FIGS. 5A-5S, FIGS. 6A-6I illustrate the XR environment 400 from the perspective of a user of an electronic device.

Figure 6A:
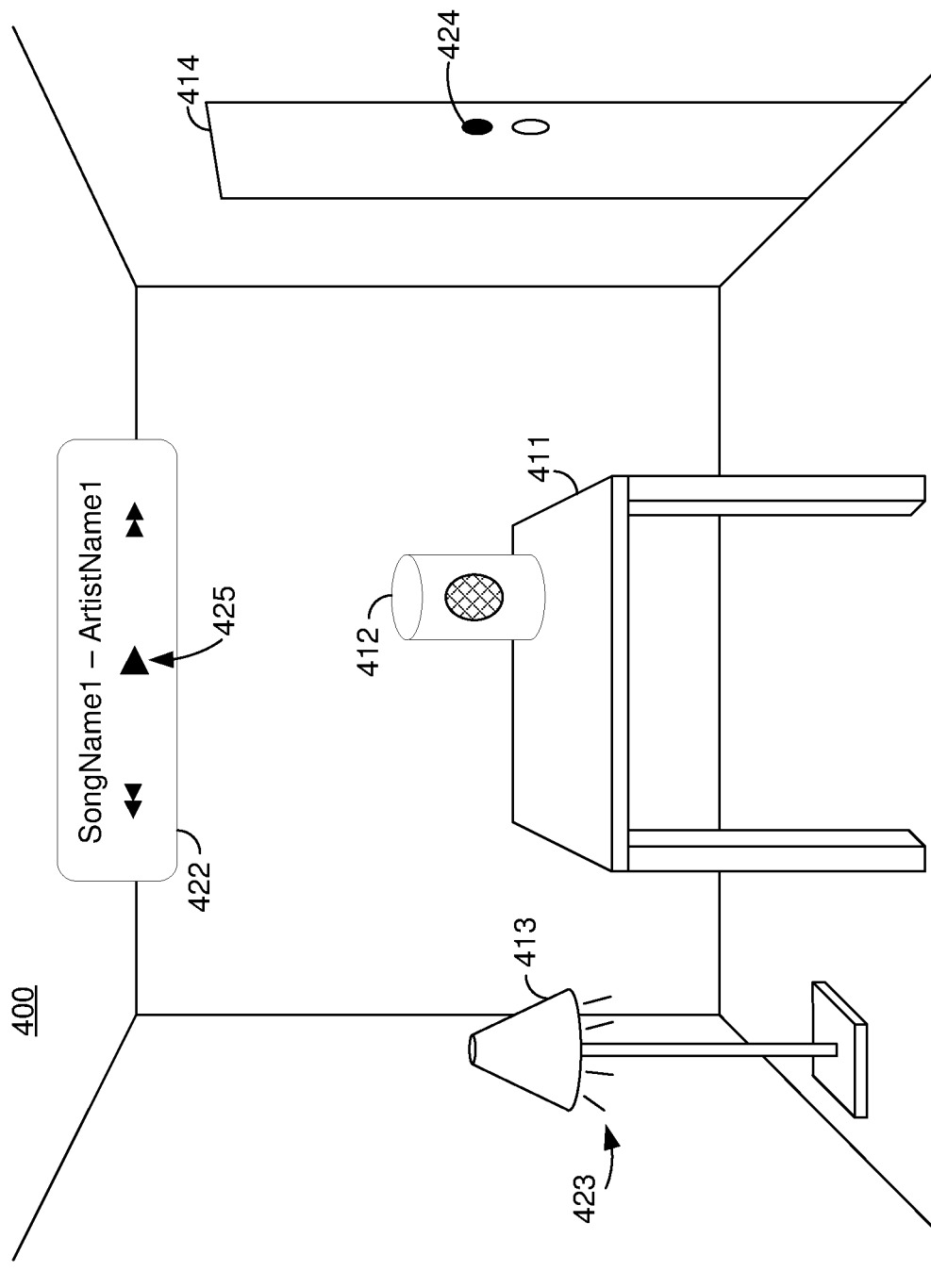
FIGS. 6A-6I illustrate the XR environment of FIG. 4A including a graphical user interface for selecting a function associated with a target and defining a hand gesture to associate with the function.

FIG. 6A illustrates the XR environment 400 during a first time period. In various implementations, the first time period is an instant, a fraction of a second, a few seconds, a few hours, a few days, or any length of time. During the first time period, the device detects a request to associate a hand gesture with a function. In various implementations, the request is detected based on a verbal command issued by a user. In various implementations, the request is detected based on user interaction with one or more affordances, such as menu items or buttons.

Figure 6B:
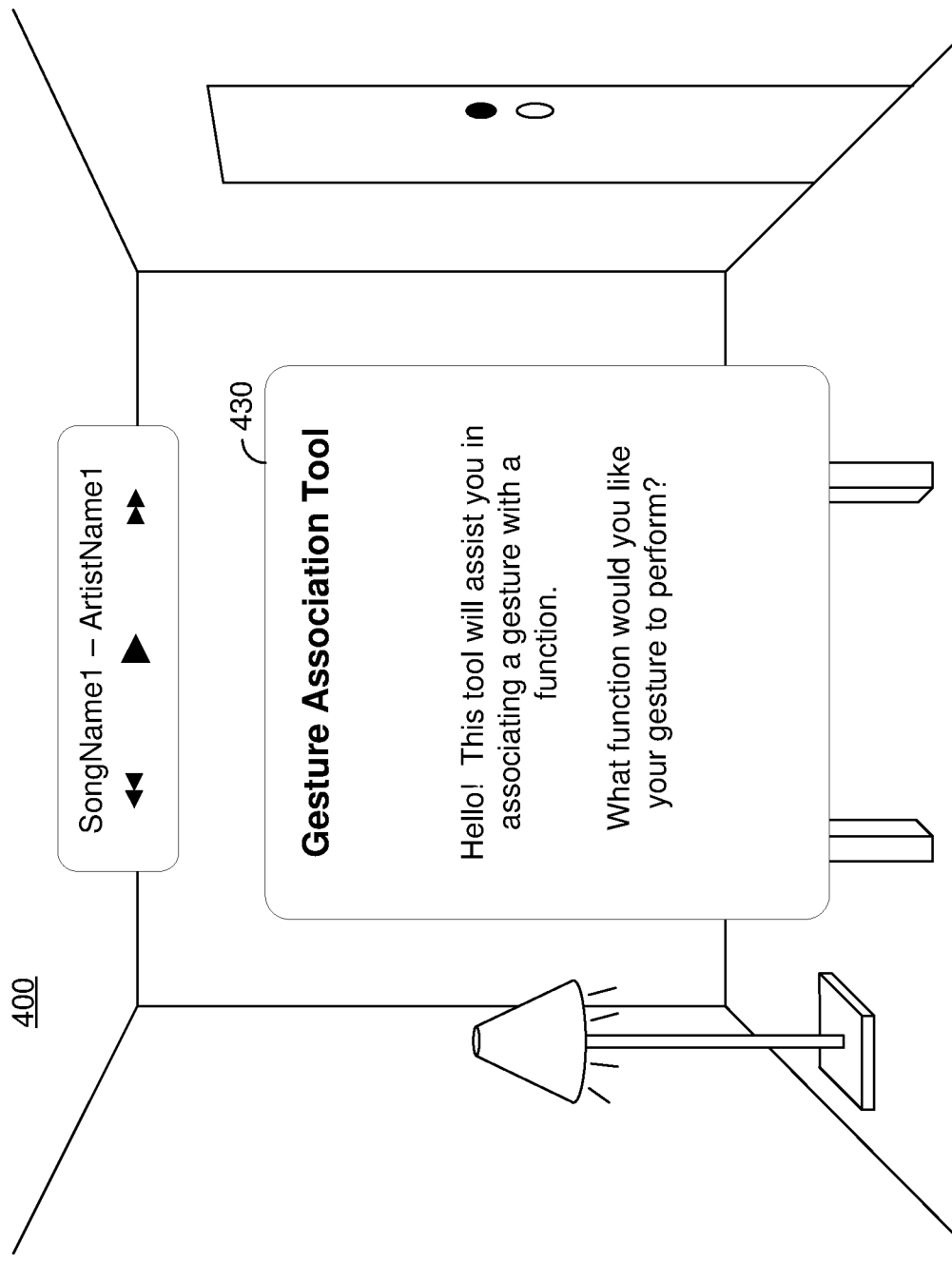

FIG. 6B illustrates the XR environment 400 during a second time period subsequent to the first time period. In various implementations, the second time period is an instant, a fraction of a second, a few seconds, a few hours, a few days, or any length of time. During the second time period, in response to detecting the request to associate a hand gesture with a function, the XR environment 400 includes the gesture association window 430.

During the second time period, the gesture association window 430 includes a prompt requesting that the user input a function to associate with the hand gesture. In various implementations, the user response is a verbal command. For example, during the second time period, the user responds to the prompt by saying "Engage target." In various implementations, the user response includes user interaction with one or more affordances, such as menu items or buttons to select a function from a list of available functions.

Figure 6C:
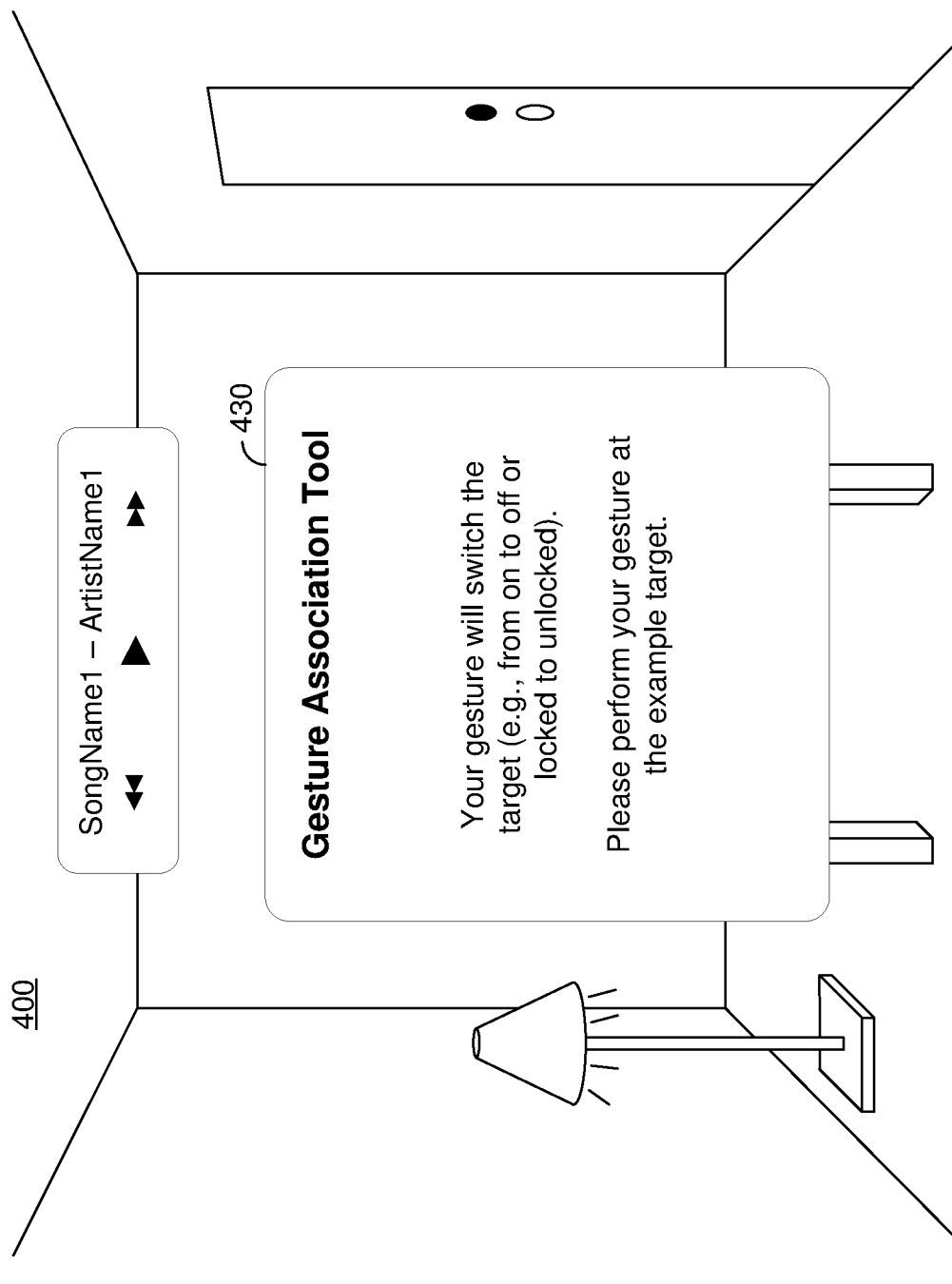

FIG. 6C illustrates the XR environment 400 during a third time period subsequent to the second time period. In various implementations, the third time period is an instant, a fraction of a second, a few seconds, a few hours, a few days, or any length of time. During the third time period, the gesture association window 430 indicates that the hand gesture will launch an action to engage a target (e.g., turn a light on or off, play or pause music, lock or unlock a door, etc.) and includes a prompt requesting that the user perform the hand gesture at an example target (e.g., a bullseye).

Figure 6D:
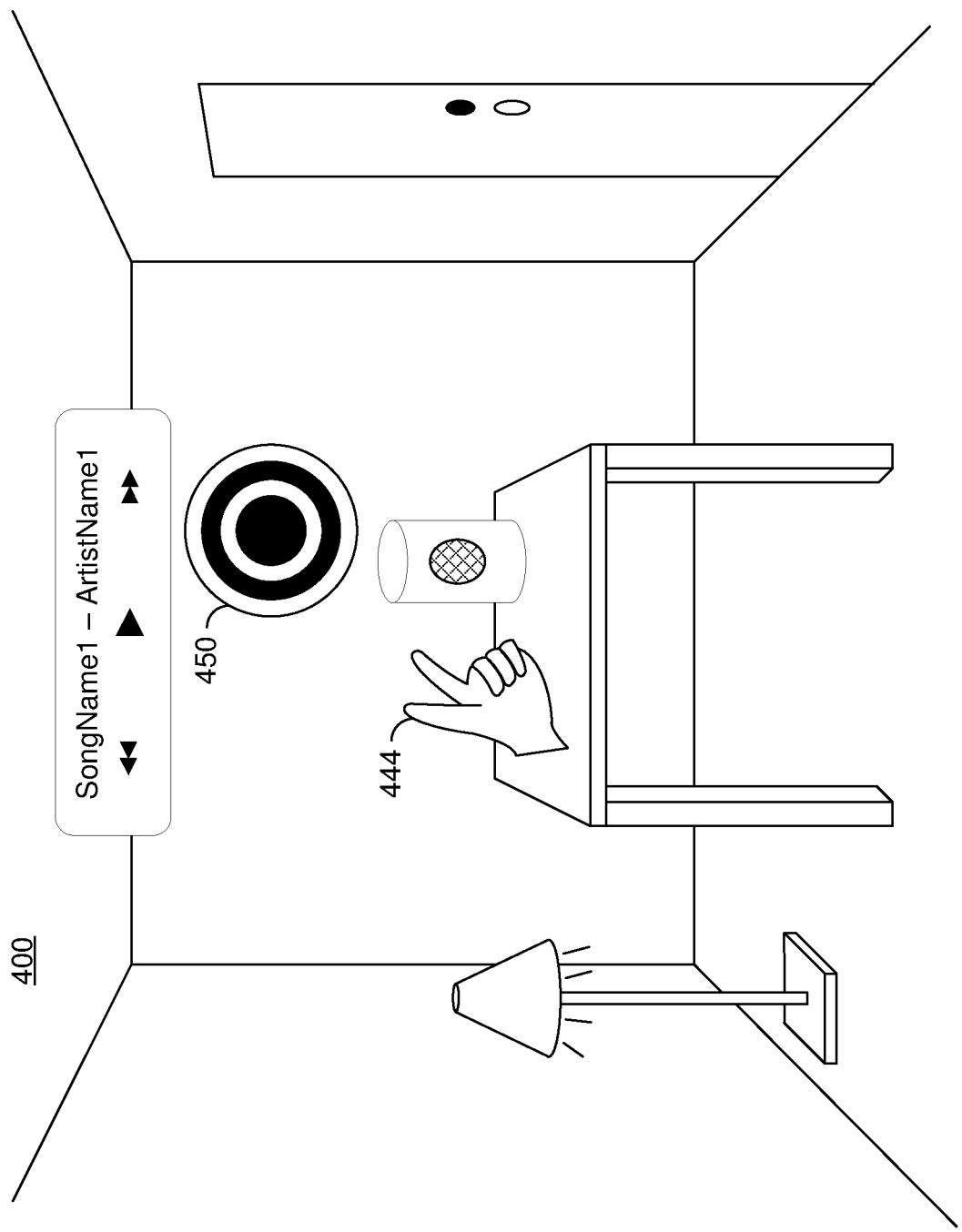

FIG. 6D illustrates the XR environment 400 during a fourth time period subsequent to the third time period. In various implementations, the fourth time period is an instant, a fraction of a second, a few seconds, a few hours, a few days, or any length of time. During the fourth time period, the XR environment 400 includes a virtual target 450 at a first location in the XR environment 400. Further, during the fourth time period, the user performs a L-pointing gesture 444 directed at the virtual target 450 in which the user's index finger points at the virtual target, the thumb is extended, and the other fingers are curled in towards the palm.

The device detects the user's hand in the XR environment 400 and extracts a set of features from the performance of the L-pointing gesture 444. In various implementations, the set of features includes features based on the position and/or orientation of various hand elements (e.g., fingertips, knuckles, and/or palms) at various times during the fourth time period.

Based on the set of features, the device attempts to classify the L-pointing gesture 444 as a known hand gesture. In various implementations, the device accesses (either locally or remotely) a hand gesture database including data regarding a plurality of hand gestures. Each of the plurality of hand gestures are associated with a corresponding set of gesture matching criteria. If the set of features matches a set of gesture matching criteria for a particular gesture, the device recognizes the hand gesture as the particular gesture. However, in various implementations, the set of features does not satisfy any known set of gesture matching criteria.

Figure 6E:
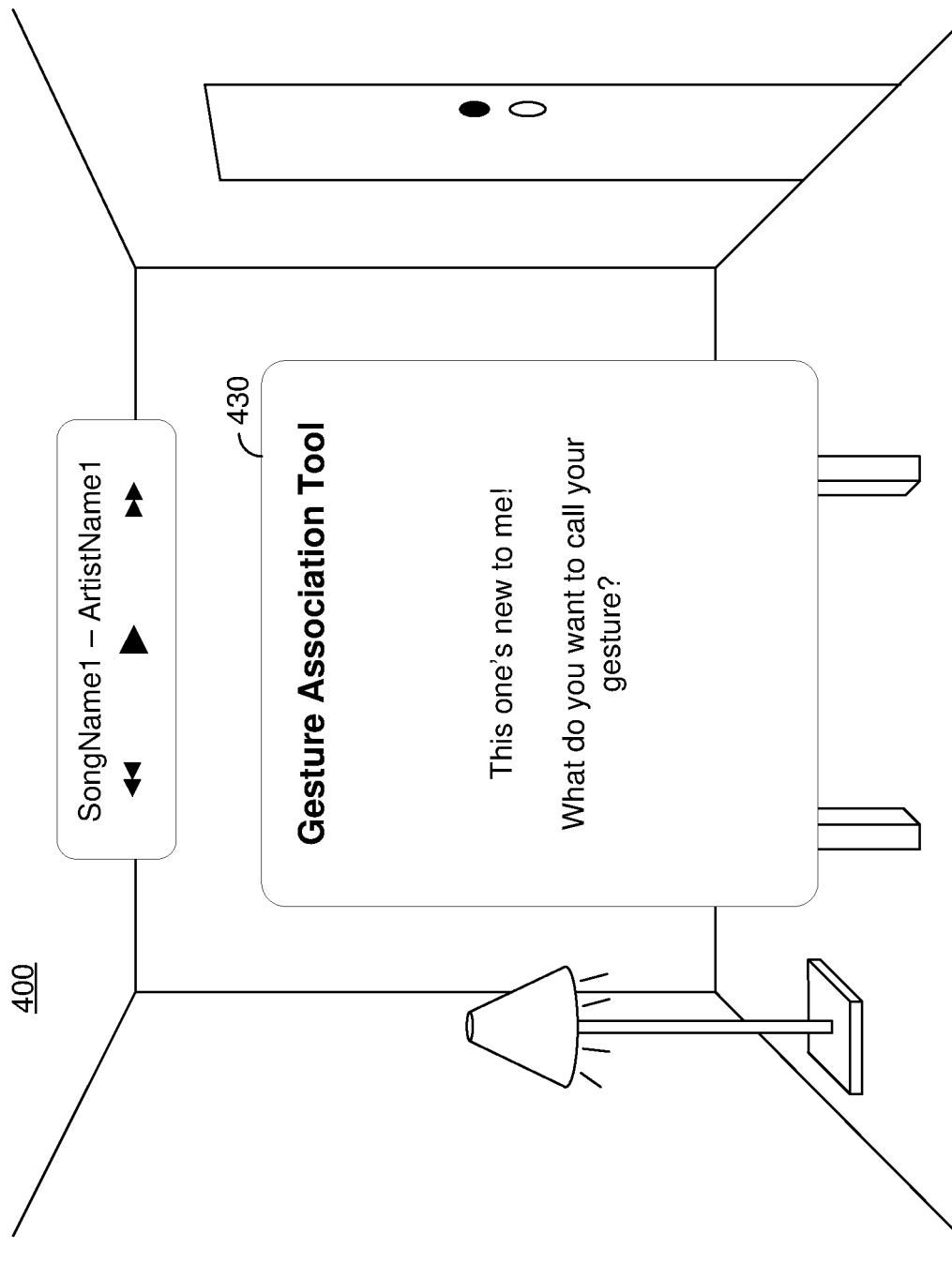

FIG. 6E illustrates the XR environment 400 during a fifth time period subsequent to the fourth time period. In various implementations, the fifth time period is an instant, a fraction of a second, a few seconds, a few hours, a few days, or any length of time. During the fifth time period, in response to failing to recognize the L-pointing gesture 444, the gesture association window 430 includes a prompt requesting that the user provide a name for the L-pointing gesture 444. In various implementations, the user response is a verbal command. For example, during the sixth time period, the user responds to the prompt by saying "L-pointing." In various implementations, the user response includes user interaction with one or more affordances, such as a virtual keyboard.

Figure 6F:
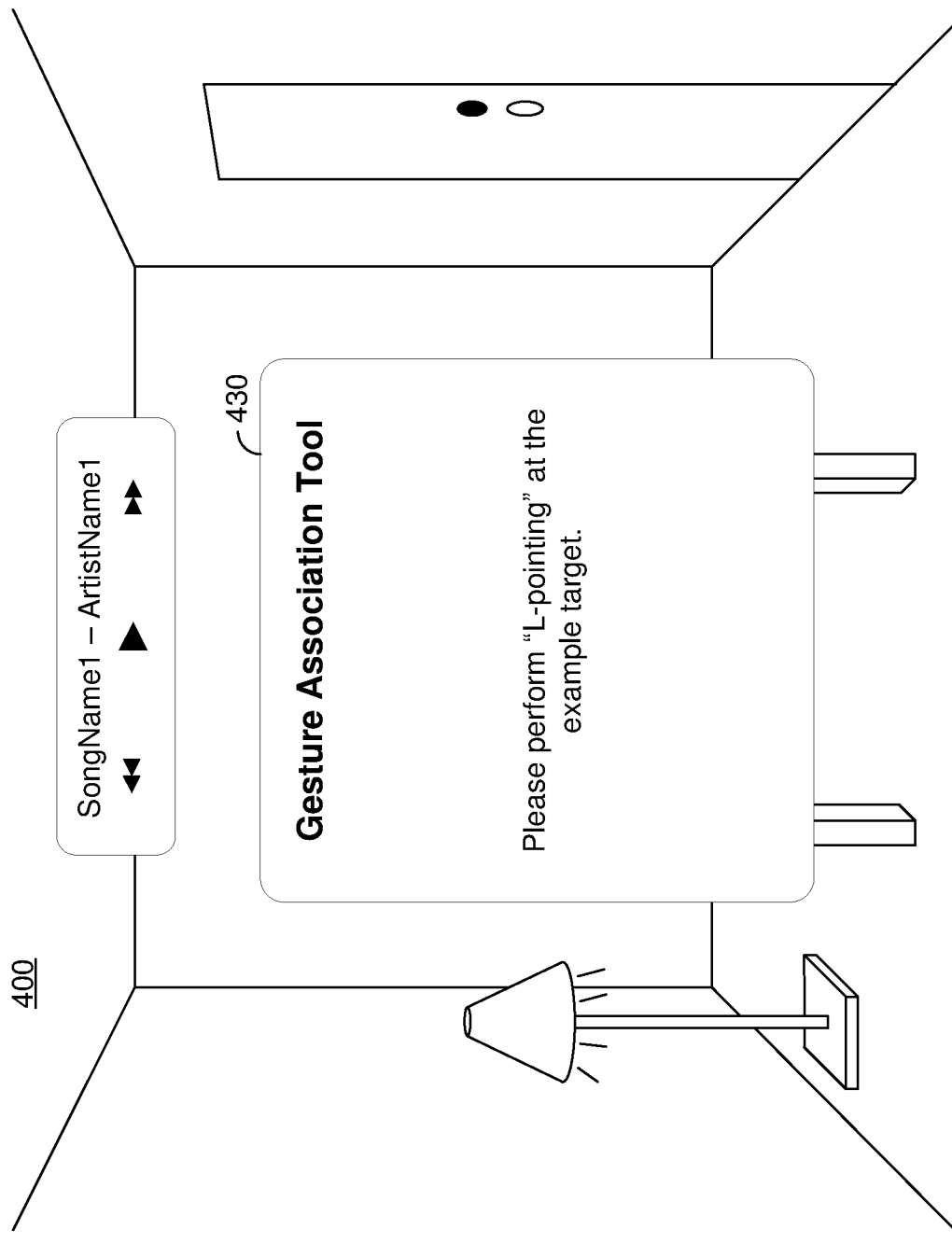

FIG. 6F illustrates the XR environment 400 during a sixth time period subsequent to the fifth time period. In various implementations, the sixth time period is an instant, a fraction of a second, a few seconds, a few hours, a few days, or any length of time. During the sixth time period, in response to the user providing a name for the L-pointing gesture 444 of "L-pointing", the gesture association window 430 includes a prompt requesting that the user perform the L-pointing gesture 444 at the virtual target 450.

Figure 6G:
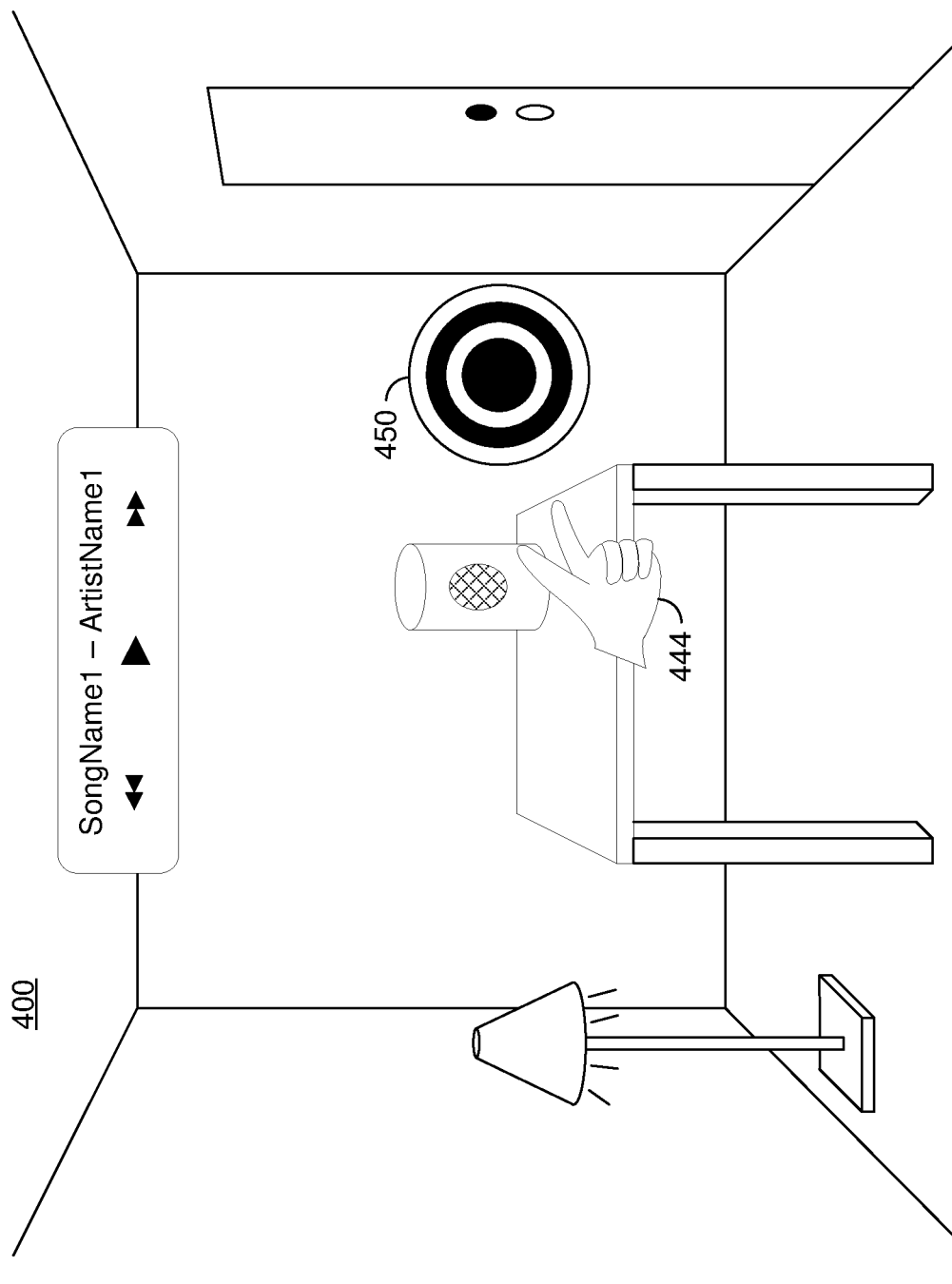

FIG. 6G illustrates the XR environment 400 during a seventh time period subsequent to the sixth time period. In various implementations, the seventh time period is an instant, a fraction of a second, a few seconds, a few hours, a few days, or any length of time. During the seventh time period, the XR environment 400 includes the virtual target 450 at a second location in the XR environment 400. Further, during the seventh time period, the user performs the L-pointing gesture 444 at the virtual target 450.

The device detects the user's hands in the XR environment 400 and extracts a set of features from the performance of the L-pointing gesture 444. In various implementations, the set of features includes features based on the position and/or orientation of various hand elements (e.g., the relative position in three-dimensional space of fingertips, knuckles, and/or palms) at various times during the eighth time period.

Based on the set of features, the device defines one or more gesture matching criteria for the L-pointing gesture 444. In various implementations, the device stores the gesture matching criteria for the L-pointing gesture 444 in the gesture database. In various implementations, the device defines the gesture matching criteria for the L-pointing gesture 444 further based on the set of features extracted during the fourth time period as another positive example of the framing gesture 442.

Based on the set of features and the location of the virtual target 450 in the XR environment, the device defines a direction associated with the L-pointing gesture 444 extending from a location of performance of the L-pointing gesture towards the virtual target 450.

Figure 6H:
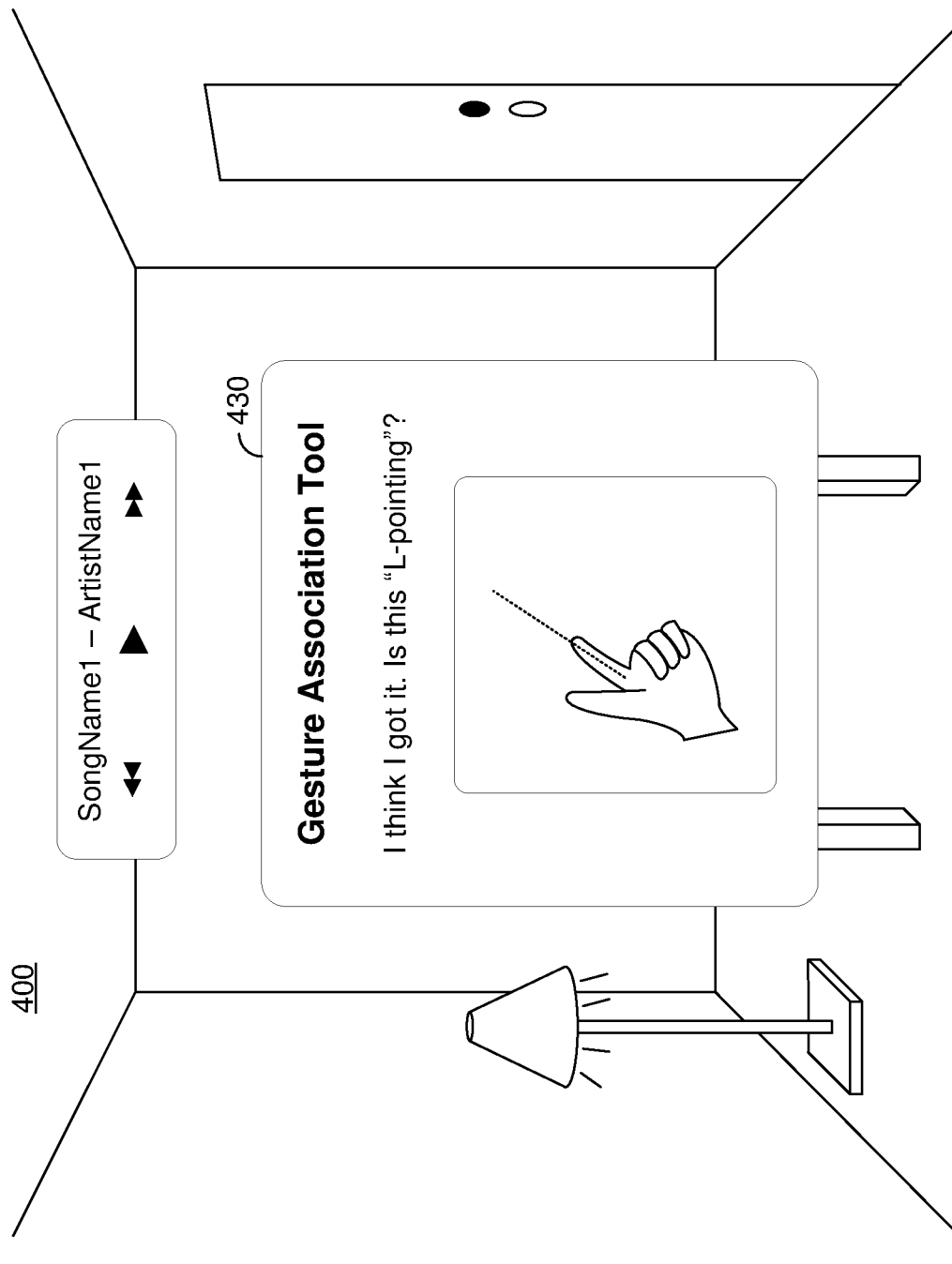

FIG. 6H illustrates the XR environment 400 during an eighth time period subsequent to the seventh time period. In various implementations, the eighth time period is an instant, a fraction of a second, a few seconds, a few hours, a few days, or any length of time. During the eighth time period, the gesture association window 430 includes a prompt requesting that the user confirm the "L-pointing" gesture. In various implementations, and as illustrated in FIG. 6H, the gesture association window 430 includes a graphical representation of the defined gesture, including a representation of the direction associated with the gesture.

During the eighth time period, the user confirms that the L-pointing gesture 444 performed by the user corresponds to the "L-pointing" gesture. In various implementations, the user response is a verbal command. For example, during the eighth time period, the user responds to the prompt by saying "Yes." In various implementations, the user response includes user interaction with one or more affordances, such as a "Yes" button or a "No" button, or performance of a confirmation hand gesture or a cancel hand gesture.

Figure 6I:
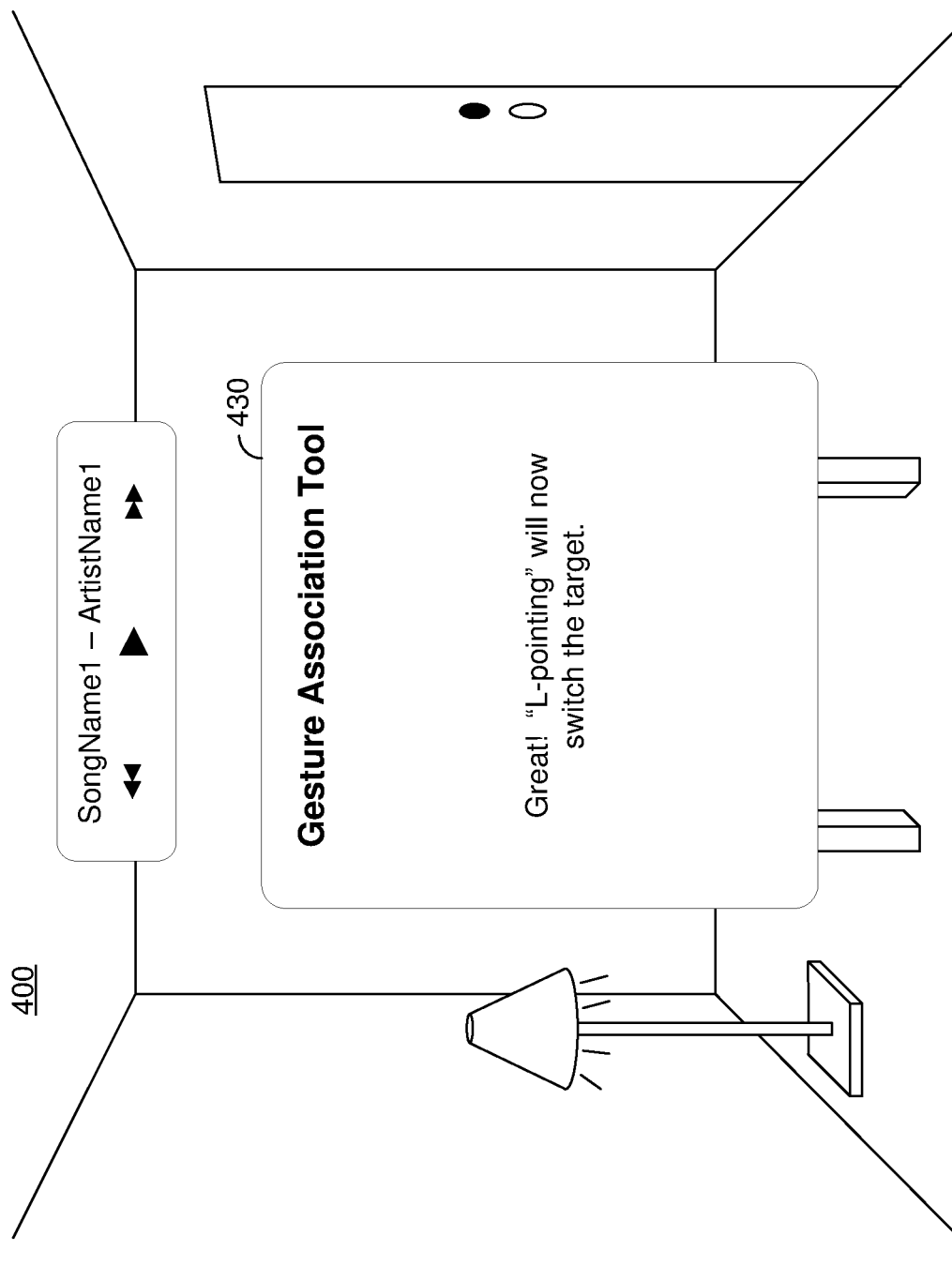

FIG. 6I illustrates the XR environment 400 during a ninth time period subsequent to the eighth time period. In various implementations, the ninth time period is an instant, a fraction of a second, a few seconds, a few hours, a few days, or any length of time. During the ninth time period, in response to the user confirming that the L-pointing gesture 444 corresponds to the "L-pointing" gesture, the gesture association window 430 includes a confirmation that performing the "L-pointing" gesture will engage the target of the gesture.

FIGS. 7A1-7H2 illustrate the XR environment 400 of FIG. 4A in response to detecting various hand gestures. Like FIGS. 4A-4F, FIGS. 5A-5S, and FIGS. 6A-6I, FIGS. 7A1-7H2 illustrate the XR environment 400 from the perspective of a user of an electronic device.

FIG. 7A1 illustrates the XR environment 400 during a first time period. In various implementations, the first time period is an instant, a fraction of a second, a few seconds, a few hours, a few days, or any length of time. During the first time period, the user performs the namaste gesture 441. During the first time period, the device detects the user's hands in the XR environment 400 and extracts a set of features from the performance of the namaste gesture 441. Further, the device determines that the set of features matches the one or more gesture matching criteria for the "Namaste" gesture stored in the gesture database.

FIG. 7A2 illustrates the XR environment 400 during a second time period subsequent to the first time period. In various implementations, the second time period is an instant, a fraction of a second, a few seconds, a few hours, a few days, or any length of time. In response to determining that the set of features extracted from the namaste gesture 441 matches the one or more gesture matching criteria for the "Namaste" gesture, the device launches the Yoga application. Accordingly, during the second time period, the XR environment includes an application window of the Yoga application 461.

FIG. 7B1 illustrates the XR environment 400 during a third time period subsequent to the second time period. In various implementations, the third time period is an instant, a fraction of a second, a few seconds, a few hours, a few days, or any length of time. During the third time period, the user performs the framing gesture 442. During the third time period, the device detects the user's hands in the XR environment 400 and extracts a set of features from the performance of the framing gesture 442. Further, the device determines that the set of features matches the one or more gesture matching criteria for the "Framing" gesture stored in the gesture database.

FIG. 7B2 illustrates the XR environment 400 during a fourth time period subsequent to the third time period. In various implementations, the fourth time period is an instant, a fraction of a second, a few seconds, a few hours, a few days, or any length of time. In response to determining that the set of features extracted from the framing gesture 442 matches the one or more gesture matching criteria for the "Framing" gesture, the device launches the Camera application. Accordingly, during the fourth time period, the XR environment 400 includes an application window of the Camera application 462.

FIG. 7C1 illustrates the XR environment 400 during a fifth time period subsequent to the fourth time period. In various implementations, the fifth time period is an instant, a fraction of a second, a few seconds, a few hours, a few days, or any length of time. During the fifth time period, the user performs the L-pointing gesture 444 at the speaker 412. During the fifth time period, the device detects the user's hand in the XR environment 400 and extracts a set of features from the performance of the L-pointing gesture 444. Further, the device determines that the set of features matches the one or more gesture matching criteria for the "Framing" gesture stored in the gesture database. Further, the device determines a direction of the L-pointing gesture 444 and determines that the speaker 412 is within a path extending from a location of the performance of the L-pointing gesture 444 in the determined direction.

FIG. 7C2 illustrates the XR environment 400 during a sixth time period subsequent to the fifth time period. In various implementations, the sixth time period is an instant, a fraction of a second, a few seconds, a few hours, a few days, or any length of time. In response to determining that the set of features extracted from the L-pointing gesture 444 matches the one or more gesture matching criteria for the "L-pointing" gesture, the device engages the speaker 412, resulting in a change of state from a paused state to a playing state. Accordingly, during the sixth time period, the playback indicator 422 indicates that the speaker 412 is playing the song entitled "SongName1" as indicated by the playback indicator 422 including the pause/play affordance 425 in a second state (rather than the pause/play affordance 425 in a first state as in FIG. 7C1).

FIG. 7D1 illustrates the XR environment 400 during a seventh time period subsequent to the sixth time period. In various implementations, the seventh time period is an instant, a fraction of a second, a few seconds, a few hours, a few days, or any length of time. During the seventh time period, the user performs the L-pointing gesture 444 at the lamp 413. During the seventh time period, the device detects the user's hand in the XR environment 400 and extracts a set of features from the performance of the L-pointing gesture 444. Further, the device determines that the set of features matches the one or more gesture matching criteria for the "L-pointing" gesture stored in the gesture database. Further, the device determines a direction of the L-pointing gesture 444 and determines that the lamp 413 is within a path extending from a location of the performance of the L-pointing gesture 444 in the determined direction.

FIG. 7D2 illustrates the XR environment 400 during an eighth time period subsequent to the seventh time period. In various implementations, the eighth time period is an instant, a fraction of a second, a few seconds, a few hours, a few days, or any length of time. In response to determining that the set of features extracted from the L-pointing gesture 444 matches the one or more gesture matching criteria for the "L-pointing" gesture, the device engages the lamp 413, resulting in a change of state from an on state to an off state. Accordingly, during the eighth time period, the lamp 413 is off as indicated by the absence of light 423 emanating from the lamp 413.

FIG. 7E1 illustrates the XR environment 400 during a ninth time period subsequent to the eighth time period. In various implementations, the ninth time period is an instant, a fraction of a second, a few seconds, a few hours, a few days, or any length of time. During the ninth time period, the user performs a shaka gesture 445 (in which the thumb and the pinky are extended while the other fingers are curled in towards the palm) at the speaker 412. During the ninth time period, the device detects the user's hand in the XR environment 400 and extracts a set of features from the performance of the shaka gesture 445. Further, the device determines that the set of features matches the one or more gesture matching criteria for a "Shaka" or "Hang Loose" gesture stored in the gesture database. Further, the device determines a direction of the shaka gesture 445 and determines that the speaker 412 is within a path extending from a location of the performance of the shaka gesture 445 in the determined direction.

FIG. 7E2 illustrates the XR environment 400 during a tenth time period subsequent to the ninth time period. In various implementations, the tenth time period is an instant, a fraction of a second, a few seconds, a few hours, a few days, or any length of time. In response to determining that the set of features extracted from the shaka gesture 445 matches the one or more gesture matching criteria for the "Shaka" gesture, the device performs an associated function with respect to the speaker 412, e.g., changing the playing song to a Hawaiian song. Accordingly, during the tenth time period, the playback indicator 422 indicates that the speaker 412 is playing the song entitled "SongName2".

FIG. 7F1 illustrates the XR environment 400 during an eleventh time period subsequent to the tenth time period. In various implementations, the eleventh time period is an instant, a fraction of a second, a few seconds, a few hours, a few days, or any length of time. During the eleventh time period, the user performs a warding gesture 446 (in which the index finger and pinky are extended while the other fingers are held in towards the palm by the thumb) at the speaker 412. During the eleventh time period, the device detects the user's hand in the XR environment 400 and extracts a set of features from the performance of the warding gesture 446. Further, the device determines that the set of features matches the one or more gesture matching criteria for a "Warding" or "Sign of the Horns" gesture stored in the gesture database. Further, the device determines a direction of the warding gesture 446 and determines that the speaker 412 is within a path extending from a location of the performance of the warding gesture 446 in the determined direction.

FIG. 7F2 illustrates the XR environment 400 during a twelfth time period subsequent to the eleventh time period. In various implementations, the twelfth time period is an instant, a fraction of a second, a few seconds, a few hours, a few days, or any length of time. In response to determining that the set of features extracted from the warding gesture 446 matches the one or more gesture matching criteria for the "Warding" gesture, the device performs an associated function with respect to the speaker 412, e.g., changing the playing song to a heavy metal song. Accordingly, during the twelfth time period, the playback indicator 422 indicates that the speaker 412 is playing the song entitled "SongName3".

FIG. 7G1 illustrates the XR environment 400 during a thirteenth time period subsequent to the twelfth time period. In various implementations, the thirteenth time period is an instant, a fraction of a second, a few seconds, a few hours, a few days, or any length of time. During the thirteenth time period, the user performs a wand gesture 447 (in which the hand is held in a position in which the index finger is extended with the other fingers held in towards the palm by the thumb while moving the index finger in a circle) while speaking the term "abracadabra". During the thirteenth time period, the device detects the user's hand in the XR environment 400 and extracts a set of hand features from the performance of the wand gesture 447. During the thirteenth time period, the device detects the user's voice and extracts a set of voice features from the user speaking the term "abracadabra".

Further, the device determines that the set of hand features and the set of voice features matches the one or more gesture matching criteria for a "Magic Lighting" gesture stored in the gesture database.

FIG. 7G2 illustrates the XR environment 400 during a fourteenth time period subsequent to the thirteenth time period. In various implementations, the fourteenth time period is an instant, a fraction of a second, a few seconds, a few hours, a few days, or any length of time. In response to determining that the set of features extracted from the wand gesture 447 and the set of features extracted from the user speaking the term "abracadabra" matches the one or more gesture matching criteria for the "Magic Lighting" gesture, the device performs an associated function, e.g., turning the lamp 413 on. Accordingly, during the fourteenth time period, the lamp 413 is on as indicated by the presence of light 423 emanating from the lamp 413.

FIG. 7H1 illustrates the XR environment 400 during a fifteenth time period subsequent to the fourteenth time period. In various implementations, the fourteenth time period is an instant, a fraction of a second, a few seconds, a few hours, a few days, or any length of time. During the fifteenth time period, the user performs the wand gesture 447 while speaking the term "open sesame". During the fifteenth time period, the device detects the user's hand in the XR environment 400 and extracts a set of hand features from the performance of the wand gesture 447. During the fifteenth time period, the device detects the user's voice and extracts a set of voice features from the user speaking the term "open sesame".

Further, the device determines that the set of hand features and the set of voice features matches the one or more gesture matching criteria for a "Magic Opening" gesture stored in the gesture database.

FIG. 7H2 illustrates the XR environment 400 during a sixteenth time period subsequent to the fifteenth time period. In various implementations, the sixteenth time period is an instant, a fraction of a second, a few seconds, a few hours, a few days, or any length of time. In response to determining that the set of features extracted from the wand gesture 447 and the set of features extracted from the user speaking the term "open sesame" matches the one or more gesture matching criteria for the "Magic Opening" gesture, the device performs an associated function, e.g., unlocking the door 414. Accordingly, during the sixteenth time period, the door 414 is unlocked as indicated by the lock indicator 424.

Figure 8:
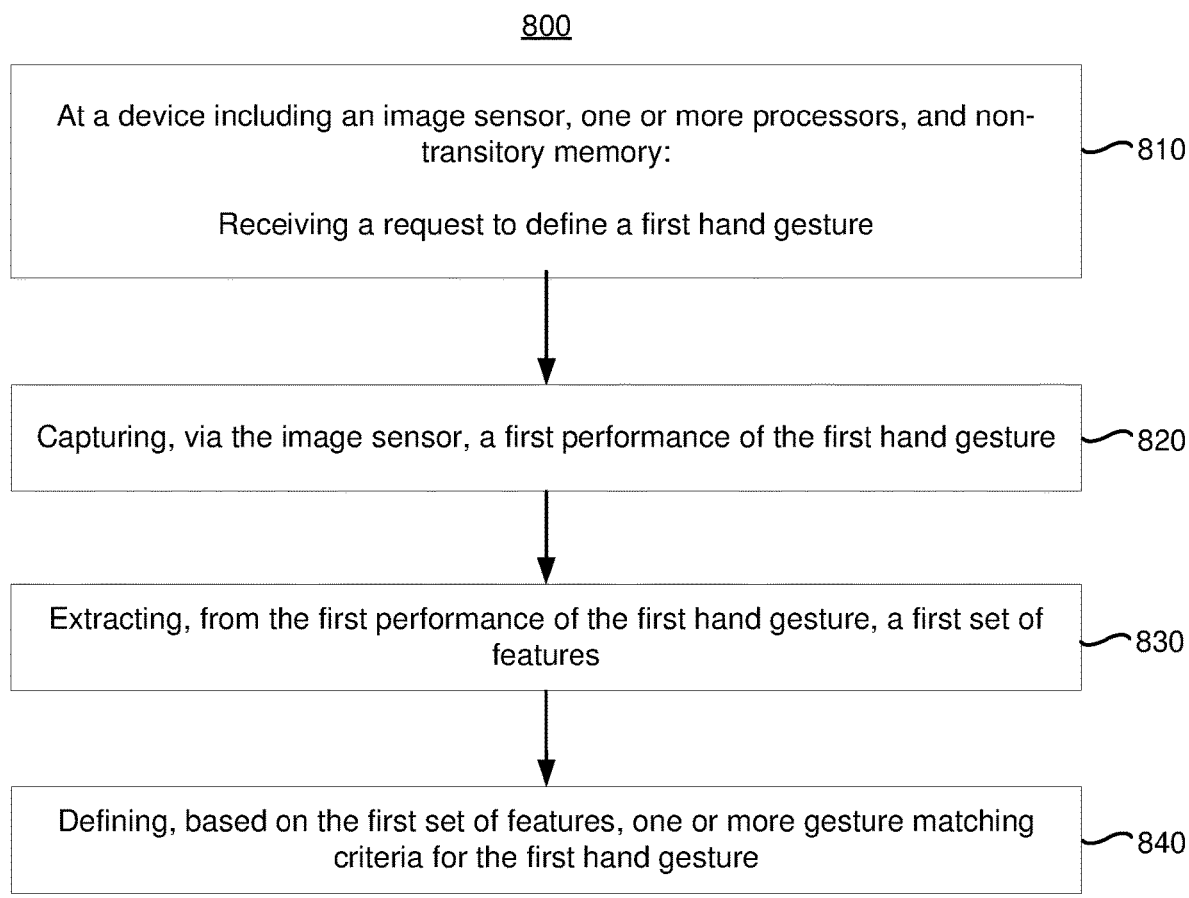
FIG. 8 is a flowchart representation of a method of defining a hand gesture in accordance with some implementations.

FIG. 8 is a flowchart representation of a method 800 of defining a hand gesture in accordance with some implementations. In various implementations, the method 800 is performed by a device with an image sensor, one or more processors, and non-transitory memory (e.g., the electronic device 120 of FIG. 3). In some implementations, the method 800 is performed by processing logic, including hardware, firmware, software, or a combination thereof. In some implementations, the method 800 is performed by a processor executing instructions (e.g., code) stored in a non-transitory computer-readable medium (e.g., a memory).

The method 800 begins, in block 810, with the device receiving a request to define a first hand gesture. For example, during the first time period of FIG. 5A, the device receives a request to associate a hand gesture with a function.

The method 800 continues, in block 820, with the device capturing, via the image sensor, a first performance of the first hand gesture. For example, during the fourth time period of FIG. 5D, the device captures a first performance of the framing gesture 442.

In various implementations, the method 800 includes, in response to receiving the request to define the hand gesture, providing a prompt to perform the first hand gesture. For example, in FIG. 5C, the gesture association window 430 includes a prompt to perform a gesture. In various implementations, capturing the first performance of the first hand gesture is performed in response to providing the prompt to perform the first hand gesture.

The method 800 continues, in block 830, with the device extracting, from the first performance of the first hand gesture, a first set of features. In various implementations, the set of features includes features based on the position and/or orientation of various hand elements (e.g., the relative position in three-dimensional space of fingertips, knuckles, and/or palms) at various times. For example, during the fourth time period of FIG. 5D, the device extracts a first set of features from the first performance of the framing gesture 442.

In various implementations, the set of features includes features based on the position and/or orientation of a single hand. For example, FIG. 7E1 illustrates performance of a shaka gesture 445 involving a single hand. In various implementations, the set of features includes features based on the position and/or orientation of two hands. For example, FIG. 7B1 illustrates performance of a framing gesture 442 involving two hands. In various implementations, the set of features includes features based on a change over time in position and/or orientation of one or two hands, e.g., how the hand or hands of a user move along a motion path. For example, FIG. 7G1 illustrates a wand gesture 447 involving the motion of a single hand.

The method 800 continues, in block 840, with the device defining, based on the first set of features, one or more gesture matching criteria for the first hand gesture. For example, during the tenth time period of FIG. 5J, the device defines one or more gesture matching criteria for the "Framing" gesture based at least on the first set of features extracted from the first performance of the framing gesture 442 in FIG. 5D.

In various implementations, the device defines the one or more gesture matching criteria for the first hand gesture further based on a second set of features extracted from a second performance of the first hand gesture. For example, during the tenth time period of FIG. 5J, the device defines the one or more gesture matching criteria for the "Framing" gesture based on a second set of features extracted from the second performance of the framing gesture 442 in FIG. 5H.

In various implementations, the device defines the one or more gesture matching criteria for the first hand gesture further based on a second set of features extracted from a performance of the second hand gesture different than the first hand gesture. For example, during the tenth time period of FIG. 5J, the device defines the one or more gesture matching criteria for the "Framing" gesture based on a second set of features extracted from the performance of the window gesture 443 in FIG. 5J.

In various implementations, the method 800 further includes associating the first hand gesture with a first function. In various implementations, the first function includes launching an application, performing a function within an application (e.g., opening a window to compose a new message or changing a music playlist), or engaging a target (e.g., turning a light on or off, playing or pausing music, locking or unlocking a door, etc.). For example, in FIG. 5L, the framing gesture 442 is associated with a function of opening a Camera application. In various implementations, the method 800 further includes capturing, via the image sensor, a second performance of the first hand gesture. For example, in FIG. 7B1, the device detects a performance of the framing gesture 442. In various implementations, the method 800 further includes extracting, from the second performance of the first hand gesture, a second set of features. For example, in FIG. 7B1, the device extracts a second set of features from the performance of the framing gesture 442. In various implementations, the method 800 further includes, in response to the second set of features satisfying the one or more gesture matching criteria for the first hand gesture, performing the first function. For example, in FIG. 7B2, in response to the features extracted from the performance of the framing gesture 442, the device opens the Camera application, as indicated by the application window of the Camera application 462.

In various implementations, extracting the first set of features (in block 830) includes applying a neural network to the first performance of the first hand gesture. In various implementations, the neural network includes an interconnected group of nodes. In various implementation, each node includes an artificial neuron that implements a mathematical function in which each input value is weighted according to a set of weights and the sum of the weighted inputs is passed through an activation function, typically a non-linear function such as a sigmoid, piecewise linear function, or step function, to produce an output value. In various implementations, the neural network is trained on training data to set the weights.

In various implementations, the neural network includes a deep learning neural network. Accordingly, in some implementations, the neural network includes a plurality of layers (of nodes) between an input layer (of nodes) and an output layer (of nodes). In various implementations, the neural network receives, as inputs, images of the performance of the first hand gesture. In various implementations, the neural network receives, as inputs, a preliminary set of features based on the position and/or orientation of various hand elements (e.g., fingertips, knuckles, and/or palms) at various times during performance of the first hand gesture. In various implementations, the neural network provides, as an output, the set of features.

In various implementations, defining the one or more gesture matching criteria for the first hand gesture (in block 840) includes training a neural network (e.g., a classifier) on the first set of features. In various implementations, the neural network includes an interconnected group of nodes. In various implementation, each node includes an artificial neuron that implements a mathematical function in which each input value is weighted according to a set of weights and the sum of the weighted inputs is passed through an activation function, typically a non-linear function such as a sigmoid, piecewise linear function, or step function, to produce an output value. In various implementations, the neural network is trained on training data to set the weights.

In various implementations, the training data includes the first set of features as a positive example of the first hand gesture. In various implementations, the training data includes a second set of features extracted from a second performance of the first hand gesture as a positive example of the first hand gesture. In various implementations, the second performance of the first hand gesture is performed in response to a prompt. For example, in FIG. 5H, a performance of the framing gesture 442 is performed in response to the prompt in the gesture association window 430 in FIG. 5G. In various implementations, the second performance of the first hand gesture is performed in order to cause the device to perform the first function. For example, in FIG. 7B1, a performance of the framing gesture 442 is performed in order to cause the device to open the Camera application.

In various implementations, the training data includes a second set of features extracted from a performance of a second hand gesture as a negative example of the first hand gesture. In various implementations, the performance of the second hand gesture is performed in response to a prompt. For example, in FIG. 5J, a performance of the window gesture 443 is performed in response to the prompt in the gesture association window 430 in FIG. 5I. In various implementations, the performance of the second hand gesture is performed in order to cause the device to perform a second function. For example, if the user performs a gesture which opens the Camera application and the user quickly closes the Camera application, the device may determine that the gesture was not the framing gesture. In various implementations, the second set of features are obtained from a gesture database. For example, in various implementations, a second set of features from the "Diamond" gesture shown in FIG. 5E is used as a negative example of the framing gesture 442.

In various implementations, the neural network includes a deep learning neural network. Accordingly, in some implementations, the neural network includes a plurality of layers (of nodes) between an input layer (of nodes) and an output layer (of nodes). In various implementations, the neural network receives, as inputs, images of the performance of the first hand gesture. In various implementations, the neural network receives, as inputs, the first set of features. In various implementations, the neural network provides, as an output, an indication of the gesture performed. In various implementations, the neural network provides, as an output an indication that the first set of features satisfy (or do not satisfy) the one or more gesture matching criteria for the first hand gesture.

In various implementations, the first hand gesture is associated with a first direction and wherein performing the first function includes performing the first function with respect to an object within a path extending from a location of the second performance of the first hand gesture in the first direction. For example, in FIG. 7C1, the L-pointing gesture 444 is associated with a first direction towards the speaker 412 and, in response to the L-pointing gesture 444 satisfying one or more gesture matching criteria, the device engages the speaker 412, resulting in a change of state from a paused state to a playing state.

The first direction can be determined in a number of ways. For example, in FIG. 7C1 and in FIG. 7D1, the direction of the L-pointing gesture 444 is determined as the direction of a ray extending along the index finger of the user. As another example, in FIG. 7E1, the direction of the shaka gesture 445 is determined as the direction of a ray bisecting an angle defined by the thumb and the pinky finger. As another example, in FIG. 7F1, the direction of the warding gesture 446 is determined as a direction of ray between two rays extending along the index finger and the ring finger.

In various implementations, a circling gesture is defined in which the hand is held and moved in a similar position and motion to the wand gesture 447 of FIG. 7H1, but with the index finger tracing a circle around a target. In various implementations, the direction of the circling gesture is determined as the direction of a ray extending from the user's wrist through the center of the circle.

In various implementations, the method 800 includes capturing, via the image sensor, a performance of a second hand gesture, wherein the second hand gesture is associated with a second direction and the object is within a path extending from a location of the performance of the second hand gesture in the second direction. For example, in FIG. 7E1, the device captures the performance of a shaka gesture 445 directed to the speaker 412. The method 800 includes extracting, from the performance of the second hand gesture, a third set of features and, in response to the third set of features satisfying the one or more gesture matching criteria for the second hand gesture, performing a second function with respect to the object. For example, in FIG. 7E2, in response to the features extracted from the shaka gesture 445 satisfying one or more gesture matching criteria for the corresponding gesture, the device changes the playing song to a Hawaiian song.

In various implementations, the one or more gesture matching criteria for the first hand gesture include one or more hand position matching criteria and one or more audio matching criteria for the first hand gesture. For example, in FIG. 7G1, the device extracts a set of hand features from the wand gesture 447 and a set of voice features from the user speaking the term "abracadabra". In response to determining that the set of hand features and the set of voice features satisfy the one or more gesture matching criteria for a "Magic Lighting" gesture stored in the gesture database, the device turns on the lamp 413 (shown in FIG. 7G2).

In various implementations, the method 800 includes capturing, via the image sensor, a performance of a second hand gesture associated with one or more gesture matching criteria for the second hand gesture including the one or more hand position matching criteria and one or more audio matching criteria for the second hand gesture different than the one or more audio matching criteria for the first hand gesture. The method 800 includes extracting, from the performance of the second hand gesture, a third set of features and, in response to the third set of features satisfying the one or more gesture matching criteria for the second hand gesture, performing a second function. For example, in FIG. 7H1, the device extracts a set of hand features from the wand gesture 447 and a set of voice features from the user speaking the term "open sesame". In response to determining that the set of hand features and the set of voice features satisfy the one or more gesture matching criteria for a "Magic Opening" gesture stored in the gesture database, the device unlocks the door 414 (shown in FIG. 7H2). In various implementations, hand position matching criteria for the "Magic Lighting" gesture and the "Magic Opening" gesture are the same.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device comprising an image sensor, one or more processors, and non-transitory memory:
        receiving a request to associate a first function with a first hand gesture;
        in response to receiving the request to associate the first function with the first hand gesture:
            receiving a user input indicating the first function;
            capturing, via the image sensor, a first performance of the first hand gesture;
            extracting, from the first performance of the first hand gesture, a first set of features;
            displaying a prompt requesting a user of the device to confirm whether or not the first hand gesture is the same as a particular known hand gesture from a plurality of known hand gestures with corresponding gesture matching criteria; and
            in response to the user confirming that the first hand gesture is not the same as the particular known hand gesture:
                displaying a prompt requesting the user to provide a name for the first hand gesture; and
                defining, based on the first set of features, one or more gesture matching criteria for the first hand gesture, wherein the one or more gesture matching criteria for the first hand gesture correspond to at least one of a first motion or a first pose of one or more hands of the user of the device associated with the first hand gesture;
after associating the first function with the first hand gesture and defining the one or more gesture matching criteria for the first hand gesture, capturing, via the image sensor, a second performance of the first hand gesture;
extracting, from the second performance of the first hand gesture, a second set of features; and
in response to the second set of features satisfying the one or more gesture matching criteria for the first hand gesture, performing the first function and refining the one or more gesture matching criteria for the first hand gesture based on the second set of features, wherein the one or more refined gesture matching criteria for the first hand gesture correspond to at least one of a second motion or a second pose, different from the first motion or the first pose, of one or more hands of the user of the device associated with the first hand gesture.

2. The method of claim 1, further comprising, in response to receiving the request to associate the first function with the first hand gesture, presenting, via a display, a prompt to perform the first hand gesture, wherein capturing the first performance of the first hand gesture is performed in response to providing the prompt to perform the first hand gesture.

3. The method of claim 1, wherein defining the one or more gesture matching criteria for the first hand gesture includes training a neural network classifier on the first set of features.

4. The method of claim 1, wherein the first hand gesture is associated with a first direction and wherein performing the first function includes performing the first function with respect to an object within a path extending from a location of the second performance of the first hand gesture in the first direction.

5. The method of claim 4, further comprising:
capturing, via the image sensor, a performance of a second hand gesture, wherein the second hand gesture is associated with a second direction and the object is within a path extending from a location of the performance of the second hand gesture in the second direction;
extracting, from the performance of the second hand gesture, a third set of features; and
in response to the third set of features satisfying the one or more gesture matching criteria for the second hand gesture, performing a second function with respect to the object.

6. The method of claim 1, wherein the one or more gesture matching criteria for the first hand gesture include one or more hand position matching criteria and one or more audio matching criteria for the first hand gesture.

7. The method of claim 6, further comprising:
capturing, via the image sensor, a performance of a second hand gesture associated with one or more gesture matching criteria for the second hand gesture including the one or more hand position matching criteria and one or more audio matching criteria for the second hand gesture different than the one or more audio matching criteria for the first hand gesture;
extracting, from the performance of the second hand gesture, a third set of features; and in response to the third set of features satisfying the one or more gesture matching criteria for the second hand gesture, performing a second function.

8. The method of claim 1, wherein defining the one or more gesture matching criteria for the first hand gesture comprises:
specifying whether the first hand gesture is to be performed with a left hand of the user or a right hand of the user as a part of the gesture matching criteria.

9. The method of claim 1, wherein defining the one or more gesture matching criteria for the first hand gesture comprises:
specifying a time duration for performing the first hand gesture as a part of the gesture matching criteria.

10. A device comprising:
an image sensor;
a non-transitory memory; and
one or more processors to:
receive a request to associate a first function with a first hand gesture;
in response to receiving the request to associate the first function with the first hand gesture:
receive a user input indicating the first function;
capture, via the image sensor, a first performance of the first hand gesture;
extract, from the first performance of the first hand gesture, a first set of features;
display a prompt requesting a user of the device to confirm whether or not the first hand gesture is the same as a particular known hand gesture from a plurality of known hand gestures with corresponding gesture matching criteria; and
in response to the user confirming that the first hand gesture is not the same as the particular known hand gesture:
display a prompt requesting the user to provide a name for the first hand gesture; and
define, based on the first set of features, one or more gesture matching criteria for the first hand gesture, wherein the one or more gesture matching criteria for the first hand gesture correspond to at least one of a first motion or a first pose of one or more hands of the user of the device associated with the first hand gesture;
after associating the first function with the first hand gesture and defining the one or more gesture matching criteria for the first hand gesture, capture, via the image sensor, a second performance of the first hand gesture;
extract, from the second performance of the first hand gesture, a second set of features; and
in response to the second set of features satisfying the one or more gesture matching criteria for the first hand gesture, perform the first function and refine the one or more gesture matching criteria for the first hand gesture based on the second set of features, wherein the one or more refined gesture matching criteria for the first hand gesture correspond to at least one of a second motion or a second pose, different from the first motion or the first pose, of one or more hands of the user of the device associated with the first hand gesture.

11. The device of claim 10, wherein the one or more processors are to define the one or more gesture matching criteria for the first hand gesture by training a neural network classifier on the first set of features.

12. The device of claim 10, wherein the first hand gesture is associated with a first direction and wherein the one or more processors are to perform the first function by performing the first function with respect to an object within a path extending from a location of the second performance of the first hand gesture in the first direction.

13. The device of claim 12, wherein the one or more processors are further to:
   capture, via the image sensor, a performance of a second hand gesture, wherein the second hand gesture is associated with a second direction and the object is within a path extending from a location of the performance of the second hand gesture in the second direction;
   extract, from the performance of the second hand gesture, a third set of features; and
   in response to the third set of features satisfying the one or more gesture matching criteria for the second hand gesture, perform a second function with respect to the object.

14. The device of claim 10, wherein the one or more gesture matching criteria for the first hand gesture include one or more hand position matching criteria and one or more audio matching criteria for the first hand gesture.

15. The device of claim 14, wherein the one or more processors are further to:
   capture, via the image sensor, a performance of a second hand gesture associated with one or more gesture matching criteria for the second hand gesture including the one or more hand position matching criteria and one or more audio matching criteria for the second hand gesture different than the one or more audio matching criteria for the first hand gesture;
   extract, from the performance of the second hand gesture, a third set of features; and
   in response to the third set of features satisfying the one or more gesture matching criteria for the second hand gesture, perform a second function.

16. The device of claim 10, wherein the one or more processors further cause the device to:
   in response to receiving the request to associate the first function with the first hand gesture, present, via a display, a prompt to perform the first hand gesture, wherein capturing the first performance of the first hand gesture is performed in response to providing the prompt to perform the first hand gesture.

17. The device of claim 10, wherein defining the one or more gesture matching criteria for the first hand gesture comprises:
   displaying a prompt requesting additional information regarding the first hand gesture;
   in response to displaying the prompt requesting the additional information, receiving an indication of a time duration for performing the first hand gesture; and
   including the time duration as a part of the gesture matching criteria.

18. A non-transitory computer-readable medium having instructions encoded thereon which, when executed by one or more processors of a device including an image sensor, cause the device to:
   receive a request to associate a first function with a first hand gesture;
   in response to receiving the request to associate the first function with the first hand gesture:
      receive a user input indicating the first function;
      capture, via the image sensor, a first performance of the first hand gesture;
      extract, from the first performance of the first hand gesture, a first set of features;
      display a prompt requesting a user of the device to confirm whether or not the first hand gesture is the same as a particular known hand gesture from a plurality of known hand gestures with corresponding gesture matching criteria; and
      in response to the user confirming that the first hand gesture is not the same as the particular known hand gesture:
         display a prompt requesting the user to provide a name for the first hand gesture; and
         define, based on the first set of features, one or more gesture matching criteria for the first hand gesture, wherein the one or more gesture matching criteria for the first hand gesture correspond to at least one of a first motion or a first pose of one or more hands of the user of the device associated with the first hand gesture;
   after associating the first function with the first hand gesture and defining the one or more gesture matching criteria for the first hand gesture, capture, via the image sensor, a second performance of the first hand gesture;
   extract, from the second performance of the first hand gesture, a second set of features; and
   in response to the second set of features satisfying the one or more gesture matching criteria for the first hand gesture, perform the first function and refine the one or more gesture matching criteria for the first hand gesture based on the second set of features, wherein the one or more refined gesture matching criteria for the first hand gesture correspond to at least one of a second motion or a second pose, different from the first motion or the first pose, of one or more hands of the user of the device associated with the first hand gesture.

19. The method of claim 1, further comprising, in response to receiving the request to associate the first function with the first hand gesture, presenting, via a display, a prompt to indicate the first function, wherein receiving the user input indicating the first function is performed in response to providing the prompt to indicate the first function.

20. The method of claim 1, further comprising:
   receiving a request to associate a second function with a second hand gesture; and
   in response to receiving the request to associate the second function with the second hand gesture:
      receiving a user input indicating the second function;
      capturing, via the image sensor, a first performance of the second hand gesture; and
      associating the second function with one or more gesture matching criteria for the second hand gesture.

21. The non-transitory computer-readable medium of claim 18, wherein the one or more gesture matching criteria for the first hand gesture include one or more hand position matching criteria and one or more audio matching criteria for the first hand gesture.

22. The non-transitory computer-readable medium of claim 18, wherein the instructions further cause the device to:
   in response to receiving the request to associate the first function with the first hand gesture, present, via a display, a prompt to perform the first hand gesture, wherein capturing the first performance of the first hand gesture is performed in response to providing the prompt to perform the first hand gesture.

23. The non-transitory computer-readable medium of claim 18, wherein the instructions further cause the device to:
- in response to receiving the request to associate the first function with the first hand gesture, present, via a display, a prompt to indicate the first function, wherein receiving the user input indicating the first function is performed in response to providing the prompt to indicate the first function.

24. The non-transitory computer-readable medium of claim 18, wherein defining the one or more gesture matching criteria for the first hand gesture comprises:
- displaying a prompt requesting additional information regarding the first hand gesture;
- in response to displaying the prompt requesting the additional information, receiving an indication of whether the first hand gesture is to be performed with a left hand or a right hand; and
- specifying whether the first hand gesture is to be performed with the left hand or the right hand as a part of the gesture matching criteria.

\* \* \* \* \*